(12) United States Patent
Horowitz et al.

(10) Patent No.: US 12,128,567 B2
(45) Date of Patent: Oct. 29, 2024

(54) USING MACHINE LEARNING TO RECOGNIZE VARIANT OBJECTS

(71) Applicant: AMP Robotics Corporation, Louisville, CO (US)

(72) Inventors: Matanya B. Horowitz, Golden, CO (US); Joseph M. Castagneri, Denver, CO (US); Joshua M. Browning, Edgewater, CO (US); Carson C. Potter, Denver, CO (US); Paul Dawes, Woodside, CA (US)

(73) Assignee: AMP Robotics Corporation, Louisville, CO (US)

( * ) Notice: Subject to any disclaimer, the term of this patent is extended or adjusted under 35 U.S.C. 154(b) by 214 days.

(21) Appl. No.: 17/559,805

(22) Filed: Dec. 22, 2021

(65) Prior Publication Data

US 2023/0191608 A1 Jun. 22, 2023

(51) Int. Cl.
*B25J 9/16* (2006.01)

(52) U.S. Cl.
CPC ........... *B25J 9/1679* (2013.01); *B25J 9/163* (2013.01); *B25J 9/1697* (2013.01)

(58) Field of Classification Search
None
See application file for complete search history.

(56) References Cited

U.S. PATENT DOCUMENTS

| | | | |
|---|---|---|---|
| 6,276,535 B1 | 8/2001 | Winkelman | |
| 7,181,489 B2 | 2/2007 | Lection | |
| 8,615,123 B2 | 12/2013 | Dabic | |
| 10,207,296 B2 | 2/2019 | Garcia | |
| 10,583,560 B1* | 3/2020 | Rodrigues | B25J 9/1661 |
| 10,625,304 B2 | 4/2020 | Kumar | |
| 10,710,119 B2 | 7/2020 | Kumar | |
| 10,722,922 B2 | 7/2020 | Kumar | |
| 10,958,895 B1* | 3/2021 | Krishnan Gorumkonda | H04N 13/246 |
| 2013/0266205 A1* | 10/2013 | Valpola | G06T 7/194 382/153 |

(Continued)

FOREIGN PATENT DOCUMENTS

WO 2021206727 10/2021

OTHER PUBLICATIONS

Bewley et al. "Simple online and realtime tracking." "Simple Online and Realtime Tracking." arXiv preprint arXiv:1602.00763 (2016).

*Primary Examiner* — Bao Long T Nguyen
*Assistant Examiner* — Alan Lindsay Ostrow
(74) *Attorney, Agent, or Firm* — Van Pelt, Yi & James LLP

(57) ABSTRACT

Using machine learning to recognize variant objects is disclosed, including: identifying an object as a variant of an object type by inputting sensed data associated with the object into a modified machine learning model corresponding to the variant of the object type, wherein the modified machine learning model corresponding to the variant of the object type is generated using a machine learning model corresponding to the object type; and generating a control signal to provide to a sorting device that is configured to perform a sorting operation on the object, wherein the sorting operation on the object is determined based at least in part on the variant of the object type associated with the object.

20 Claims, 25 Drawing Sheets

(56) References Cited

U.S. PATENT DOCUMENTS

| | | | |
|---|---|---|---|
| 2016/0167228 A1* | 6/2016 | Wellman | B25J 9/1602 |
| | | | 901/3 |
| 2017/0232479 A1 | 8/2017 | Pietzka | |
| 2018/0063056 A1 | 3/2018 | Ryu | |
| 2018/0243800 A1* | 8/2018 | Kumar | G06N 20/00 |
| 2019/0130311 A1 | 5/2019 | Anders | |
| 2019/0197498 A1 | 6/2019 | Gates | |
| 2020/0010271 A1 | 1/2020 | Bourn | |
| 2020/0034785 A1 | 1/2020 | Romano | |
| 2020/0290088 A1 | 9/2020 | Kumar | |
| 2020/0368786 A1 | 11/2020 | Kumar | |
| 2021/0023717 A1* | 1/2021 | Yu | B25J 9/1687 |
| 2021/0024297 A1* | 1/2021 | Sun | B65G 61/00 |
| 2021/0229133 A1 | 7/2021 | Kumar | |
| 2021/0295039 A1 | 9/2021 | Jenkins | |
| 2021/0319545 A1* | 10/2021 | Wen | G06T 7/55 |
| 2021/0346916 A1 | 11/2021 | Kumar | |
| 2022/0016675 A1 | 1/2022 | Kumar | |
| 2022/0023918 A1 | 1/2022 | Kumar | |
| 2022/0288787 A1* | 9/2022 | Dupree | G05B 19/4182 |
| 2022/0301192 A1 | 9/2022 | Boardman | |

\* cited by examiner

2300 ↘

2302 ↘

Identify an object as a variant of an object type by inputting sensed data associated with the object into a modified machine learning model corresponding to the variant of the object type, wherein the modified machine learning model corresponding to the variant of the object type is generated using a machine learning model corresponding to the object type

2304 ↘

Generate a control signal to provide to a sorting device that is configured to perform a sorting operation on the object, wherein the sorting operation on the object is determined based at least in part on the variant of the object type associated with the object

FIG. 23

USING MACHINE LEARNING TO RECOGNIZE VARIANT OBJECTS

BACKGROUND OF THE INVENTION

In some sorting facilities, image data of materials is used to identify materials that are desired to be harvested into collection containers. However, the manner of sorting that is performed at each specific sorting facility is limited to the data that is captured by one or more sensors at that specific sorting facility. Furthermore, different facilities operate independently of the data sensed at other facilities and do not benefit from a centralized source of artificial intelligence with respect to sorting.

Materials that are to be processed at sorting facilities may be diverse in shape, material type, and condition, among other attributes. As such, there are challenges with respect to efficiently identifying the correct attributes of materials and then harvesting them into the corresponding collection containers using little or no human intervention.

It would be desirable to design a sorting facility that uses artificial intelligence that can be flexibly adapted to the materials that are processed at the sorting facility and that can accurately identify materials to harvest to achieve a high recovery rate as well as a high purity rate among the harvested items.

BRIEF DESCRIPTION OF THE DRAWINGS

Various embodiments of the invention are disclosed in the following detailed description and the accompanying drawings.

FIG. 23 is a flow diagram showing an embodiment of a process of identifying and sorting an object as a variant of an object type.

DETAILED DESCRIPTION

Figure 1:
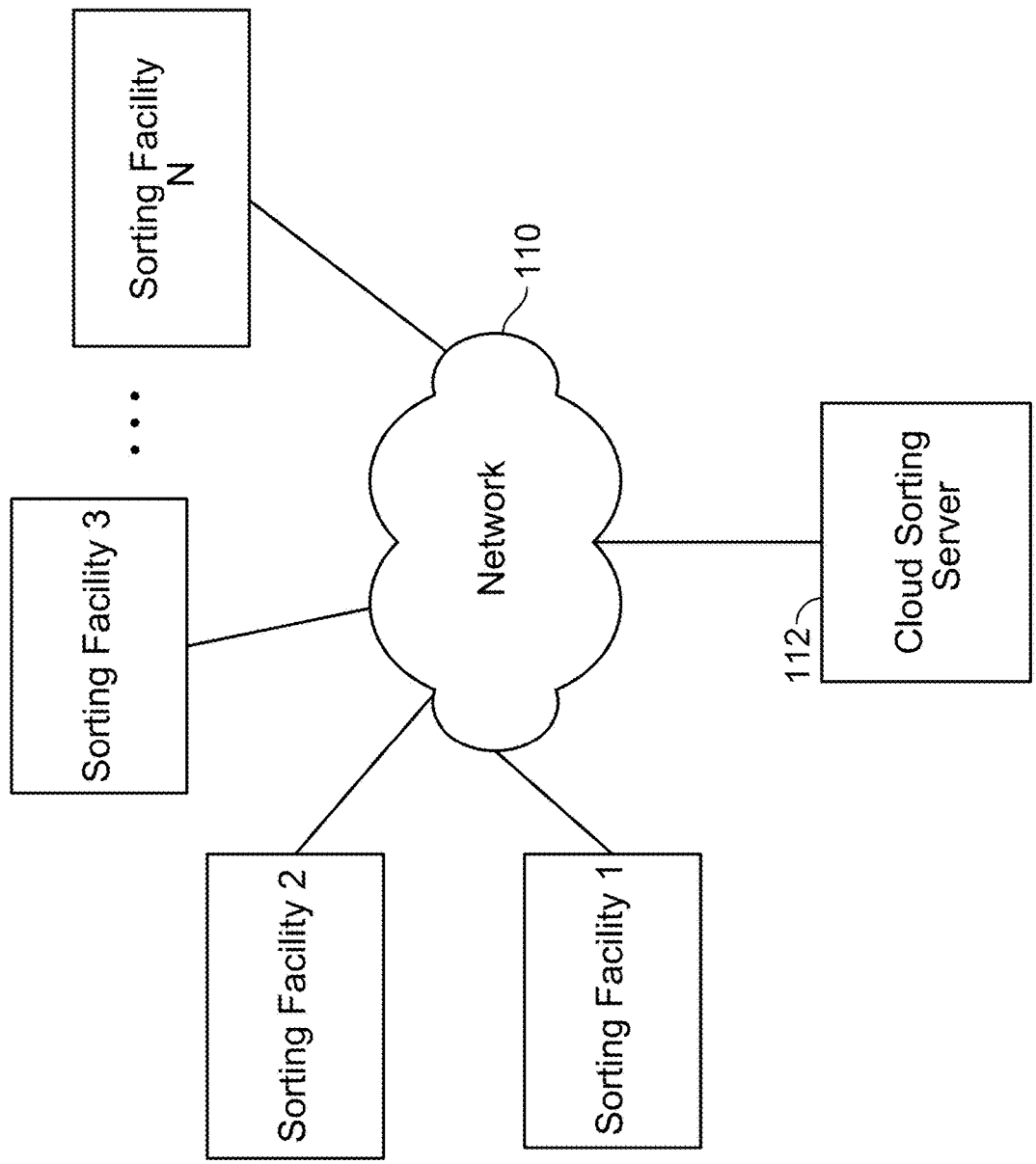
FIG. 1 is a diagram showing an embodiment of an environment in which components within multiple sorting facilities can communicate across sorting facilities and/or with a cloud sorting server over one or more networks.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Artificial intelligence (AI) systems coupled to imaging sensors can be used to rapidly recognize objects within sensed data based on image training and subsequent machine learning techniques. For example, in the material recycling industry, such systems have been successfully used and incorporated in both optical sorters and robotic sorters. In some of these scenarios, a specific diverting mechanism is directly coupled to one or more cameras and a machine learning processing system, and typically is used to identify and separate materials. The result is a turnkey sorting device that represents a standalone module, which can be inserted into a materials sorting line. A disadvantage with this approach is that the machine learning system is designed to work only within the context of its sorting device. To scale such a system requires many such sorting devices, each operating independently from a machine learning and object recognition perspective, resulting in performance and cost bottlenecks for the system as a whole. Further, such systems are tightly coupled, and designed using proprietary components that also add to the ultimate cost and efficiency.

There exists, therefore, a need for a machine learning approach that supports heterogeneous material sorting at the scale of a facility, and with the ability to distribute object recognition, material handling, and material sorting (e.g., capturing) across such facility, and to have the ability to utilize mass-market components and standards-based interconnections. With a more sophisticated machine learning approach, such a system could offer significantly higher performance at significantly lower costs than an approach optimized for individual, proprietary sorting devices. For example, such a system could utilize many different types of sensors (e.g., from multiple manufacturers and/or that sense different frequencies) throughout the facility to calculate and implement intelligent material sorting for a plurality of disparate sorting devices. Furthermore, the fundamental artificial intelligence (e.g., machine learning) advantages of such an approach span a much broader range of possibilities, if such a machine learning system were capable of learning and implementing new object recognition patterns across the entire facility. Finally, an artificial intelligence-based approach that is not tied to specific sorting devices could even span multiple facilities, and utilize a modern cloud-based architecture to facilitate dynamic object recognition and sorting techniques which would benefit from a large scale.

As used herein, a "sorting facility" is a facility at which components such as compute nodes, object recognition devices (e.g., sensors), and sorting devices work in concert to sort (e.g., via sorting mechanisms that are configured to capture, release, push, divert, vacuum, and/or shoot) targeted materials (e.g., as they are being transported through the facility on one or more conveyor devices) into corresponding deposit locations (e.g., where collection containers are placed). Examples of materials to be sorted include produce, recycling materials, waste materials, mixed parts in a factory line, baggage/parcels, mining materials, material handling for manufacturing and chemical processes, and construction/demolition materials. In various embodiments, materials that arrive at a sorting facility are being transported across one or more conveyor devices within the sorting facility. While on the conveyor device(s), sensed data (e.g., image data and/or hyperspectral data) is captured with respect to the materials. In various embodiments, machine learning techniques are applied to the sensed data to identify "target objects" among the materials to manipulate. For example, the sorting device(s) at a sorting facility can be configured to divert target objects as they are being transported on and/or between conveyor device(s) into collection containers. For example, "target" objects can be either materials that are desired to be recovered (e.g., recyclable materials) or materials that are not desired to be recovered (e.g., contaminant items), depending on the application of the sorting devices. One example goal of sorting objects at a sorting facility is to obtain a high "purity level," which can be defined as either 1) the total number of collected target objects over the total number of all objects collected at the collection container(s) or 2) the total weight of collected target objects over the total weight of all objects collected at the collection container(s).

Embodiments of cloud and facility-based machine learning for sorting facilities are described herein. A machine learning model associated with a domain associated with materials to be sorted at a first sorting facility is obtained. In various embodiments, a "domain" refers to a category of materials that are commonly included in a material stream. For example, a domain can be construction and demolition materials or plastic materials. A modified machine learning model is generated by training the machine learning model using data obtained from the first sorting facility. In some embodiments, the machine learning model is originally obtained through training using data that is obtained from a plurality of sorting facilities, including those that sort materials of that particular domain. By then training the machine learning model using training data that is obtained from a specific sorting facility would enable the model to better identify the types of objects that are processed at that sorting facility and also better identify objects that are transported/manipulated by the particular physical setup at that sorting facility.

Embodiments of sorting using target object trajectories are described herein. Data describing a trajectory associated with a target object is obtained. In various embodiments, an object's trajectory is a function of the object's location coordinates and the object's velocity along each dimension of the location coordinates. For example, in an (X, Y) coordinate system, an object's trajectory would be defined as the 2 points (e.g., associated with the object's bounding polygon) within the coordinate system and the X/Y velocity vectors of each point. In various embodiments, the trajectory of the target object is determined with respect to its path along one or more conveyor devices within a sorting facility. In some embodiments, the trajectory associated with the target object is determined based on a plurality of sets of sensed data of the target (e.g., a series of images of the target object as taken from above the conveyor device(s)). A control signal for a sorting device to perform a sorting operation on the target object is generated based at least in part on the trajectory associated with the target object. For example, based on the trajectory of the target object, a control signal can be provided to an appropriate sorting device whose location/range of movement overlaps with the trajectory of the target object and is therefore suitable to performing a sorting operation (e.g., such as a capture operation) on the target object. The control signal is provided to the sorting device, wherein the sorting device is configured to execute the control signal with respect to the target object. In some embodiments, the trajectory of the target object can be dynamically updated (e.g., based on newly sensed data with respect to the target object) over time.

Embodiments of determining a global velocity of a conveyor device based on object trajectories are described herein. A plurality of trajectories corresponding to a plurality of detected objects being transported on a conveyor device is obtained. A global velocity of the conveyor device is obtained based at least in part on the plurality of trajectories. In some embodiments, the trajectory of individual objects being transported on the conveyor device is separately determined (e.g., using sensed data with respect to those objects). Then, the determined trajectories of multiple individual objects are combined to calculate a global velocity for the conveyor device. A new trajectory for a newly detected object can be determined based at least in part on the global velocity of the conveyor device. For example, the global velocity of the conveyor device can be input as the initial parameters of a dynamic movement model (e.g., an extended Kalman filter, an unscented Kalman, a particle filter, local linearization, a sequential Monte Carlo method, or Bayesian filtering) that is used to determine a newly detected object's trajectory.

Embodiments of persistent targeting of an object are described herein. A first sorting device is selected to sort a target object as the target object is being transported along a conveyor device. In some embodiments, the first sorting device is selected to perform a sorting operation on the target object based on the trajectory of the target object and a location/range of movement of the first sorting device. It is determined that the first sorting device has not successfully sorted the target object. In some embodiments, it is determined that the first sorting device has not successfully sorted the target object because the location of another object has prevented the first sorting device from accessing the target object. In response to the determination that the first sorting device has not successfully sorted the target object, a second sorting device is selected to sort the (previously "missed") target object.

Embodiments of using machine learning to recognize variant objects are described herein. It is determined that an object cannot be identified from sensed data associated with the object using a machine learning model corresponding to an object type. In some embodiments, the machine learning model has been trained on training data that is annotated/labeled with instances of regular objects of a particular object type. For example, an "object type" can be defined at any granularity, ranging from a category of materials (e.g., plastic bottles) to a particular subcategory of materials (e.g., plastic milk jugs). The object is identified as a variant of the object type by inputting the sensed data associated with the object into a modified machine learning model corresponding to the variant of the object type. The modified machine learning model corresponding to the variant of the object type is derived from the machine learning model corresponding to the object type. In various embodiments, a "variant" comprises a version of an object type that deviates from the regular features/shape/condition of objects of that type. For example, the variant of an object type can be associated with instances of the objects of that type with distorted/aberrant shapes (e.g., objects that have been crushed, broken, punctured, or torn). A control signal to provide to a sorting device that is configured to perform a sorting operation on the object is generated. The sorting operation on the object is determined based at least in part on the variant of the object type associated with the object. In some embodiments, a sorting parameter of the sorting operation to be performed by the sorting device on the object can be determined based on the variant of the object type (to accommodate the material features of the variant such as to improve the probability of success of the sorting operation).

Embodiments of heterogeneous material sorting are described herein. A first target object associated with a first object type is identified on a surface based at least in part on a first sensed signal. A first control signal is provided to a first sorting device to cause the first sorting device to remove the first target object from the surface and where the first sorting device is configured to manipulate objects associated with the first object type. A second target object associated with a second object type is identified on the surface based at least in part on a second sensed signal. In some embodiments, the first and second target objects are located on a conveyor device. The second control signal is provided to a second sorting device to cause the second sorting device to remove the second target object from the surface and where the second sorting device is configured to manipulate objects associated with the second object type. In some embodiments, objects of the first object type and objects of the second object type are associated with different attributes (e.g., different shapes, different weights, and/or different materials). As such, different sorting devices that are associated with different attributes (e.g., sorting mechanisms and/or locations along a conveyor device that is transporting the objects) can be leveraged to remove objects of one or more corresponding object types from the surface. For example, the first target object of the first object type is removed from the surface and placed onto another surface (e.g., another conveyor device) to be sorted among other target objects of the first object type. Similarly, for example, the second target object of the second object type is removed from the surface and placed onto yet another surface (e.g., yet another conveyor device) to be sorted among other target objects of the second object type.

Embodiments of object material characteristic type identification using multiple types of sensors are described herein. A machine learning model is obtained and where the machine learning model has been trained using training data comprising vision sensor data on a set of objects. The vision sensor data of the training data is associated with material characteristic labels that are determined based at least in part on non-vision sensor data on the set of objects. For example, a vision sensor is a camera and sensed data output by the camera is images. For example, a non-vision sensor is a hyperspectral sensor such as a near-infrared spectroscopy (NIR) sensor and sensed data from the NIR sensor includes reflectivity data. A vision sensor signal corresponding to a target object is obtained. The machine learning model and the vision sensor signal are used to determine a material characteristic type associated with the target object. As such, for example, a machine learning model that is trained using a combination of vision sensor data and non-vision sensor data with respect to a set of objects can be used in the inference stage (e.g., during runtime at a sorting facility) to utilize just a vision sensor signal on a target object to classify the target object into a corresponding material characteristic type, without needing to also rely on a non-vision sensor signal on the target object.

Embodiments of maintaining a data structure corresponding to a target object are described herein. A target object identified from a sensed signal is determined to be a new target object and where the sensed signal is generated at a sorting facility. In some embodiments, a "new" target object is a target object instance that had not previously been recognized from sensed data at the sorting facility. A new data structure corresponding to the new target object is generated. The new data structure is updated with an attribute associated with the new target object and where the attribute is derived from the sensed signal. In various embodiments, a corresponding data structure is maintained for each target object that is detected from sensed data at a sorting facility. In various embodiments, the data structure corresponding to a target object is dynamically updated with new and updated attributes associated with the target object and where such attributes are determined from new sensed signals with respect to the target object. For example, the data structure corresponding to the target object can store information on the position, the trajectory, the recognized object type(s), the bounding polygon, and/or the results of sorting operations performed on the target object.

Various embodiments of sorting facilities described herein facilitate the identification and sorting of target objects within a heterogeneous stream of objects. Example use cases include streams of mixed waste materials, mixed parts in a factory line, baggage/parcels of various sizes/ shapes/materials in a baggage handling facility, mining materials, material handling for manufacturing and chemical processes, construction/demolition materials, etc. Unlike homogeneous object streams, object identification and subsequent object sorting to accurately and efficiently sort heterogeneous streams requires significantly more intelligence. For example, a naive approach might recognize desirable round objects, but be unable to differentially select from nearby undesirable oval or square objects. In another example, a naive approach may differentiate metal from plastic, but not which type of metal, or multi-material objects, or objects stuck together ("welded"). Alternatively, a sorting system could recognize a polymer type, but not colored versions of that polymer, or welded/multi-material plastics, or varying opacity of target plastic. Similarly, even with good object recognition capabilities, additional intelligence is necessary to prioritize object capture for high probability acquisition cases, and to de-prioritize the same when capture probability is low, even for desirable objects, for example, as will be described below.

Various embodiments of a cloud-based machine learning framework described herein comprise a set of software modules that implement one or more machine learning models, provide machine learning tools, implement data management and visualization components, provide data interfaces for remote systems, implement databases for storing model data and parameters, and provide a full set of interfaces/application programming interfaces (APIs) for external systems.

FIG. 1 is a diagram showing an embodiment of an environment in which components within multiple sorting facilities can communicate across sorting facilities and/or with a cloud sorting server over one or more networks. FIG. 1 shows sorting facilities 1 through N and cloud sorting server 112 as being configured to send and receive information amongst each other over network 110. For example, sorting facilities 1 through N may be situated in different physical/geographic locations, configured to process different types of materials, and/or receive materials to-be-sorted from disparate sources. As will be described in further detail below, each of sorting facilities 1 through N includes compute nodes, object recognition devices, conveyor devices, sorting devices, among other components, that are configured to sort materials. In some embodiments, cloud sorting server comprises one or more processors that are remote to at least some of sorting facilities 1 through N. In some embodiments, network 110 comprises one or more WANs (e.g., mobile networks, the internet, or a Zigbee long-range network), which enable communications and data transfer between processors located at cloud sorting server 112 and processors (e.g., within compute nodes or sorting devices) located at remote sorting facilities 1 through N. Network 110 is coupled to sorting facilities 1 through N via standard network routers or gateways within each facility (not shown). For sake of clarity, examples of such a router could be an IP router, an SD-WAN gateway, a 5G router, or a Zigbee gateway. Other, proprietary gateway WAN connections could also be used. For example, compute nodes, object recognition devices, and/or conveyor devices, within each sorting facility may be coupled to one or more WANs via such network routers or gateways.

In various embodiments, cloud sorting server 112 comprises one or more compute nodes, which are each implemented by one or more processors. As will be described in further detail below, cloud sorting server 112 is configured to perform various machine learning functions that are shareable across sorting facilities 1 through N. In various embodiments, cloud sorting server 112 is configured to leverage significant computing power to train machine learning models to recognize broad categories/domains of materials/object types from sensed data (e.g., images or non-visual sensed data related to objects). In some embodiments, such machine learning models can be trained based on data (e.g., sensed data) aggregated from one or more of sorting facilities 1 through N so that the models can benefit from a diverse and wide body of data. In some embodiments, cloud sorting server 112 can then distribute these models to one or more of remote sorting facilities 1 through N for compute nodes and/or sorting devices located at the sorting facilities to use to identify target objects that are received at those facilities. In some embodiments, cloud sorting server 112 can also modify a machine learning model trained on data obtained from multiple sorting facilities by further training it on data obtained from one particular sorting facility or a subset of sorting facilities so that the resulting modified machine learning model becomes highly attuned to the specific characteristics of the objects and facility conditions (e.g., lighting, dust, vibration, etc.) of those one or more sorting facilities. In various embodiments, cloud sorting server 112 is configured to obtain or generate new machine learning models that are specific to a particular object type (e.g., that corresponds to a particular product or stock-keeping unit (SKU)) and propagate those to one or more of sorting facilities 1 through N so that the compute nodes/sorting devices local to those sorting facilities can use the object type specific models to identify target objects at the sorting facilities. Some specific example functions that cloud sorting server 112 is configured to perform include one or more of the following: remote management, data repository for sensed data, data repository for machine learning algorithm weighting parameters, management of target object learned parameters, managing time-sequence data (e.g., panoramas) from remote sorting facilities, sending firmware update modules for remote compute nodes located at remote sorting facilities, distributing machine learning algorithms using data across one or more remote sorting facilities, and storage of object models to use to detect target objects at remote sorting facilities.

As will be described in further detail below, each sorting facility of sorting facilities 1 through N includes compute nodes, object recognition devices, conveyor devices, sorting devices, among other components, that are arranged in one or more sorting lines. As objects that are to-be-sorted travel through each sorting line (e.g., across conveyor devices)

within a sorting facility, one or more object recognition devices are configured to capture sensed data (e.g., images or non-visual sensed data related to objects) on the objects. Compute nodes and/or sorting devices are configured to apply machine learning models (e.g., received from cloud sorting server 112 and/or locally generated) to the sensed data to identify objects to target among the material stream. Corresponding sorting devices along each sorting line of a sorting facility are then configured to perform sorting operations on the target objects to divert them into corresponding deposit locations (e.g., where collection containers are placed). By being able to use various updated machine learning models obtained from cloud sorting server 112, compute nodes and/or sorting devices located at the sorting facilities can work in concert with cloud sorting server 112 to dynamically improve the accuracy of their identification/recognition of target objects and therefore increase the purity level of the collected materials. As will be described in further detail below, in various embodiments, the generation or modification of machine learning models can also be initiated by an operator over a user interface located at each individual sorting facility to become trained on known objects or annotations of sensed data that have been obtained at that particular facility.

Figure 2:
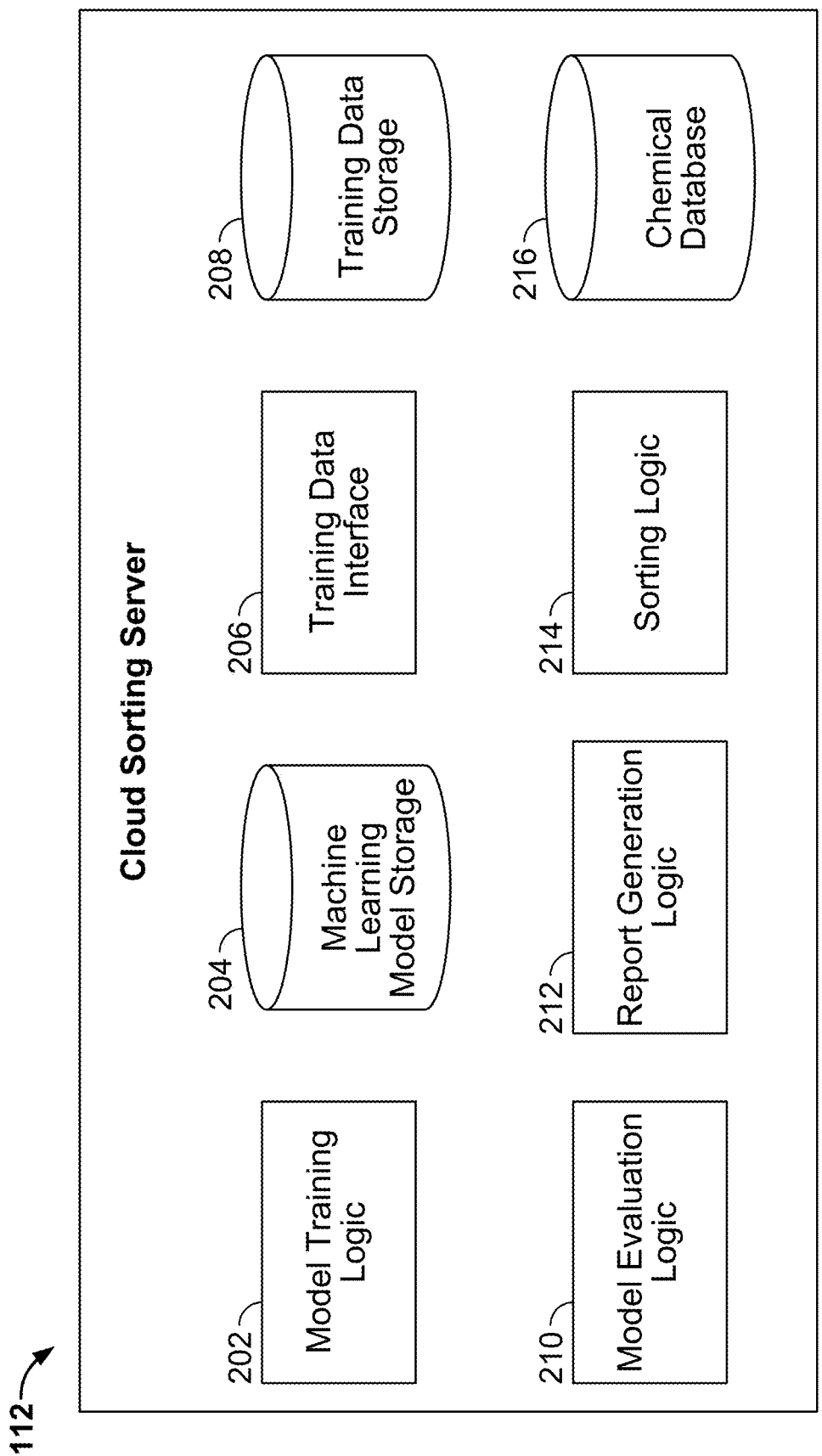
FIG. 2 is a diagram showing an example cloud sorting server.

FIG. 2 is a diagram showing an example cloud sorting server. In some embodiments, cloud sorting server 112 of FIG. 1 can be implemented using the example cloud sorting server of FIG. 2. The example cloud sorting server of FIG. 2 includes model training logic 202, machine learning model storage 204, training data interface 206, training data storage 208, model evaluation logic 210, report generation logic 212, sorting logic 214, and chemical database 216. In some embodiments, model training logic 202, training data interface 206, model evaluation logic 210, report generation logic 212, and sorting logic 214 are implemented using one or more processors with memory and where the processor(s) are capable of running software, firmware, or FPGA-type instructions. In some embodiments, machine learning model storage 204, training data storage 208, and chemical database 216 are implemented using one or more software databases. Examples of such databases include a relational database (e.g., SQL), a text-based list of parameter values, a time series (unstructured) database, a data lake, or other non-sequence database.

A particular problem with heterogeneous sorting of materials is associated with the large number of types of objects that may be processed across different sorting facilities. The problem is compounded by the additional differences presented by sorting facilities across multiple geographies where objects can be vastly different (e.g., the shape and/or material characteristic of soap bottles used in Europe versus those used in Australia may be different). In addition to regional variances, packaging design changes frequently, presenting never before seen material and chemistries. Various embodiments described herein leverage the cloud-based architecture to provide unique solutions to these issues.

Model training logic 202 is configured to generate and train machine learning models. In various embodiments, model training logic 202 provides "out-of-band" functionality that is needed for analyzing data and training machine learning models that are to be distributed to one or more remote sorting facilities. Some examples of machine learning models that are generated by model training logic 202 include neural networks, reinforcement learning models, support vector machines, regression models, and Bayesian inference models. In some embodiments, model training logic 202 comprises a user interface (e.g., a human-machine interface (HMI)) to enable data scientists to build and train machine learning models or update existing models. Example machine learning models that model training logic 202 is configured to generate/train can be configured to identify the location/bounding polygon around the presence of an object within sensed data (e.g., images) and/or configured to identify a type/classification/characteristic of the object (e.g., for which the location/bounding polygon was determined).

In some embodiments, model training logic 202 is configured to enable both a scalable compute/storage framework for the development of large-scale machine learning models and a distributed sorting facility approach to ensure the broadest possible dataset for the training. In material sorting, the breadth of possible object types coupled with the domain of possible material characteristics for each object represents a vast data set that requires an innovative approach to data management and machine learning model training. Typical storage and computation available to a local object recognition system represents potential barriers to entirely local or on-facility systems. Furthermore, the data set available to an individual sorting facility is in itself limited to the subset of objects and characteristics available on a regular basis within that sorting facility. In some embodiments, model training logic 202 is configured to create an offline "parent" model against a very large and diverse dataset aggregated across multiple sorting facilities. The parent approach creates ongoing high-confidence machine learning models using virtually unlimited computational resources, regressive training, ensemble techniques (e.g., voting-by-consensus), all without the on-site latency constraints inherent in a live sorting environment at a particular sorting facility. The data set used for training is sourced across all child/sorting facility sites, in addition to including data from manufacturers of objects and any other available third-party sources. Once created, model training logic 202 is configured to dynamically propagate the parent machine learning model to compute nodes and/or sorting devices for real-time implementation at the sorting facilities. An advantage of this approach is that the compute nodes and/or sorting devices at the sorting facilities can use a variety of techniques (e.g., bounding box jitter, temporal disagreement, low confidence, etc.) to surface problem areas to the parent model. This, in turn, can then refine the model and provide the machine learning capabilities at the sorting facilities with high-quality corrections to its own predictions, enabling it to train and improve over time, based on the parent model's classifications. At this point, the sorting facility components can retrain the parent models against these failure or adverse scenarios, improving them over time. In some embodiments, the parent model that has been received at a sorting facility is retrained (e.g., at the cloud sorting server by model training logic 202 or by a compute node at the sorting facility) on a dataset that comprises primarily data from within that facility, or similar sorting facilities within the same geographic region, allowing the machine learning model to refine itself against the expected material within a facility or within a region. A further advantage is that the parent model at the cloud sorting server also improves with each failure case, as the parent model changes are propagated not just to the sorting facility experiencing the failure scenario, but to all sorting facilities. In some embodiments, the cloud and facility software architecture is configured to support a large set of output layers trained for each material characteristic of each target object. In some embodiments, a "noisy student" approach is taken to utilize the large quantities of data captured by components (e.g., object recognition devices, sorting devices, compute nodes) in the sorting facilities. In such embodiments, the core "teacher" model is trained by model training logic 202 on a known set of labeled data to build the "teacher" model with a configurable error threshold. At this point, one or more "student" models are created from the teacher model, and trained using the much larger data set encountered by many components in the sorting facilities. In this second training process, "noise" is added to the new data, requiring the student model to learn more general predictions, in order to compensate for the inconsistency in the data caused by noising. This results in a net improvement in object recognition accuracy and robustness. This process may be implemented one or more times (e.g., by model training logic 202) to reach a desired accuracy level, and the parent model can then be augmented with the student model. Note that as more data is gathered by the sorting facility components, this process may be run repeatedly by model training logic 202, resulting in both increased accuracy and increased model capabilities. An adjunct benefit of the parent-child model is the auto-learning capability inherent in this system. A baseline machine learning model can be created using sourced sample materials (e.g., from laboratories, reverse search, manual labeling, etc.). When this seed machine learning model is brought online, the base model is augmented with the data obtained from each sorting facility and as a result, each problem identification encountered at the sorting facility is presented as an opportunity to augment training of the base model. Model metadata (such as described below) is uploaded on a regular or continuous basis to the cloud sorting server. During anomalous events (e.g., difficult target identification, errors, etc.), metadata is augmented with full image, raw sensor data, and even video data associated with the event. This data can then be used to annotate the parent model, either manually (e.g., human intervention) or automatically (e.g., automatic retraining based on the new data). Given the large datasets involved, an optimization offered by this implementation is the ability to manage and support the system using only metadata (very small data structures), and only requiring large data transmissions during anomalies.

In some embodiments, a machine learning model is created by model training logic 202 at the cloud sorting server, and trained against target data from multiple sources (e.g., multiple sorting facilities) to create a strong general model for object identification within a broader category such as a domain of materials (e.g., plastics recycling). In some embodiments, the general machine learning model is then trained using training data (e.g., a set of the sensed data or derivations thereof) stored at training data storage 208 that is associated with a specific sorting facility (e.g., that is known to process materials of that domain) or portion thereof (e.g., a particular sorting line). By using a focused training technique for such sorting facility specific data, the original general model becomes highly attuned to the specific characteristics of the objects and facility conditions (e.g., lighting, dust, vibration, etc.) within the particular sorting facility, and therefore, the modified general model includes updated model weights that are specific to and optimized for the target sorting facility. Similarly, in some embodiments, model training logic 202 can also train a general model corresponding to a domain of materials against training data stored at training data storage 208 that is associated with a set of two or more sorting facilities that share a common attribute such as, for example, being geographically proximate to each other and/or having historically processed similar types of objects.

In some embodiments, model training logic 202 is configured to cross train machine learning models that correspond to different domains but share some overlapping materials. Examples of domains include single stream recyclables (SSR), construction and demolition (C&D), organics, and e-waste. In some embodiments, model training logic 202 is configured to train each of multiple machine learning models' known/sorted material of a corresponding domain. Then, input data can be fed into a particular machine learning model associated with a first domain to obtain that model's output of the first domain-specific classifications on that input data. Next, the input data with the labels of the first domain-specific classifications is then used as training data to train another, related machine learning model associated with a second domain that shares some overlapping materials with the first domain. In this way, the machine learning model corresponding to the second domain adds the recognition parameters associated with the first domain, without requiring the longer lead time and greater number of iterations necessary when starting from scratch and using only human annotation for a core machine learning model associated with the first domain. By continuing this approach of cross-training a machine learning model associated with a first domain with training data that had been programmatically annotated by another related machine learning model with a different but related domain, ultimately a sophisticated, cross-domain machine learning model is achieved with much more efficient training times and diversity of data. Furthermore, existing machine learning models in one domain can be used to rapidly achieve state of the art sortation performance in entirely new domains, where overlapping materials are present.

Figure 3:
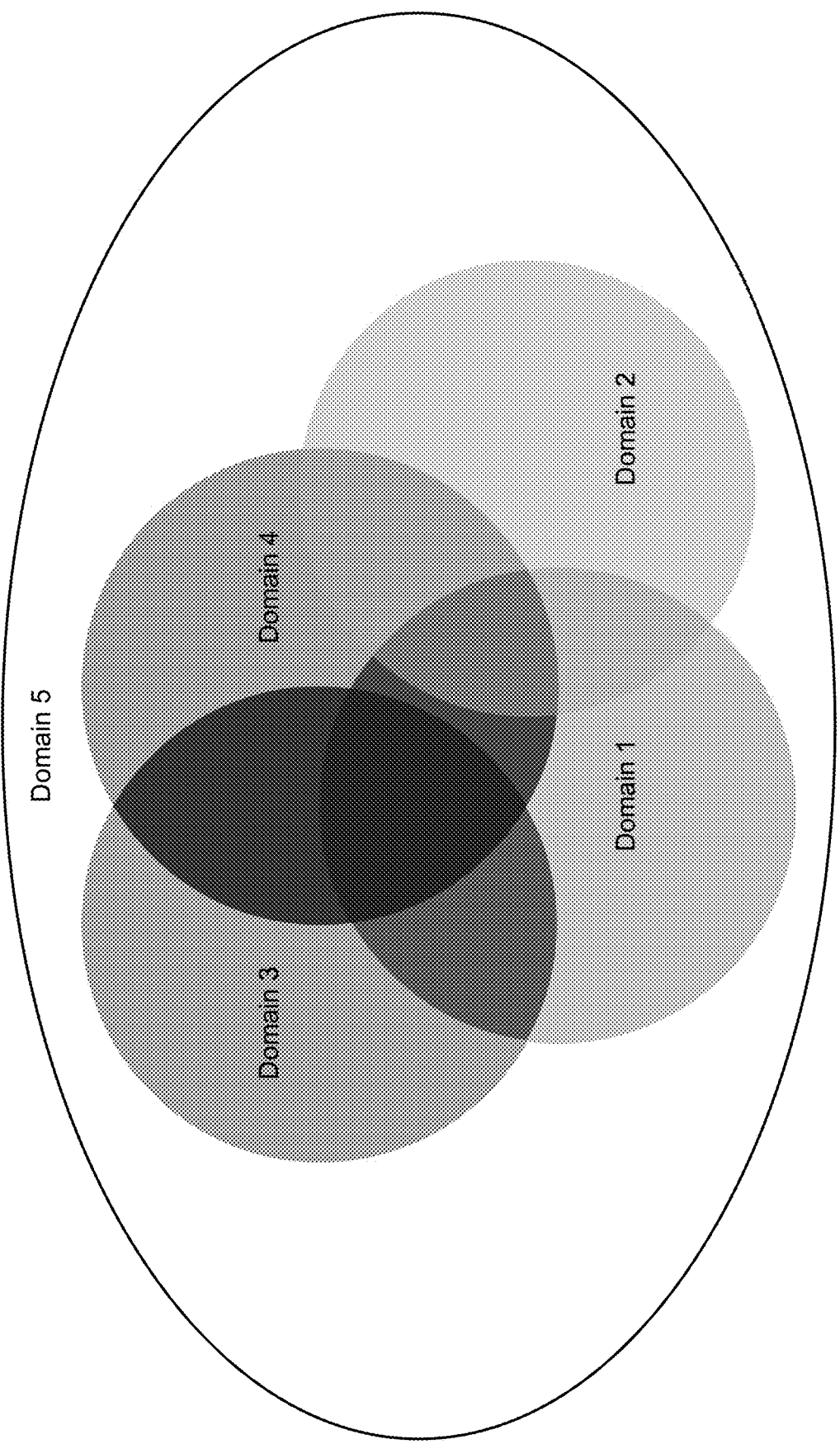
FIG. 3 shows an example Venn diagram of material domains that include some overlapping material.

FIG. 3 shows an example Venn diagram of material domains that include some overlapping material. In the example of FIG. 3, Domains 1 through 4 are each included within the greater Domain 5. Domains 1 and 2 share overlapping materials, Domains 1 and 3 share overlapping materials, Domains 3 and 4 share overlapping materials, Domains 2 and 4 share overlapping materials, and Domains 1 and 4 share overlapping materials. In the example of a municipal waste sorting system, a machine learning model corresponding to Domain 3 (e.g., single stream recyclables) can be trained to sort plastics and glass materials, and a second machine learning model associated with Domain 1 (e.g., organics) can be trained to recognize organic materials. In addition, a machine learning model associated with Domain 2 can be trained to recognize e-waste and a machine learning model associated with Domain 4 can be trained to recognize construction and demolition, as examples. As the Venn diagram of FIG. 3 illustrates, while each domain is different, there is overlap between them, as different materials are often (e.g., unintentionally or accidentally) mixed in with the materials of another domain. For example, it is common for non-single stream recyclable materials to be mixed in with single stream recyclable materials. As described above, the current system then continues the bootstrapping process for more capable object recognition by cross training between domains. By way of example, the label set derived by the machine learning model corresponding to Domain 3 (e.g., single stream recyclables) can be used to augment the training data for the machine learning model associated with Domain 1 (e.g., organics), using the predictions of object type achieved by the machine learning model corresponding to Domain 3. In this way, the machine learning model associated with Domain 1 (e.g., organics) adds the recognition parameters of the machine learning model corresponding to Domain 3 (e.g., single stream recyclables), without requiring the longer lead time and greater number of iterations necessary when starting from scratch and using only human annotation for a core machine learning model associated with Domain 1 (e.g., organics).

Returning to FIG. 2, in some embodiments, model training logic 202 is configured to use cross-domain data as pre-training for scenarios where bootstrapping is efficient, such as, for example, an adaptation/optimization for sorting of disparate recycling flow domains. For example, initially a general machine learning model is trained for object recognition across all items within a domain (e.g., plastics, glass, cardboard, etc. for single-stream recycling). In some embodiments, certain portions of the machine learning model are reusable across domains, and only these portions are then utilized to bootstrap (e.g., pretrain) for a new domain. For example, the neural model for object boundary detection (e.g., masks, bounding boxes, etc.) may be useful for identifying any objects in a similar conveyor belt environment, regardless of the domain, such as never-before-seen objects in construction and demolition or e-waste. For extension of the machine learning model to a new domain, the initial state of the machine learning model weighting matrix associated with boundary recognition is set to the end state of the general machine learning model. The new machine learning network is then bootstrapped such that boundary recognition starts from a useful and tested state (the initial machine learning of the mask/boundary head). As the model learns in the new domain, most of the machine learning then occurs in other stages, such as in object classification rather than in re-learning boundary recognition. In some embodiments, the machine learning model is used to identify materials that overlap between the domains, such as identifying plastics within an organics stream, using a single-stream recycling machine learning model. Transfer learning across recycling domains is particularly efficient because of the overlap between domains related to boundary recognition, and important because of the large variety of object characteristics to classify.

In some embodiments, model training logic 202 is configured to modify (e.g., core) machine learning models associated with a broader category of materials to recognize new object types within the broader category of materials. In some embodiments, a core machine learning model can be generated to recognize objects of a material type (e.g., plastics or glass). In some embodiments, model training logic 202 is configured to train a core machine learning model (e.g., a neural network with existing weights across its parameter set) with annotated data associated with one or more specific variants or objects within a sub-category of the broader category associated with the core machine learning model. By training core characteristics of an object type into a common machine learning model backbone, similar or variant objects may be added without a full retraining of the system by simply training a new output layer that adds only small amounts of additional computation over the core backbone. In some embodiments, the "new output layer" comprises a new instance/copy of the core model with its original output layer replaced by the new output layer. In some embodiments, to obtain the new output layer comprises to modify the core model itself by adding on a new output layer (e.g., a sub-head) to its existing output layer. When a core model is retrained to add a sub-head, back-propagation does not go through the backbone, and only the new classification head is trained (and in doing so only uses a small fraction of the data that is used on a typical training—only what is needed to ensure performance of the new sub-head). Thus, new object recognition can be added to the system quickly and without requiring a laborious retraining of the core models, thereby allowing dynamic expansion of the machine learning recognition capabilities. For example, the annotated data associated with one or more specific variants or objects within a sub-category of the broader category associated with the core machine learning model comprises annotated sensed data (e.g., images) of variant objects or objects of the sub-category. The resulting augmented or modified machine learning model is then configured to recognize objects that are associated with being a variant or of a sub-category of the broader category. One problem to solve in materials sorting is the management of a large number of object material characteristics in a heterogeneous stream of materials to be sorted. For example, one such challenge is object recognition on objects in various states (e.g., a crushed, broken, torn, partial version of a particular object or type of object). As more material characteristics are added to the recognition capabilities of machine learning models that are used at sorting facilities or at the cloud sorting server, the system must be able to maintain adequate compute performance while still adapting and also efficiently adding the ability of machine learning models to recognize new types. A problem solved by various embodiments described herein for heterogeneous material sorting is a machine learning approach that adapts dynamically to a vastly larger scale than previous systems. By augmenting the core machine learning models with additional output layers to recognize new variants or states of an object, the system core performs at the same level regardless of scale, relying on the newly added output layers of the models to perform the processing on a potentially unlimited number of material characteristic variations. In this approach, the core machine learning models provide shared visual context that the added output layers can use to learn new classifications on the original object while requiring far less data than would traditionally be required to train a supervised classifier. This approach has been adapted to a broad variety of core machine learning architectures so that model training logic 202 can flexibly add new classifications of the object.

In some embodiments, model training logic 202 is configured to dynamically modify core machine learning models with new output layers in response to training trigger events. In some embodiments, the training trigger events can be generated based on sensed data in material streams that are detected at remote sorting facilities. For example, data sensed (e.g., images captured) at one or more sorting facilities may include objects that are not identifiable (e.g., cannot be recognized with a higher than a threshold confidence level) using one or more existing core machine learning models and in response to the sorting facilities' determination of unidentified objects, model training logic 202 can receive the sensed data to use as training data (e.g., after the sensed data becomes manually annotated) to modify the core models. In some embodiments, core models can be dynamically and quickly modified by model training logic 202 with new training data (e.g., within the same day or even hours relative to when the training trigger event is received) because the core models will not need to go through extensive retraining.

In a first example of modifying a core machine learning model corresponding to an object or a category of objects to obtain a modified machine learning model that can identify a variant of the object or a subcategory of the objects, a core machine learning model that has been trained to recognize a full, vertically-oriented bottle manufactured by company Acme can be modified to learn to identify the same bottle in various positions, but also partly-full or empty variants, dented or crushed variants, or variants with pieces missing, and variants "welded" to other material. The heterogeneous nature of the sorted material described herein requires both the rapid addition and recognition of new objects (e.g., the new plastic cell phone case), but also a large number of variations on an object type. The nature of material sorting, particularly in the area of recycling, requires the ability to identify a specific object in a nearly infinite number of configurations or partially constructed states, and will likely encounter new variants on a regular (e.g., daily) basis. For example, a laundry detergent container would need to be recognized in any state of disarray, whether it contains liquid or not. The container may have been crushed to a virtually two-dimensional shape (e.g., flattened) or torn apart such that individual pieces are not recognizable, it may be contaminated with other materials, discolored or degraded from repeated crushing and admixture with other materials, or occluded in a material stream. Various embodiments described herein describe using a highly scalable output layer approach to support large numbers of variations of objects based on their material characteristics. These characteristics include but are not limited to orientation, empty/full states in containers, and various states of compression or destructions. Additionally, this approach allows for such new output layers to be trained with significantly smaller amounts of training data, limiting the investment needed to train the system on an additional characteristic. This is particularly useful in the space of recycling where hundreds of thousands of categories are desired for full monitoring of the waste stream, and where the makeup of categories changes semi-regularly. In a second example of modifying a core machine learning model corresponding to an object or a category of objects to obtain a modified machine learning model that can identify a variant of the object or a subcategory of the objects, a core machine learning model that has been trained to recognize a bottle manufactured by company Acme can be modified to learn to identify the same bottle with bottle labels of different designs that are wrapped around the bottle.

In some embodiments, model training logic 202 is configured to train a machine learning model based on training data that comprises sensor feedback from multiple types of sensors. Specifically, in some embodiments, model training logic 202 is configured to create and maintain a machine learning model to identify materials by visual and non-visual attributes. In some embodiments, a sorting facility may include one or more vision sensors (e.g., visual spectrum IP cameras) and one or more non-vision sensors (e.g., frequency spectral analysis or other techniques) that detect material characteristics based upon non-visual material properties (e.g., frequency spectral analysis or other techniques). An application of this approach is for automated training of the machine learning models or other forms of artificial intelligence to improve recognition over a broad range of materials. In some embodiments, this can be performed by, during the training stage by model training logic 202, generating sensor data from two or more types of sensors (e.g., vision and non-vision) on a wide set of known materials (e.g., at one or more sorting facilities) and then annotating the sensed data with visual characteristics (e.g., the location/bounding polygon of each object) and non-visual characteristics (e.g., the reflectivity data on the objects), in order to automatically train the system to recognize these materials using any combination of visual and non-visual cues. Then, during the inference stage (e.g., when the machine learning model is applied by a compute node or sorting device at a sorting facility during runtime), the reflectivity data output from a non-visual sensor comprising a near infrared (NIR) sensor is passed as input into a machine learning model, along with the vision sensor data captured in the pixel space (i.e., the image from the vision sensor). The two data vectors (one vector comprising the pixel values of the image and the other vector comprising the NIR non-visible reflectivity) enable the machine learning model to correlate the fused data and thus map attributes such as polymer type to visible objects to recognize objects based on the dual inputs of the two different types of sensor data. A first example way to train the machine learning model to recognize an object based on inputs of both visual and non-visual sensor data on the objects is to add a fourth channel to the visual (e.g., RGB) data and then pass that training data through the model as normal. A second example way to train the machine learning model to recognize an object based on inputs of both visual and non-visual sensor data on the objects is to build a separate model (e.g., neural network) for the non-visual (e.g., NIR) data that mimics the RGB network, run the training data through both models, and then combine the features at the end. A third example way to train the machine learning model to recognize an object based on inputs of both visual and non-visual sensor data on the objects is to build two separate models (e.g., neural networks) but allow data to flow between the two; i.e., at various points in the backbone, combine the NIR and RGB features, potentially run the combined data through a convolution, and then split back into their own models again. Instead of simply recognizing a plastic type, for example, such a machine learning model can identify objects at the granularity of their SKU or brand based on the combinations of visual and non-visual sensor data.

In some other embodiments, separate models may process each raw signal, visual and otherwise, fusing an intermediate representation of those signals for fusion and prediction. This latter approach can be more computationally efficient and allows designing the machine learning architecture in a way that is tailored to each raw signal. Note that these approaches differ from the state of the art in optical sorting as they use the machine learning approach on the hyperspectral data to enable the system to learn to identify objects from a combination of sensors. For example, hyperspectral sensor feedback on objects in combination with other sensor data (such as vision-based cameras) on the objects can be used by model training logic 202 in conjunction to train a machine learning model to learn to recognize objects that are a combination of an object type and material characteristic. For example, during the training stage, reflectivity data of an object that is obtained from an NIR sensor may be utilized to determine the material characteristic polymer type of that object (e.g., bottle), or even other bottle conditions, e.g., wrapper state, wrapper polymer, cap state, cap polymer, contaminants present, if the object contains a nylon barrier layer, etc. Based on this NIR prediction (e.g., the material characteristic polymer type and/or the state of the object state/conditions), model training logic 202 can enable the creation of a labeled image dataset that includes the images of the object that are annotated/labeled with the locations of the object and its material characteristic polymer type, which may then be used to train a machine learning model that accepted visual/image data as input. Then, during the inference stage (e.g., when the machine learning model is applied by a compute node or sorting device at a sorting facility during runtime), only visual/image data of an object need be input into the machine learning model to cause the model to classify the object into a material characteristic polymer type by correlating the appearance of that object in the image data with its material characteristic polymer type. Furthermore, although the training approach uses multiple sensors, the machine learning model may be trained to recognize visual variations that indicate material characteristics that were originally only recognizable under hyperspectral analysis. For example, such an automated training process can enable model training logic 202 to match visible fracture patterns or light diffraction patterns (e.g., in the pixel values of the image data) to polymer types (e.g., that are labeled/annotated in the image data). In this way, the system may be trained using a comprehensive set of sensors (e.g., vision and non-vision sensors), but implemented using a more cost-effective smaller subset of sensors (e.g., only vision sensors) and still be able to identify specific polymer types (or any other material). In some embodiments, during the training stage of a machine learning model by model training logic 202, different sensor types may be coordinated using a multi-step sensing process whereby materials are stimulated by a sensor (for example through IR emission) and sensed by another detecting the resulting material emission. Alternatively, sensors positioned in different locations/angles can provide a more complete visual or non-visual representation of the object, where the combination of multiple sensors results in a higher recognition rate.

In some embodiments, model training logic 202 is configured to obtain or generate machine learning models that correspond to various new objects. In some embodiments, a machine learning model that corresponds to a particular object is sometimes referred to as "object models." For example, sufficient training data that is annotated with the new objects may not be available because the new objects are new and therefore, an insufficient amount of sensed data on such objects has been obtained at sorting facilities. For example, a new object can be a bottle that is of a new shape/dimension/design (e.g., the bottle of a new beverage) or a bottle of a known shape but includes a new (e.g., seasonal) wrapper. For example, a new object for which an object model is obtained by model training logic 202 may be associated with a new SKU. It is desirable to be able to input new object descriptions and variations of objects (e.g., based on machine learning or a priori descriptions) and to have such objects be added to the compute capabilities of any compute node in the system (e.g., across the cloud sorting server and sorting facilities). For example, a new disposable smartphone case may be developed that is recyclable. The manufacturer desires a high recycling rate for the product and provides an object model for the case that can be input into the cloud sorting server via model training logic 202. An object model may be implemented in different forms suitable for ingestion. In a first example, a third-party (e.g., manufacturer) may create a machine learning model (e.g., a neural network model) for the desired object by running actual samples through a test machine learning vision system. In this case, the outputted neural network model is a data structure containing neural weights associated with the training output. In a second example, the manufacturer provides CAD and material files, and a neural network model is created by model training logic 202 a priori using a software algorithm that reads the files and generates a neural network model in the format (e.g., a weighting matrix) utilized by the machine learning software. In a third example, the system operator may initiate building the machine learning model by running variants of the object(s) through the training process (e.g., one or more sensors to obtain sensed data and then manually annotating the sensed data to then use as training data), or a manufacturer may provide exemplary objects for use by the operator in this approach.

In some embodiments, model training logic 202 is configured to generate and/or modify/train a machine learning model using "synthetic data." In various embodiments, "synthetic data" comprises training data (e.g., labeled images) that is generated based on a computer rendered three-dimensional (3D) model (as opposed to real-world data such as images of a physical object). In some embodiments, model training logic 202 is configured to use synthetic data to augment or replace real-world data to use to train a machine learning model. By using synthetic data to train a machine learning model (e.g., to augment or bootstrap the machine learning model, for example), many unique SKUs and scenarios associated with material sorting can be supported in a more efficient fashion. In many cases, augmenting real-world data (e.g., images and metadata associated with physical objects) with synthetic alternatives is the only realistic mechanism for training edge-case or difficult scenarios. In some embodiments, synthetic data is created (e.g., by a manufacturer or sorting system processor or a third-party) for a target object. For example, Coffee Company Acme can scan images of a new Coffee Company Acme container SKU, and utilize a 3D graphics engine (such as Unreal engine, or Unity, for example) to generate an accurate 3D model of the coffee container. Once created, the rendered 3D model can be manipulated (e.g., programmatically by model training logic 202) to display any position or angle, and even deconstructed or "damaged" to create multi-angle views of crushed, torn, or otherwise mangled versions of the 3D model of the coffee container object. Lighting angles, backdrops, reflectivity, shading, surface staining, and even occlusion by other objects may be manipulated to provide a comprehensive set of two-dimensional (2D) images showcasing the coffee container object in virtually any orientation and condition. In some embodiments, model training logic 202 is configured to input the 3D models of objects into a computer software program with data models representing all desired orientations and conditions of each object. The software then outputs a set of digital images and metadata representing the object in the desired state. Once created, model learning logic 202 is configured to use new (e.g., annotated/labeled) synthetic digital data (2D images and/or metadata) as another form of training data for a machine learning model, using the same techniques described elsewhere for training. In some embodiments, the machine learning model that is to be modified with training data comprising synthetic data is generated from real-world data (e.g., images of physical objects captured at sorting facilities), and then refined or augmented with additional synthetic data. In some embodiments, the machine learning model that is to be modified with training data comprising synthetic data is an existing machine learning model that is associated with an object type that is associated with the object of the synthetic data. For example, the existing machine learning model is associated with coffee containers and the synthetic data is specifically associated with a new coffee container that is manufactured by Coffee Company Acme. In some embodiments, a machine learning model is bootstrapped with synthetic data and then tested and retrained using real-world data (e.g., that is obtained from object recognition devices at sorting facilities). By using synthetic data as the baseline, model training logic 202 can quickly generate a very complex machine learning model and put it into service (e.g., send the model to components at sorting facilities for the sorting facilities to use in production/runtime) to address new forms of object identification (e.g., at the recipient sorting facilities). This machine learning model that had been trained on synthetic data can then be refined using the real-world production data (e.g., that is captured by object recognition data at the sorting facilities). In some embodiments, primary labels in a machine learning model can be augmented by training with specific synthetic data, resulting in more robust object identification capabilities for the core machine learning model. In some embodiments, model training logic 202 is configured to obtain a 3D model of an object by inputting one or more real-world images of the object to a 3D modeling engine, with the result that synthetic training data is generated spanning hundreds or thousands of 2D images of the object in various states. For objects with commonality across SKUs (e.g., ketchup bottles), synthetic data can be generated for multiple brands and types of ketchup bottles, and then used to train the machine learning model that is configured to recognize these object variants. In this way, the machine learning models that are generated and used across sorting facilities may be optimized to support very large object sets spanning many brands and manufacturers. In some embodiments, model training logic 202 is configured to generate SKU-level object labeled digital images using synthetic data, and augmented with metadata describing or referencing material characteristics (e.g., plastic types, reflectivity, adhesives and labels, contents, etc.). The SKU-level object labeled digital images can then be used to train a machine learning model and the resulting machine learning model may then be bootstrapped with both the object images and the associated data needed to map objects (e.g., that are being processed at sorting facilities) to material characteristics for further sorting.

In some embodiments, model training logic 202 is configured to cryptographically sign (e.g., using a private key associated with the cloud sorting server) software packages before sending them (over one or more networks such as a WAN) to compute nodes and/or sorting devices located at remote sorting facilities. For example, software packages include new or updated machine learning models (e.g., new object models, modified machine learning models, updated parent models). Upon receipt of a software package, a recipient compute node or sorting device at a sorting facility is configured to decrypt the package (e.g., using a public key associated with the cloud sorting server) and locally install the updated machine learning software. In some embodiments, model training logic 202 is configured to infer when compute nodes, conveyor devices, and/or sorting devices at a sorting facility have paused or slowed down operation. For example, model training logic 202 can detect changes in conveyance speed that exceed normal variations or duration. Based on a conveyance speed measurement (e.g., as determined using a Kalman filter model, local linearization, a sequential Monte Carlo method, or Bayesian filtering) (or other conveyance speed measurement), model training logic 202 is configured to determine that one or more sorting lines have paused operation. Based on this inference and (optionally) historical data, model training logic 202 is configured to opportunistically and automatically deploy new software packages over one or more networks to one or more compute nodes and/or sorting devices within the sorting facility to take advantage of the downtime.

Machine learning model storage 204 is configured to store the various types of machine learning models that have been generated or obtained at the cloud sorting server. In some embodiments, each machine learning model is stored as a set of layers and weights corresponding to each layer. One example machine learning model is the neural network. A neural network includes an input layer and an output layer and also several hidden layers in between. In some embodiments, machine learning model storage 204 is configured to store machine learning models that are generated, obtained, and/or modified by model training logic 202 including, but not limited to, one or more of the following: neural networks, reinforcement learning models, support vector machines, regression models (logistic or otherwise), and Bayesian inference models. In some embodiments, machine learning model storage 204 comprises a software database. Examples of such a database include a relational database (e.g., SQL), a text-based list of parameter values, a time series (unstructured) database, data lake, or another non-sequence database. The SQL database may be used to manage configuration and dynamics parameters associated with facility-based components (e.g., object recognition devices, sorting devices, conveyor devices, and/or compute nodes), neural net or object metadata (e.g., bounding box/mask values, hierarchical structure, components in training sets, etc.), or any other data used by the cloud sorting server that requires structured lookup and management. In some embodiments, machine learning model storage 204 may store neural network models in a data lake structure (e.g., in a cloud-based data lake). In some embodiments, object classifications may be stored unstructured in a data lake format (e.g., in ROSBAG format), as well as in a parsed, time-series view, or in a structured asynchronous view.

In some embodiments, machine learning model storage 204 is configured to store machine learning models that are trained on data (e.g., sensed data and/or metadata) that have been obtained from one or more sorting facilities. In some embodiments, machine learning model storage 204 is configured to store machine learning models that are trained on synthetic data and/or real-world data that have been obtained from one or more sorting facilities. In some embodiments, machine learning model storage 204 is configured to store machine learning models that are associated with individual domains and/or cross-trained on two or more domains that share overlapping materials. In some embodiments, machine learning model storage 204 is configured to store machine learning models associated with broad categories of materials and also modified versions of those models that correspond to variant objects or a subcategory of objects within those categories. In some embodiments, machine learning model storage 204 is configured to store machine learning models that are associated with new objects. In some embodiments, machine learning model storage 204 is configured to store machine learning models that have been trained on sensor feedback associated with two or more sensor types. In some embodiments, machine learning model storage 204 is configured to store machine learning models that are configured to identify the bounding polygon (e.g., bounding box) around each identified object.

Training data interface 206 is configured to obtain training data that is to be used by model training logic 202 to train/retrain/modify machine learning models. In some embodiments, training data interface 206 is configured to receive manual data entry, upload of training data from third-party sources (e.g., object manufacturers), as well as the (e.g., periodic) aggregation of training data from one or more remote sorting facilities. A first example of training data that is aggregated from one or more remote sorting facilities includes data sensed by one or more object recognition devices located at the sorting facilities. For example, the data sensed by one or more object recognition devices located at the sorting facilities can be individual images or a composite of multiple images (e.g., such as "panoramas"). A second example of training data that is aggregated from one or more remote sorting facilities is metadata that is uploaded by compute nodes and/or sorting devices located at the sorting facilities. Examples of sorting facility specific metadata include operational data, raw sensed data, processed sensed data (e.g., panoramas), error logs, and data on identified objects traversing a conveyance system, their attributes, and information regarding placement and pick or harvesting of the target objects. For example, operational data associated with a particular sorting device that involves a robotic arm and picker mechanism may be sent as a part of the management system. For example, data on identified objects can include a unique identifier associated with each identified object, classification information that is from a compute node at the sorting facility, bounding polygons around each identified object, the centroid of the identified object, and spatial parameters of the identified object. As objects are collected/harvested into collection containers, additional data is generated and included in the metadata related to identified objects. This may contain times and positions for target harvesting operations, as well as information related to successful and unsuccessful harvesting operations. The classification of an identified object may comprise labels for object type (e.g., the primary object type such as a bottle), as well as sub-labels describing various attributes (e.g., orientation, liquid, affixed labels, fracture patterns, color, plastic type, etc.). In addition, the data on identified objects can also include information related to the position of the object(s) relative to the compute nodes and the sorting devices at the sorting facility. Operational data associated with a particular sorting device may include parameters such as projected component lifespan, harvest efficiency, timelines or other information related to object harvesting, component lubrication, temperature, sorting device maintenance information, and other performance metrics. In each case, metadata may be formulated by a system component at a sorting facility (e.g., by the processor in a sorting device or a processor in a compute node) and stored locally, or transmitted to the cloud sorting server. One or more SQL databases can be utilized for structured data or unstructured data. These databases store various object data that can be used by model training logic 202 to train machine learning models (e.g., for polygon data related to masks or bounding box) as well as labeling information. The following are some specific examples of metadata parameters that can be obtained from one or more sorting facilities:

UUID of the individual observation
Primary label (e.g., object primary classification)
Sub-labels (e.g., object attributes)
Predicted area of the object
Predicted spatial bounding polygon (e.g., box) of the object in belt frame
Centroid of the contour comprising the observation in belt frame
Predicted spatial convex hull of the object in belt frame
UUID of a tracked object
Human-readable name of the drop location for the object
Visible size of the object
Location where the object was placed relative to the sorting device
Time the object was selected for harvest or rejected
Time the object was either harvested or a failure was detected In some embodiments, the training data metadata obtained at training data interface 206 is stored at training data storage 208.

In some embodiments, training data interface 206 is configured to enable manipulations and annotations of obtained training data. In some embodiments, training data interface 206 comprises a user interface that is configured to allow data scientists and operators to manipulate training data that is stored at training data storage 208 (e.g., select a subset of images and/or metadata) and assemble it into training queues. In some embodiments, training data interface 206 comprises a user interface to enable manual annotation of at least a portion of the training data that is stored at training data storage 208. The user interface that is configured to receive manual annotations may include one or more of the following: a command-line interface, graphical screens showing images, masks, bounding boxes, and links to external tools. The annotation user interface can support both the manual labeling of data objects (e.g., the assignment of the label "PET" to an image of a plastic bottle) as well as automated labeling tools. Automated labeling can provide tools to automatically group similar subsets of the data for group labels (e.g., automatically group a set of training data known to be associated with aluminum cans), as well as tools to more effectively refine the data, by removing data that contains few objects, is corrupt, or is otherwise low-value to improve the model (e.g., as measured by model uncertainty or class-loss). In some embodiments, training data interface 206 is configured to apply one or more machine learning models stored at machine learning model storage 204 to at least a portion of training data that is stored at training data storage 208 to determine labels corresponding to the training data. In some embodiments, such machine learning model output labels are programmatically stored as annotations corresponding to the training data. In some embodiments, such machine learning model output labels are first confirmed by data scientists or operators before being stored as annotations corresponding to the training data. As such, an operator of the system can easily support the ingestion or creation of new object models to be utilized by the machine learning system to facilitate object capture.

Model evaluation logic 210 is configured to provide the functions needed to perform detailed analysis of machine learning models (e.g., models stored at machine learning model storage 204). In some embodiments, model evaluation logic 210 is configured to implement a software function to create an optimized subset of label data for training. This function is implemented with automatic suggestions based upon label performance but, optionally, also with human input to tailor specific training. In some embodiments, model evaluation logic 210 is configured to implement software to analyze and compare the performance across multiple training sessions. This analysis is provided both as numerical or statistical metrics and uses graphical representations of performance metrics (e.g., such as model convergence time, comparison of model accuracy against real data, etc.). In some embodiments, model evaluation logic 210 is configured to implement software to compare the performance of multiple machine learning models run against various training datasets. In some embodiments, model evaluation logic 210 is configured to enable comparisons of performance where multiple machine learning models are used for different aspects of the training data. For example, a general machine learning model for recognizing recyclable material may be run in parallel with a specific machine learning model that is highly optimized to recognize only hazardous material. These algorithms may run on a single processor or across multiple compute nodes in parallel. In this way, model evaluation logic 210 enables the evaluation of machine learning model processing performance to allow data scientists to evaluate cost and benefits associated with parallel processing and the implementation of specific models for varying object types. In some embodiments, model evaluation logic 210 enables this type of evaluation using a single machine learning model with varying output labels based on specific target identification needs. In such embodiments, instead of a separate machine learning model associated with hazardous material, new output layers are added into the general neural model for object recognition. In some embodiments, model evaluation logic 210 is configured to automatically generate metrics per each sorting facility or portion thereof. Automatic metric generation can be performed per facility, per line type, or per domain. For example, thresholds can be automatically configured such that a (e.g., statistically significant) number of examples (e.g., images) for each target object can be run through model evaluation logic 210 with different models and configurations, and then the best model is determined for the selected sorting facility or portion thereof. The models can be compared using a cost function analysis.

In some embodiments, model evaluation logic 210 is configured to provide numerical and statistical analysis tools to enable analysis and tracking of label performance. In some embodiments, model evaluation logic 210 is configured to provide automated calculations of cross-entropy loss functions for data sets using candidate machine learning models and labels. In some embodiments, model evaluation logic 210 is configured to provide functions to analyze specific label performance across any target data set, including automatically analyzing label performance from real data sets (e.g., obtained from compute nodes at one or more sorting facilities). In some embodiments, model evaluation logic 210 is configured to fully annotate full videos of data, which differs from standard annotation in that annotated items must be correlated across time. These annotated videos are then used as an evaluation test set by model evaluation logic 210 to provide detailed metrics on model performance.

Report generation logic 212 is configured to provide the operational data and reports/visualization for one or more sorting facilities. In various embodiments, report generation logic 212 is configured to provide the operational data and reports/visualization for one or more sorting facilities associated with the components (e.g., object recognition devices, conveyor devices, sorting devices, and compute nodes) located at the sorting facilities. In some embodiments, report generation logic 212 is configured to obtain, over one or more networks, operational data from components (e.g., compute nodes) that are located at the sorting facilities. In some embodiments, report generation logic 212 is configured to implement multiple databases for the storage and manipulation of incoming data feeds. One or more time-series databases are used to log system events, including all metadata (as described above) associated with field components. Metadata and configuration data for field devices or object recognition may also be stored in an SQL database. In some embodiments, report generation logic 212 is configured to manage fleet operational data, and incorporates a user interface to facilitate analysis and decision-making. Part of the user interface is a set of APIs/interfaces to the operational data. In some embodiments, report generation logic 212 includes a management plane dashboard, enabling analysis of real-time and historical data patterns for all of the collected data. In some embodiments, report generation logic 212 provides analytics software functions, including: a database of material types and characteristics utilized by machine learning models; all device maintenance information including robot statistics, uptime, errors, component health and longevity, etc.; configurations for sorting devices (e.g., robots, suction grippers, diverting mechanisms) in the field; and reporting functions enabling reports for any of the data types. Sample reports include material processed (e.g., by count, type, mass, etc.) as well as reports on algorithm performance in individual sorting facilities. In some embodiments, report generation logic 212 is configured to generate reports corresponding to various sorting facilities using the data collected from the respective sorting facilities.

Sorting logic 214 is configured to receive sensed data (e.g., signals) (over one or more networks) from object recognition devices located at one or more remote sorting facilities, apply one or more machine learning models (e.g., stored at machine learning model storage 204) to the sensed data to recognize one or more target objects, and then send control signals to sorting devices located at the one or more remote sorting facilities to cause the sorting devices to perform sorting operations on those target objects. Where the networks that connect the cloud sorting server and the components (e.g., object recognition devices and/or compute nodes) are reliable and fast, in some embodiments, the cloud sorting server can receive sensed data (e.g., images or other sensor data) on objects from remote sorting facilities, apply machine learning to the received sense data, and send control signals to the sorting device(s) at those sorting facilities to perform sorting operations to place identified target objects into collection containers in addition to or in lieu of the compute nodes/sorting devices local to the sorting facilities performing similar functions. In some embodiments, sorting logic 214 is configured to identify an object type (e.g., at the SKU-level or at another granularity of object type) and/or a material characteristic of a target object by inputting sensed data on the target object into one or more machine learning models and then query chemical database 216 to look up chemical properties that correspond to that classification. In some embodiments, after looking up the chemical properties of an identified target object, sorting logic 214 can determine a corresponding collection container to cause the target object to be deposited into and/or track (e.g., by storing in the data structure associated with the target object) the determined chemical properties of the identified target object.

One advantage to having sorting logic 214 of the cloud sorting server control remote sorting devices to perform the sorting operations on target objects is because the cloud sorting server may include a greater number and also more updated machine learning models (e.g., stored at machine learning model storage 204) to apply to sensed data to recognize target objects. Furthermore, because the cloud sorting server is communicating to multiple sorting facilities, sorting logic 214 of the cloud sorting server could have insight into other sorting facilities that can be used to inform the sorting at a particular sorting facility. For example, the cloud sorting server could aggregate data on what types of objects are being harvested during a given period at a first sorting facility and use that information to determine whether additional ones of the same types of objects should continue to be harvested at a second sorting facility or if the second sorting facility should instead target different types of objects. Additional details regarding how sorting logic 214 is configured to identify target objects and generate control signals associated with controlling sorting devices to perform sorting operations on the target objects are described further below with the example compute node that is described in FIG. 5.

Chemical database 216 is configured to store mappings between object/material classifications with chemical properties. The production of commodities with controlled chemistries is a central task and challenge for industries such as, for example, the recycling industry. Commodity streams have significantly more value if their chemical properties are controlled and known. The lack of such information currently holds back the value that can be extracted in several ways. There is first the problem that it is difficult to create material streams that adhere to a material specification. There is second the problem of verifying if a particular material stream does meet a specification or not. There is then a third problem where many material properties may be difficult or impossible to detect directly. In some embodiments, sorting logic 214 of the cloud sorting server can use one or more of a vast library of machine learning models (e.g., stored at machine learning model storage 204) to identify the classifications of a target object. For example, this "classification" may be its stock keeping unit (SKU), a form factor, a brand, or other classification that reveals information about its source or how it was manufactured. Chemical database 216 is configured to store mappings between chemical properties and object classifications (or material classifications) so that it is possible for sorting logic 214 to query chemical database 216 with the identified classification of a target object (that is located at a sorting facility) to look up the chemical properties of that classification. For example, the chemical properties that are stored in chemical database 216 can be determined by studying the material carefully offline, such as using chemical analysis techniques that are too expensive or time consuming to do during the recycling process and/or consulting with the manufacturer(s) of that object for the relevant material properties.

Figure 4:
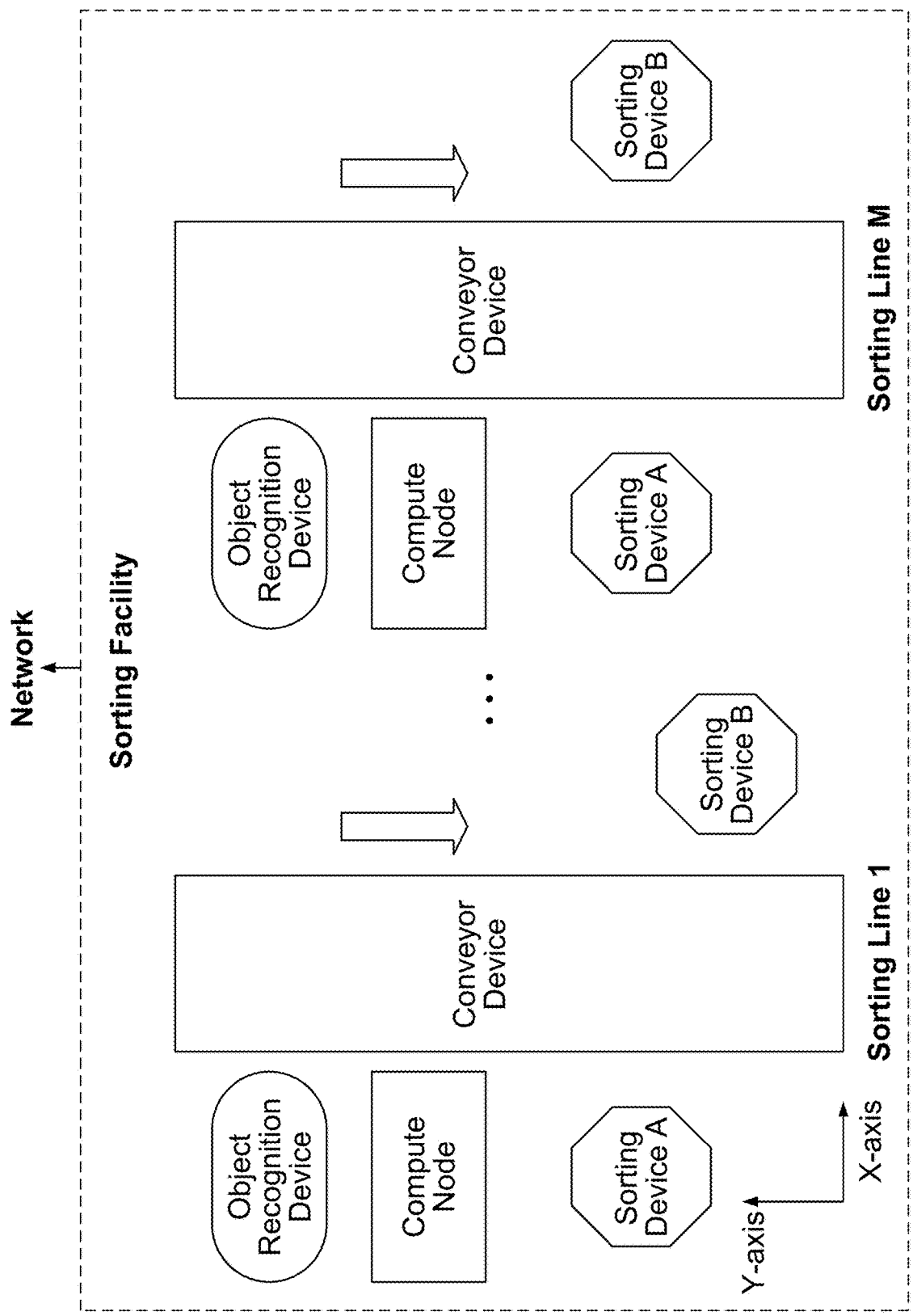
FIG. 4 is an example schematic of a sorting facility.

Examples of chemical properties that can be stored for an object type or other classification in chemical database 216 may include:

The plastic resin
The plastic resin of attached material, such as caps or labels
Additives to the object, such as flame retardant, bromides, benzenes, or other toxins
Dies, pigments, and other filler materials
Intrinsic viscosity, melting point, fracture properties
Packaging contents (e.g., if it holds soda, juice, water)
Liners and their constitution, such as plastic liners used in paper cups
Bleach content for paper-based materials
Region of origin and manufacturing date range
Label adhesive contents
Melt points
Possible conversion processes
Any other chemical property FIG. 4 is an example schematic of a sorting facility. In order to manage the cost/complexity (e.g., maximize the correct identifications of target objects at minimal cost) while reaching high purity levels for collected objects at sorting facilities (i.e., few false positives among collected objects) for a fast-moving heterogeneous stream of materials, it is desirable to have a machine learning system that can fully utilize all monitoring and picking components at its disposal. To that end, in various embodiments, one or more of low-cost object sensors (e.g., cameras, etc.) are used in object recognition devices to identify desirable target objects throughout one or more sorting lines within a sorting facility in order to optimize the efficiency of one or more sorting devices positioned at picking locations across the sorting line. Various embodiments use a plurality of sorting devices coupled to one or more object recognition devices to enable a software algorithm to optimize the path selection of target objects throughout the system or a portion of the system. In the example sorting facility of FIG. 4, the sorting facility includes sorting lines 1 through M. Each sorting line comprises at least one conveyor device, an object recognition device, a compute node, sorting device A, and sorting device B. FIG. 4 is drawn from a bird's eye perspective of the sorting facility. While not shown in FIG. 4, objects that arrive at the sorting facility are distributed across sorting lines 1 through M so that objects can be efficiently sorted in parallel across the sorting lines. Objects are transported along the Y-axis by the respective conveyor devices. While each of sorting lines 1 through M are shown in FIG. 4 to include one conveyor device, in actual application, each sorting line may have one or more conveyor devices, where conveyor devices are arranged serially so that objects that are not diverted from one conveyor device can fall off of one conveyor device in a sorting line and then land on a subsequent conveyor device in the same sorting line. While one object recognition device is shown to be placed at the side of a corresponding conveyor device in a sorting line, in actual application, there could be one or more object recognition devices that are placed anywhere relative to each of one or more conveyor devices in one or more sorting lines to capture sensed data on objects that are traveling across the conveyor device(s). Put another way, an object recognition device can operate independently of sorting lines and can capture sensed data from one or more sorting lines. In some embodiments, an object recognition device may include one or more vision sensors (e.g., cameras) and/or one or more non-vision sensors (e.g., to detect material characteristics based upon non-visual material properties (e.g., frequency spectral analysis or other techniques)). In some embodiments, multiple sets of sensed data can be captured by one or more object recognition devices with respect to an object that is transported across a series of conveyor devices in the sorting facility because the object recognition devices can be placed in different locations of the sorting facility. While one compute node is shown to be placed at the side of a corresponding conveyor device in a sorting line, in actual application, there could be one or more compute nodes that are placed anywhere in the sorting facility to obtain sensed data from the object recognition device(s) across any sorting line to apply machine learning model(s) (e.g., that are obtained from a cloud sorting server) to the sensed data to recognize target objects. Put another way, a compute node can operate independently of sorting lines and can receive sensed data from and send control signals to one or more sorting lines. As will be described in further detail below, in some embodiments, compute nodes are configured to identify target objects, trajectory, velocity, and relative position in a heterogeneous stream of materials at least in part from the sensed data, and then send control signals to sorting devices to cause the sorting devices to perform sorting operations on target objects to cause the target objects to be deposited into deposit locations (e.g., wherein collection containers (not shown in FIG. 4) are placed).

In some embodiments, the mixture of visual and non-visual raw sensed data that is received at the compute node from the vision and non-vision sensors are fused, and the enriched raw sensed data uses the machine learning training approach to predict attributions that can be derived from both visible and non-visible features. In a first example, during the sorting process at a sorting facility, objects move along a conveyor device in a sorting line and an object recognition device with a vision sensor captures visual sensor feedback (e.g., images) and feeds them to a compute node in the sorting facility. The compute node, in turn, analyzes the visual sensor feedback of objects by applying the machine learning models to recognize various visual aspects of those objects, along with relative position and velocity of each identified object. The compute node can then send the visual aspects of those objects, along with other information on those objects, to another object recognition device with a non-vision sensor and this non-vision sensor in turn analyzes potential target objects for non-visual material characteristics (e.g., emitted wavelengths, existence of metal, etc.). This additional sensed data (non-visual material characteristics) may be transmitted to a compute node. The compute node then uses a combination of the visual data provided by the vision sensor, the non-visual data provided by the non-vision sensor, and one or more machine learning models that have been trained to recognize a combination of visual data and non-visual data to recognize both the object type of the target object and other important material aspects, e.g., exact polymer type, moisture content, lignin/fiber content, metal type, density, mass, etc. In a second example, during the sorting process at a sorting facility, only visual sensor feedback is captured on objects in a sorting line by an object recognition device with a vision sensor. The visual sensor feedback is sent to a compute node, which is configured to apply a machine learning model that is configured to recognize both visual and non-visual characteristics of the objects associated with the feedback, despite not having received non-visual sensed data with respect to the objects during this inference stage. This is possible because the machine learning model had previously been trained on visual training data of objects that had been labeled with material characteristic labels that are determined based at least in part on non-visual sensor data on those objects, as described herein.

While two sorting devices (Sorting Device A and Sorting Device B) are shown to be on either side of a corresponding conveyor device in a sorting line, in actual application, there could be any number of sorting devices that are arranged either to the side of, above, or at the end relative to a conveyor device and that are instructed by compute nodes to perform sorting operations on target objects as they move along a conveyor device or between conveyor devices. As will be described in further detail below, different types of sorting devices are designed to perform different types of sorting operations on target objects that ultimately remove them from the sorting line and into collection containers. For example, a sorting device that comprises a sorting robot with arms that actuate one or more picker mechanisms is configured to perform a sorting operation by lowering onto a target object on a conveyor device and then gripping/capturing it before depositing the captured target object into a corresponding collection container. In another example, a sorting device that comprises an array of one or more diverting mechanisms (e.g., air orifices or paddles) is configured to perform a sorting operation by shooting air or swinging toward the target object (e.g., as it falls off a conveyor device) to direct the target into a corresponding collection container.

In some embodiments, the compute nodes within the sorting facility of FIG. 4 are further coupled to other devices within the sorting facility via one or more networks, or "device networks" (not shown). In some embodiments, a device network is an IP network, comprising wireless connections and wired ethernet connections. The compute nodes may be coupled to the device network via standard IP communications components, enabling communications and control of the object recognition devices and/or sorting devices. In this case, the compute node(s) may send instructions or messages to the object recognition devices and the sorting devices, and may receive sensed data from the object recognition devices or the sorting devices. In some embodiments, a device network may include segmented networks that are only accessible by a specific subset of devices/components within a sorting facility. For example, a processor running a machine learning model may be networked with one particular sorting device and one particular object recognition device, but no other processor can access those devices directly.

In some embodiments, the compute nodes within the sorting facility of FIG. 4 are further coupled to other devices within the sorting facility via a device network comprising a wired Modbus network. In some embodiments, instructions and data communications related to instructing sorting devices may be relayed via this network interface. In other embodiments, the compute nodes may communicate with the sorting devices via multiple network protocols. For example, a sorting device or compute node may receive IP-based instructions and relay them to another sorting device over the Modbus network. Alternatively, a compute node may communicate information directly to a sorting device via Modbus.

In some embodiments, the components within the sorting facility of FIG. 4 may be connected via one or more LANs, or LANs may be dedicated and segmented for a specific set of devices (e.g., one compute node, one object recognition device, and one sorting device on a separate LAN). In some embodiments, the components within the sorting facility of FIG. 4 may also include a connection to one or more WANs, enabling communications and data transfer between processors located in remote server locations (e.g., cloud services) and/or processors located at other sorting facilities.

Figure 5:
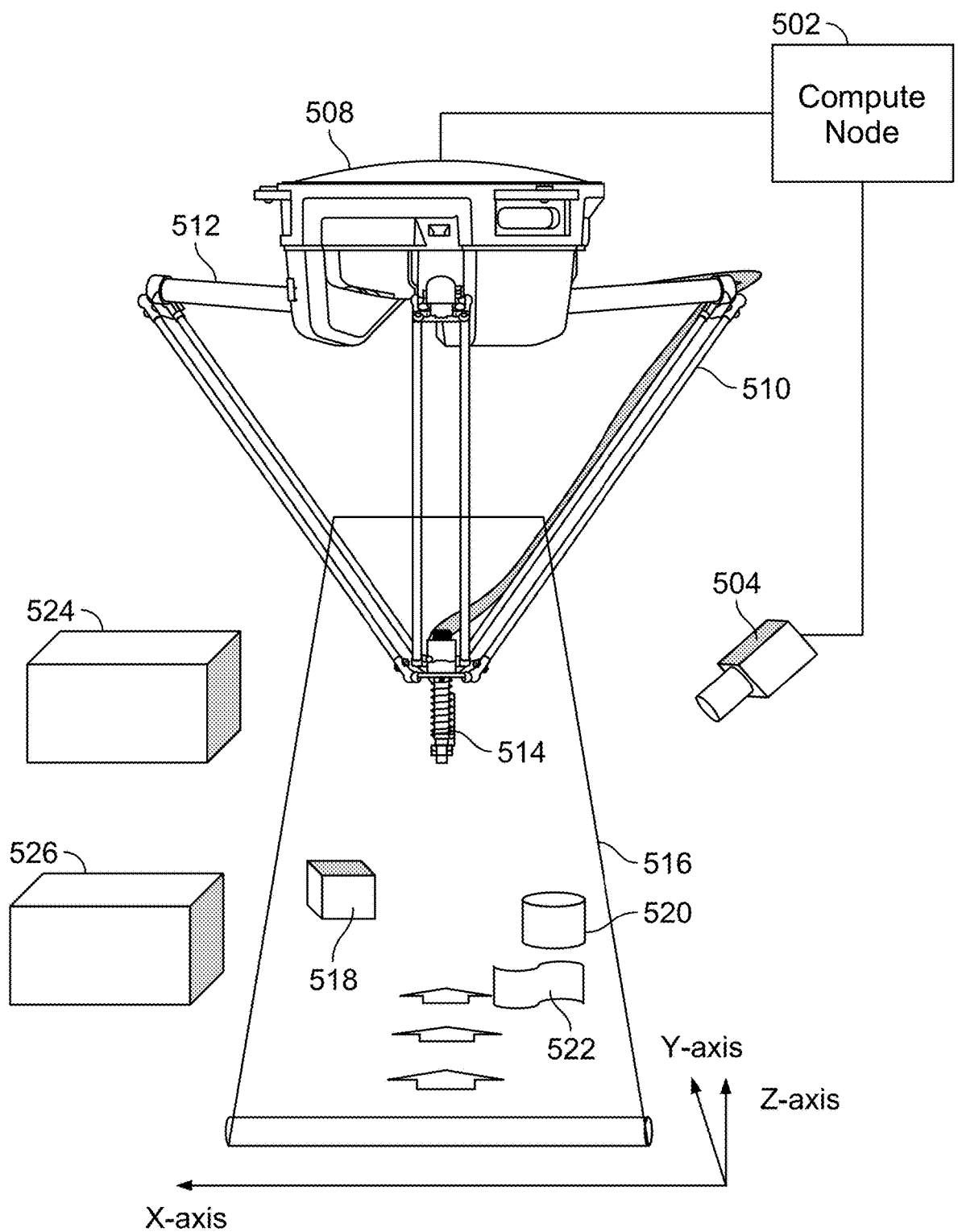
FIG. 5 is a diagram illustrating a first example of at least a portion of a sorting line.

FIG. 5 is a diagram illustrating a first example of at least a portion of a sorting line. In some embodiments, at least a portion of one or more of sorting lines 1 through M of the example sorting facility of FIG. 4 can be implemented using the example shown in FIG. 5. The at least portion of a sorting line that is shown in FIG. 5 includes conveyor device 516 (e.g., a conveyor belt) that is configured to transport objects towards sorting device 508. The at least portion of a sorting line that is shown in FIG. 5 further includes compute node 502 and object recognition device 504. As described above, components within a sorting facility, such as, for example, compute node 502, sorting device 508, and object recognition device 504, can be connected via one or more wired networks and/or one or more wireless networks. In the example of FIG. 5, sorting device 508 is positioned over conveyor device 516 and is a sorting robot that can actuate its arms 512 and 510 to move picker mechanism 514 across the X, Y, and Z axes. Material identified by compute node 502 for removal from conveyor device 516 is referred to herein as "target objects." For example, an object may be identified for removal if it is identified to be of a target material type. Although waste products traveling on a conveyor belt are used as example target objects in the example embodiments described herein, it should be understood that in alternate implementations of these embodiments, the target objects need not be waste materials but may comprise any type of material for which it may be desired to sort and/or segregate. Moreover, although a conveyor belt is used as an example conveyance mechanism for transporting the target objects within reach of picker mechanism 514, it should be understood that in alternate implementations of these embodiments, other conveyance mechanisms may be employed. For example, for any of the embodiments described below, in place of an active conveyance mechanism such as a conveyor belt, an alternate conveyance mechanism may comprise a chute, slide, or other passive conveyance mechanism through and/or from which material tumbles, falls, or otherwise is gravity fed as it passes by object recognition device 504.

Object recognition device 504 is directed at conveyor device 516 and is configured to capture information about objects on conveyor device 516 in order to discern target objects from non-target objects. For example, as described above, a "target object" is an object that is identified to meet a set of (e.g., dynamically configurable) target object criteria. For example, a set of target objects describes attributes (e.g., desired material type) associated with a target object. For example, a "non-target object" is an object that is identified to not meet the set of target object criteria. Object recognition device 504 is configured to capture information continuously (e.g., at a regular interval) and/or in response to a triggering event. Object recognition device 504 may comprise a vision sensor (such as, for example, an infrared camera, visual spectrum camera, or some combination thereof) directed at conveyor device 516. However, it should be understood that a vision sensor for object recognition device 504 is presented as an example implementation. In other embodiments, object recognition device 504 may comprise any other type of sensor that can detect and/or measure characteristics of objects on conveyor device 516. For example, object recognition device 504 may utilize any form of a sensor technology for detecting non-visible electromagnetic radiation (such as a hyperspectral camera, infrared, or ultraviolet), a magnetic sensor, a volumetric sensor, a capacitive sensor, a depth sensor (based on time of flight or stereoscopic imagery), or other sensors commonly used in the field of industrial automation. In some embodiments, object recognition device 504 is directed towards conveyor device 516 in order to capture object information from an overhead view of the materials being transported by conveyor device 516. Object recognition device 504 produces a sensed signal that is delivered to compute node 502. In a first example, the sensed signal that is delivered to compute node 502 from object recognition device 504 may comprise, but is not limited to, a visual image signal. In a second example, the sensed signal that is delivered to compute node 502 from object recognition device 504 may comprise, but is not limited to, a visual image signal and a non-visual signal.

Object recognition device 504 produces one or more sensed signals that are delivered to compute node 502 and which may be used by compute node 502 to identify target objects among the objects that are being transported along conveyor device 516. After identifying target objects among those being transported along conveyor device 516, compute node 502 is configured to send instructions (e.g., control signals) to sorting device 508 to cause sorting device 508 to actuate picker mechanism 514 to either capture/pick up a target object, or to drop off/place all picked up target objects by the picker mechanism into a (e.g., single) corresponding deposit location. Because conveyor device 516 is continuously moving (e.g., along the Y-axis) and transporting objects (e.g., such as objects 518, 520, and 522) towards sorting robot 508, the trajectories (e.g., along the X and Y-axes) of target objects 518, 520, and 522 are continuously changing. As such, object recognition device 504 is configured to continuously capture object information (e.g., image frames) that shows the updated positions of the target objects (e.g., such as objects 518, 520, and 522) and send the captured object information to compute node 502. As will be described in further detail below, compute node 502 is configured to apply machine learning models (e.g., obtained from a cloud sorting server, generated locally, and/or modified locally) to the sensed data captured by object recognition device 504 to identify the target objects on conveyor device 516. As will be described in further detail below, in some embodiments, compute node 502 is configured to use the sensed data captured by object recognition device 504 to determine trajectories (e.g., along conveyor device 516) of the identified target objects. For example, the trajectories of the identified target objects can then be used by compute node 502, sorting device 508, and/or other compute node(s)/sorting device(s) of the sorting facility to determine a sorting parameter associated with a sorting operation to be performed on a target object such as an optimal location to perform a capture of the target object. In some embodiments, compute node 502 is configured to publish determined information associated with each target object (e.g., the identified object type, the trajectory, the bounding polygon around the target object) on a message bus (with transient or persistent message queues) that is accessible by other compute nodes and sorting devices such that this determined information associated with the target object can be shared with other components of sorting facilities and enable other components to subsequently perform sorting operations on the target object.

In some embodiments, sorting device 508 is a sorting robot that can actuate its arms 512 and 510 to change the position of picker mechanism 514 across the X, Y, and Z axes based on target object information that is published by compute node 502 on a message queue. For example, sorting device 508 can locally compute object sorting parameters based on the published trajectory and/or identified object type of a target object and then use such sorting parameters to perform a sorting operation on the target object. In some embodiments, sorting device 508 is a sorting robot that can actuate its arms 512 and 510 to change the position of picker mechanism 514 across the X, Y, and Z axes based on instructions (e.g., control signals) received from compute node 502. For example, the control signals received from compute node 502 include object sorting parameters that are computed by compute node 502. Sorting device 508 is configured to use the object sorting parameters (e.g., that are computed locally and/or received from compute node 502) to control the position (e.g., location, orientation, and/or height) of picker mechanism 514 and to perform a sorting operation on a target object. For example, the sorting operation that is performed by sorting device 508 is to capture/grip a target object (e.g., using one or more picker mechanisms that use a suction cup and/or a vacuum airflow) from conveyor device 516. Some time after sorting device 508 has been determined to have successfully captured/gripped the target object, sorting device 508 is configured to deposit/drop/place the one or more captured target objects in a corresponding deposit location. When and how sorting device 508 is to perform a deposit operation with the captured target objects can be determined locally by sorting device 508 or instructed to sorting device 508 by compute node 502. Receptacles 524 and 526 are two example collection containers that are located at two different deposit locations. While not shown in FIG. 5, in some other examples, captured target objects can also be deposited by a sorting device onto target conveyor devices that will transport the objects into deposit locations for additional processing. In some embodiments, each deposit location is to receive target objects of a corresponding object type (e.g., a material type). For example, each of receptacle 524 and receptacle 526 is designated to collect target objects of a different material type.

While not shown in FIG. 5, target objects that are not sorted (e.g., successfully captured) by sorting device 508 can, in some embodiments, fall off the end of conveyor device 516 and land onto another conveyor device with its own corresponding object recognition device, corresponding sorting device, and corresponding compute node (which may be compute node 502 or a different compute node). The object recognition device corresponding to this next conveyor device will capture sensed data with respect to the target objects and this sensed data will in turn be processed by the corresponding compute node to identify the target objects to assist the corresponding sorting device to potentially perform sorting operations on the target objects. In this way, the same target objects can be "seen" by object recognition devices potentially at different times as they are moved through the sorting facility until they are harvested into collection containers.

Figure 6:
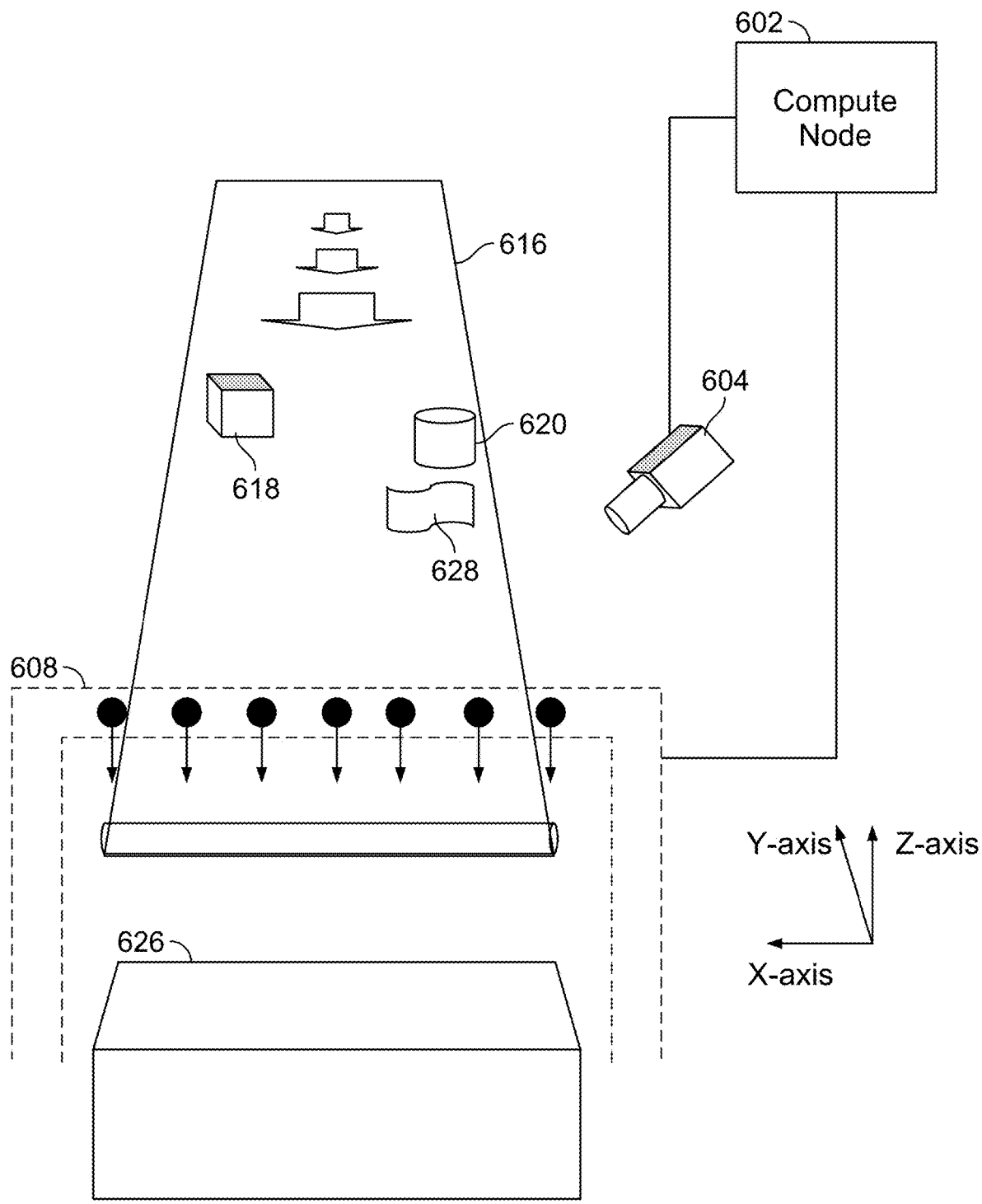
FIG. 6 is a diagram illustrating a second example of at least a portion of a sorting line.

FIG. 6 is a diagram illustrating a second example of at least a portion of a sorting line. In some embodiments, at least a portion of one or more of sorting lines 1 through M of the example sorting facility of FIG. 4 can be implemented using the example shown in FIG. 6. The at least portion of a sorting line that is shown in FIG. 6 includes conveyor device 616 (e.g., a conveyor belt) that is configured to transport objects towards sorting device 608. The at least portion of a sorting line that is shown in FIG. 6 further includes compute node 602 and object recognition device 604. As described above, components within a sorting facility, such as, for example, compute node 602, sorting device 608, and object recognition device 604, can be connected via one or more wired networks and/or one or more wireless networks. Conveyor device 616, compute node 602, and object recognition device 604 can function similarly to conveyor device 516, compute node 502, and object recognition device 504 as respectively described with FIG. 5. However, unlike sorting device 508 of FIG. 5, which is shown to be a sorting robot, sorting device 608 of FIG. 6 comprises a controllable array of diverting mechanisms and is positioned at the end of conveyor device 616 where objects fall off conveyor device 616. In some embodiments, the array of diverting mechanisms may comprise one or more air orifices from which respective pressurized airflows can be emitted. In some embodiments, the array of diverting mechanisms may comprise one or more mechanical paddles that can be actuated to move. In some embodiments, to perform a sorting operation on a target object (e.g., at least one of objects 616, 618, and 628), at least a subset of the diverting mechanisms of sorting device 608 are selected (e.g., based on the trajectory of the target object) and then used to divert the target object (e.g., after it falls off conveyor device 616) into collection container 626. While not shown in FIG. 6, non-target objects that sorting device 608 does not perform sorting operations on may fly over collection container 626 (e.g., and land on another conveyor device for further processing) based on the projectile motion they experience from the velocity of conveyor device 616.

Sorting devices 508 and 608 of FIGS. 5 and 6, respectively, show only two example types of sorting devices and in some embodiments, other types of sorting devices may be used in a sorting facility. Other example types of sorting devices may use sorting mechanisms such as a vacuum extractor device that suctions a target object off a conveyor device through the vacuum extractor device and into a collection container and an array of one or more pushing mechanisms that push a target object off a conveyor device and into a collection container.

Figure 7:
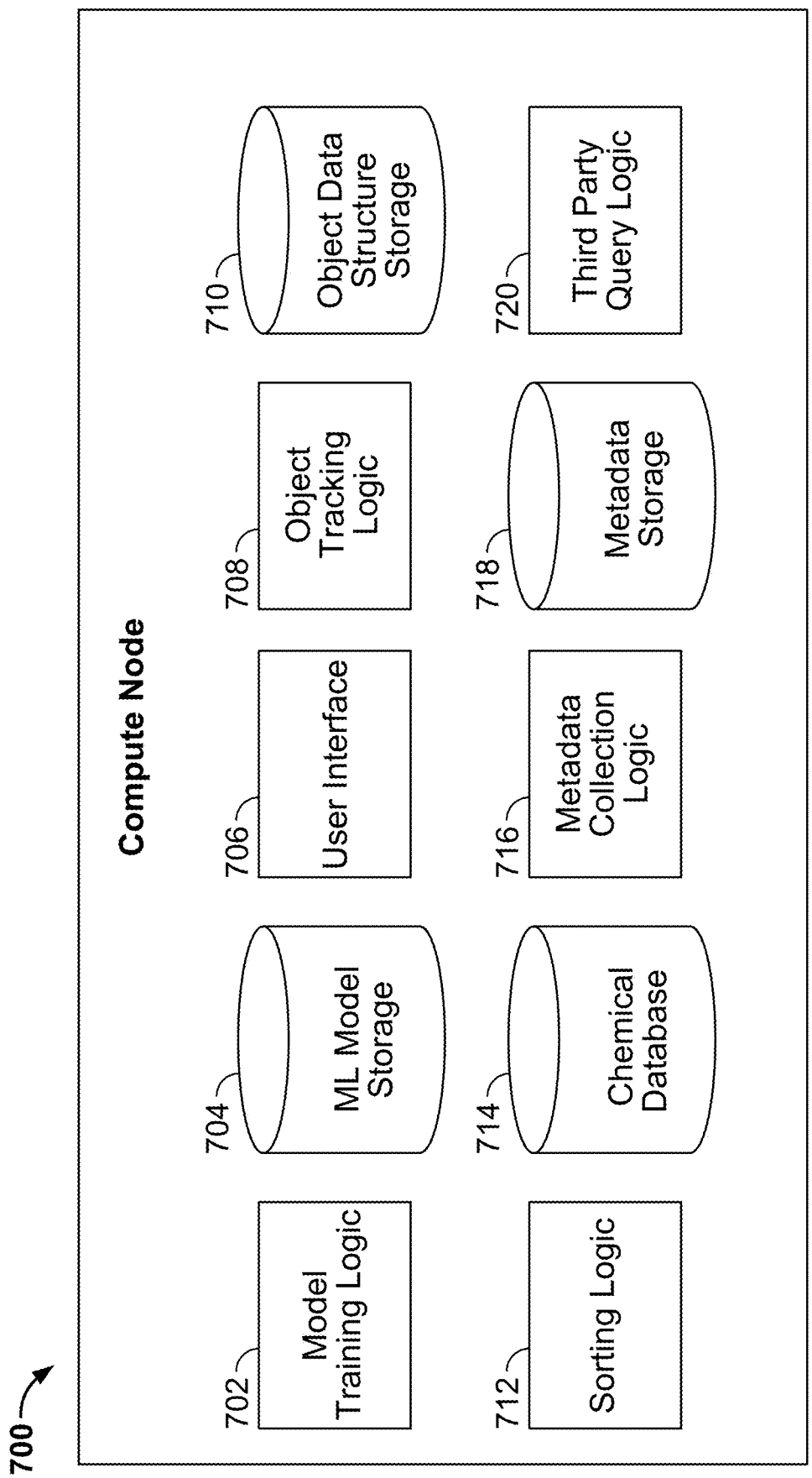
FIG. 7 is a diagram showing an example of a compute node at a sorting facility.

FIG. 7 is a diagram showing an example of a compute node at a sorting facility. In some embodiments, each of the compute node(s) of FIGS. 4, 5, and 6 can be implemented using the example compute node, compute node 700, of FIG. 7. As shown in FIG. 7, FIG. 7 includes model training logic 702, machine learning (ML) model storage 704, user interface 706, object tracking logic 708, object data structure storage 710, sorting logic 712, chemical database 714, metadata collection logic 716, metadata storage 718, and third-party query logic 720. In some embodiments, model training logic 702, user interface 706, object tracking logic 708, sorting logic 712, chemical database 714, metadata collection logic 716, and third-party query logic 720 are implemented using one or more processors with memory and where the processor(s) are capable of running software, firmware, or FPGA-type instructions. In some embodiments, machine learning (ML) model storage 704, object data structure storage 710, chemical database 714, and metadata storage 718 are implemented using one or more software databases. Examples of such databases include a relational database (e.g., SQL), a text-based list of parameter values, a time series (unstructured) database, a data lake, or other non-sequence database.

As will be described in further detail below, a compute node in a sorting facility is configured to receive data from object recognition devices via data networks. A compute node is configured to use software and/or firmware to utilize a variety of adaptive algorithms to process the sensed data that is received from the object recognition devices. A compute node is configured to recognize target objects based on the sensed data. For example, this sensed data is passed into a machine learning model such as a neural network that extracts "features" from the raw sensed data, and fuses these "features" together across different input streams. Ultimately, the context-rich features are passed into a classifier that detects objects from the raw data and classifies them into groups. The compute node is able to make many classifications per object, giving rich context for the object and fine control over how that object is later handled (e.g., sorted). The compute node must run live, so various multiplexing and optimized data fusing steps are implemented to ensure the raw data is processed with low latency. These detections are also tracked over time to generate a spatial understanding of the object's position and velocity for eventual mechanical sorting. The algorithms used to detect objects from the raw data can be supervised machine learning algorithms, which are trained from raw data that has been enriched with automatically drawn and/or manually drawn labels. To aid in this process, a family of algorithms runs alongside the detection algorithms to identify and upload data for upload that is statistically likely to provide value to algorithms if labeled and added to the supervised dataset. Where the compute node is able to send information to a cloud sorting server, this data is ingested, curated, labeled, and retrained using a variety of automated processes (optionally, with human oversight), resulting in new models that are deployed to sorting facilities. In some embodiments, before deployment, new machine learning models are selected for optimal performance as measured by objectives specific to the application they are deployed into.

Model training logic 702 is configured to generate new machine learning models and/or modify existing machine learning models. In various embodiments, model training logic 702 is configured to perform at least some of the same functions that are performed by model training logic 202 of the cloud sorting server of FIG. 2, as described above. In some embodiments, model training logic 702 is configured to (e.g., periodically) receive software updates from the cloud sorting server (e.g., via an application programming interface (API)). For example, the software updates include new and/or updated machine learning models that have been generated at the cloud sorting server and/or firmware. In some embodiments, the software packages that are received from the cloud sorting server are cryptographically signed and therefore, model training logic 702 is configured to decrypt the signed software packages (e.g., using a public key associated with the cloud sorting server) before installing the software packages. In some embodiments, model training logic 702 is configured to use an application programming interface (API) to communicate with the cloud sorting server.

In some embodiments, model training logic 702 is configured to update or cause an update to a machine learning model to recognize a new target object based on operator provided training data. In some embodiments, an operator at the sorting facility can introduce a new object label (e.g., a new object type) into the machine learning models that are used by the compute nodes at the sorting facility and/or the machine learning models that are trained at the cloud sorting server. Note that a label is a tag that can map to one or more machine learning models. Similar to installation-time training, the operator inputs a user operation at user interface 706 to set one or more sorting devices of the sorting devices into "training mode." The operator can then specify that a new label is to be created, or that he or she wishes to update a machine learning model associated with an existing label. The operator can then place known objects on one or more conveyor devices in the sorting facility such that object recognition device(s) that are directed towards the conveyor device can capture sensed data with respect to the known objects. Model training logic 702 is configured to annotate the captured sensed data of the known objects with the operator provided labels for the known objects. In response to receiving a user operation from the operator to "submit" the new label at user interface 706, model training logic 702 is configured to generate new training data that includes the captured sensed data of the known objects with the operator provided labels. In some embodiments, model training logic 702 is configured to locally train an existing machine learning model with the new training data such that the updated machine learning model will be able to recognize objects of the operator provided labels. In some other embodiments, model training logic 702 is configured to upload metadata (as described above) and a set of raw sensor data associated with the known objects to the cloud sorting server so that the cloud sorting server can generate training data from this uploaded data. The cloud sorting server can then train an existing machine learning model using new training data that is generated based on this uploaded data. After the machine learning model has been updated, the cloud sorting server can send the updated machine learning model back to the compute node (or a sorting device) at the sorting facility. For example, such target object training can be utilized by operators to update the machine learning models in use to identify sensitive items that are encountered in their respective sorting facilities. Sensitive items could be items that could cause breakage, are rare components, are hazardous material, or are prohibited items. Examples of prohibited items might include rocks, grease, mud, dirt, sand, or improper materials for a bale (e.g., wood in a plastics bale). Examples of items that can cause breakage to the components (e.g., sorting devices) at the sorting facility include, for example, clothing, large metal or wood, or other materials that could jam or slow a component in the sorting line. Examples of hazardous items include, for example, paint, used oil, lead-acid (automotive) batteries, other batteries, propane and natural gas cylinders, pharmaceuticals, pesticides, caustic cleaners, sharps (e.g., needles, lancets), fluorescent lamps, LED lamps, thermostats/thermometers (e.g., that contain mercury), and vehicle and equipment fluids. In some embodiments, once the machine learning models that are used locally at the sorting nodes recognize the objects of the new operator provided label, the operator can configure the compute node (e.g., sorting logic 712) and/or sorting device(s) at the sorting facility to perform certain types of sorting operations to objects that are identified to be associated with the new operator provided label. For example, if the new label is for sensitive items (such as those described above), the operator can configure the compute node (e.g., sorting logic 712) and/or sorting device(s) at the sorting facility to deposit those types of objects into a particular collection container that is associated with sensitive items.

Machine learning model storage 704 is configured to store machine learning models. In various embodiments, machine learning model storage 704 is configured to store machine learning models that have been generated/trained at and received from the cloud sorting server. For example, machine learning model storage 704 stores at least a portion of the models that are stored by machine learning model storage 204 of the example cloud sorting server of FIG. 2, which is described above. In some embodiments, machine learning model storage 704 is configured to store machine learning models that have been locally trained by model training logic 702.

User interface 706 is configured to receive user inputs to initiate training on machine learning models and configure parameters associated with targeting objects and/or sorting. For example, user interface 706 provides a human-machine interface (HMI) to obtain user input. In some embodiments, user interface 706 is configured to receive a user input from an operator to provide training data. As described above, in some instances, an operator may want to initiate training of machine learning models to recognize a set of target objects that have been encountered at the sorting facility and/or are not identifiable by the existing machine learning models. For example, the operator may want to initiate training on the machine learning models to cause the models to recognize sensitive items (e.g., batteries, prohibited items) so that the operator can then input configurations that address how those items will be targeted and/or sorted after they are identified (e.g., by object tracking logic 708). In some embodiments, user interface 706 is configured to receive user input of a set of target object criteria, which includes attributes associated with objects that are to be deemed as "target objects." In some embodiments, user interface 706 is configured to receive user input on a set of sorting parameters associated with one or more types of target objects. For example, some sorting parameters include a location of a collection container in which to deposit a type of target object, a force with which to use to perform a sorting operation on the type of target object, and/or an orientation at which to orient a sorting mechanism associated with the sorting device before performing the sorting operation on the type of target object. The following is a specific example of how an operator at a sorting facility can input configurations at user interface 706 to customize the way in which components at the sorting facility can recognize and also handle objects of a known object type: An operator can submit user inputs at user interface 706 to train machine learning models to recognize a known sensitive item (e.g., car battery) that has been encountered at the sorting facility. After the operator has generated annotated/labeled image data that includes the car battery object, one or more machine learning models can be trained/modified (e.g., either locally by model training logic 702 or remotely by a cloud sorting server) using this data. The modified machine learning models are then deployed by the compute nodes and/or sorting devices at the sorting facility to recognize instances of this car battery. The operator can also submit a set of target object criteria that designates the car battery as a target object at user interface 706. The operator can additionally submit, at user interface 706, a set of sorting parameters that describe the location of the collection container at which instances of the car battery that are recognized by (e.g., object tracking logic 708 of) the compute node can be deposited by a sorting device at the sorting facility.

Object tracking logic 708 is configured to apply machine learning techniques to sensed data to identify and track objects within the sorting facility. In various embodiments, object tracking logic 708 is configured to obtain sensed data (e.g., via an API) from one or more object recognition devices within the sorting facility and then apply one or more machine learning models stored at machine learning model storage 704 to identify objects from the sensed data. In some embodiments, the sensed data can be received from one or more types of sensors associated with the object recognition devices, including for example, both vision sensors (e.g., cameras) and non-vision sensors (e.g., hyperspectral sensors). As shown in the example diagrams of sorting facilities that are depicted in FIGS. 4, 5, and 6, object recognition devices can be pointed towards the conveyor devices to capture information on objects that are being transported by the conveyor devices. Object tracking logic 708 is configured to input the sensed data to one or more types of machine learning models (e.g., in parallel or serially) to determine, for example, one or more of the following: the object type (or a variant thereof), the material characteristic type (e.g., the polymer type, aluminum), an attribute, mass, weight, the SKU, a feature, and/or another type of classification of each object within the sensed data (e.g., images). For example, object tracking logic 708 is configured to apply one or more machine learning models to visual sensor signals (e.g., images) to identify object regions (e.g., masks, bounding polygons, etc.) that define the shape and location of the objects. For example, machine learning models comprising neural network frameworks are very efficient at recognizing edges and therefore, shapes of objects. Then, object tracking logic 708 is configured to apply machine learning models to analyze the image content within the identified shape/location of the objects within the images to determine one or more classifications associated with each object. In some embodiments, object tracking logic 708 is configured to determine one or more classifications associated with an object. In some embodiments, object tracking logic 708 is configured to compare the determined classification(s) associated with each object against a dynamically configurable set of target object criteria. For example, the set of target object criteria may describe one or more classifications associated with objects that should be harvested by a sorting device. For example, if the classification(s) associated with an identified object matches the current set of target object criteria, then the object is determined to be a "target object" for which sorting logic 712 is configured to determine a sorting operation to be performed by a sorting device on the target object, which will be described in further detail below.

In some embodiments, object tracking logic 708 is configured to identify an object type (e.g., at the SKU-level or at another granularity of object type) and/or a material characteristic of a target object by inputting sensed data on the target object into one or more machine learning models and then querying chemical database 714 to look up chemical properties that correspond to that classification. In some embodiments, after looking up the chemical properties of an identified target object, object tracking logic 708 can determine a corresponding collection container to cause the target object to be deposited into and/or track (e.g., by storing into the data structure associated with the target object) the determined chemical properties of the identified target object.

In some embodiments, object tracking logic 708 is configured to update a dynamically variable bounding polygon that is determined around an object based on collected sensed data on the object. In some embodiments, real-world vision sensors of an object recognition device incorporate a specific field of view for objects. In many cases it is desirable to perform sorting operations on objects after they leave the field of view of the vision sensor of an object recognition device. For example, a sorting device that comprises a sorting robot may be positioned several meters downstream from an object recognition device, and out of its direct view. In addition, in many cases moving objects are first identified when they have only partially come into view of the vision sensor of an object recognition device. Given that the vision sensor of an object recognition device may only "see" portions of an object at a time (due to the entirety of the object not always being in full view of the vision sensor), in some embodiments, object tracking logic 708 is configured to maintain a dynamically variable bounding polygon (e.g., such as a four-sided box) estimate around the object as part of the object recognition. In various embodiments, a "dynamically variable bounding polygon" around an object is a bounding polygon that approximates the shape of the object and in which different portions of the bounding polygon are associated with respective confidence values depending on the sensed data that has been collected on the object so far. As mentioned above, object tracking logic 708 is configured to apply one or more machine learning models to visual sensor signals (e.g., images) to identify object regions (e.g., masks, bounding polygons, etc.) that define the shape and location of the objects. Object tracking logic 708 is configured to assign for each portion of a bounding polygon (e.g., box) of an object a confidence value that is associated with that boundary polygon's portion's inference probability (i.e., a variance value related to confidence in the estimate). For example, the portion of the bounding polygon that is outside the field of view of the vision sensor is assigned a higher variance estimate than the portion of the bounding polygon that is inside the field of view of the vision sensor, thereby ensuring that as the object's trajectory changes over time and that additional visual sensor data is collected on the object, the bounding polygon for the object as determined by object tracking logic 708 becomes more accurate and converges quickly. In the event that additional variance is not ascribed to a portion of an object's bounding polygon that is not yet visible to a vision sensor, in many cases the bounding polygon estimate could vary wildly as the non-visible portions come into view or leave. By assigning higher variance to the unknown portions of an object's bounding polygon that is not yet visible to a vision sensor, object tracking logic 708 can converge rapidly as more of the portions of the object come into view of a vision sensor or leaves the field of view area and becomes "certain." As described above, as an object gets transported through a sorting facility and before it becomes harvested by a sorting device, multiple sets of (e.g., visual) sensed signals with respect to the object can be obtained from one or more object recognition devices and as such, object tracking logic 708 can use each subsequent set of visual sensor signals that are associated with the object to update/improve the object's dynamically variable bounding polygon. Due to the trajectory of the object and the different locations at which the object recognition devices are placed throughout the sorting facility, the object may enter the fields of view of different vision sensors from different angles and at different distances from the sensors, which will cause the collected vision data on the object to show different perspectives of the object. Put another way, as object tracking logic 708 obtains additional vision sensor signals associated with an object, object tracking logic 708 is configured to apply machine learning models on the sensed signals to update the confidence values associated with different portions of the object's dynamically variable bounding polygon.

In some embodiments, object tracking logic 708 is configured to maintain a dynamic data structure corresponding to each identified object. As described above, object tracking logic 708 is configured to apply one or more machine learning models (e.g., stored at machine learning model storage 704) to sensed data (received from one or more object recognition devices) to identify objects by assigning one or more classifications to each object. For each newly detected object, object tracking logic 708 is configured to generate a new data structure to track information associated with that object. For example, the new data structure may be a linked list, a database, or an object-oriented instantiation. For example, an existing data structure could be utilized and augmented to be reused as a "new" data structure to be associated with a newly detected object. In various embodiments, object tracking logic 708 is configured to include in the data structure for each object various determinations/inferences made on that object through applying machine learning techniques to collected sensed data associated with that object. For example, the data structure associated with an object may include one or more of the following: a universally unique object identifier (e.g., a UUID), the object type (or a variant thereof), the material characteristic type, an attribute, mass, weight, the SKU, a feature, one or more chemical properties, the bounding polygon, the position, the trajectory, a deposit location, whether a sorting operation has been performed on the object, and/or another type of classification of the object.

In some embodiments, object tracking logic 708 is configured to determine whether a newly identified object is a "new" object by comparing the inferred classification(s)/attribute(s) associated with the newly identified object (that have been obtained so far) with classification(s)/attribute(s) that are stored in existing data structures that have been maintained for previously identified objects. For example, if the identified classification(s)/attribute(s) associated with the newly identified object match the classification(s)/attribute(s) that are stored in an existing data structure that has been maintained with a previously identified object, then the newly identified object is a previously identified object and therefore, a new data structure does not need to be generated. Otherwise, if the identified classification(s)/attribute(s) associated with the newly identified object do not match the classification(s)/attribute(s) that are stored in any existing data structures that have been maintained with a previously identified object, then the newly identified object is a new object and therefore, a new data structure is to be generated for the new object. In some embodiments, object tracking logic 708 is configured to assign to each new object a corresponding UUID. Specifically, object tracking logic 708 is configured to correlate newly detected classification(s)/attribute(s) associated with the newly identified object over time and query existing classification(s)/attribute(s) associated with the previously identified objects for similarity with the recently queried examples, and update the existing data structures with the newly detected classification(s)/attribute(s) if a match is found (meaning that the newly detected object is actually a previously detected object). By keeping track of all previously identified objects in this way, new objects are easily identified and tracked as well. Initially, as a new object enters the field of capability of a vision sensor associated with an object recognition device, object tracking logic 708 may not have sufficient sensed data to detect the object (not enough certainty in the inference), or may detect a portion of the new object. As more sensed data arrives (the object continues to move across the field of view of the sensor), additional classification(s)/attribute(s) may be detected and used to update the data structure. For example, in an initial pass, enough of a soap bottle appears at the "top" of the field of view of a vision sensor included in an object recognition device corresponding to the compute node of FIG. 7 and as a result, object tracking logic 708 can recognize the object from the images obtained from the vision sensor of, but the bounding polygon associated with the object has uncertainty in the portions that are out of the vision sensor's field of view. As the object moves along a conveyance device, it is eventually fully in view of the vision sensor, and the bounding box and object mask can be updated in the object's data structure. Because object tracking logic 708 tracks the object and its trajectory (as will be described in further detail below), new objects within the vision sensor's field of view are easily distinguished from previously detected objects that are already being tracked. Similarly, as objects pass out of the vision sensor's field of view, object tracking logic 708 is alerted to this (e.g., based on the sensed data received from the vision sensor) and is configured to pass the object's data structure to other parts of the system (e.g., via publishing the data structure on a message queue), and ceases to track that object (in the form of updating that object's data structure). After the object meets a configured condition (e.g., becomes successfully harvested/deposited into a collection container), in some embodiments, the object's corresponding data structure is then destroyed/reclaimed and in some other embodiments, the object's data structure remains to be used by other components (e.g., and used to generate a report on the types of objects that are processed at the sorting facility). By way of example, the data structures created may be used for fully- or semi-supervised convolutional neural networks. Further architectures to support this include, for example, but are not limited to: Mask r-cnn, Cascade r-cnn, FCOS, centermask, and EffDet. For the backbone architecture ResNet, EffNet, VoVnet, and CSO versions of the above are all exemplary approaches.

In some embodiments, object tracking logic 708 is configured to query chemical database 714 to determine chemical properties associated with an identified object. In some embodiments, query chemical database 714 stores mappings between object/material classifications with chemical properties. In some embodiments, query chemical database 714 can be implemented similarly to chemical database 216 of the example cloud sorting server of FIG. 2. In some embodiments, query chemical database 714 can store updated mappings that are sent from a cloud sorting server. Object tracking logic 708 is configured to query chemical database 714 with one or more object/material classifications of an object that it has determined by applying machine learning techniques to sensed data associated with that object to obtain the chemical properties corresponding to that object. Object tracking logic 708 can then store the chemical properties corresponding to an object in the data structure that is being maintained for the object.

In some embodiments, object tracking logic 708 is configured to determine a trajectory for an identified object. It is desirable to implement object path planning without requiring customization of the transport system. In some embodiments, object tracking logic 708 applies machine learning techniques to visual sensor signals (as described above) to identify objects, track movement along a sorting line, and harvest target objects. In some embodiments, object tracking logic 708 is configured to implement a trajectory-calculation software that is configured to utilize a dynamic software model to track and predict future object positions (e.g., along a sorting line and/or a conveyor device) and trajectory. In some embodiments, object tracking logic 708 is configured to update an object's maintained data structure with the position and trajectory that have been computed for the object. There are many different possible dynamic models that can be used, and each would incorporate a linear velocity model in its calculations. One particular example of a dynamic model estimator for various outcomes and that is in fact utilized in many modern control system designs, including for modeling general object motion trajectory in machine vision systems, is the filter algorithm type of dynamic model. In some embodiments, object tracking logic 708 is configured to apply filters algorithms (dynamic model estimators such as, for example, a particle filter, Kalman filter, local linearization, a sequential Monte Carlo method, or Bayesian filtering) to sensed data (e.g., image frames) that is obtained from vision sensors to determine the position and/or trajectory of identified objects. For example, the sensed data from vision sensors comprises one or more image frames of the surface of a conveyor device and where the vision sensors are located above the conveyor device and pointing down towards the conveyor device. In some embodiments, a separate dynamic model may be used to determine the trajectory for each identified object. In some embodiments, a dynamic model may be used to determine the trajectories of a set of objects that may be grouped together (e.g., based on having a common attribute). In some embodiments, upon detection of a target object (e.g., an identified object that matches a set of target object criteria), object tracking logic 708 is configured to implement a new dynamic model data structure modeling the dynamics of that object's motion (e.g., along the conveyor device that is transporting the object). The dynamic model methods utilize the data structure to predict a forward and reverse path of the object based on initial conditions (e.g., the initial (X, Y) or (X, Y, Z) coordinates and initial velocity vector—in the case of a linear conveyor device simply a speed). Once created, the dynamic model evolves its state over time based on the defined dynamics, and further updates based on new measurements, which is newly sensed data (e.g., new image frames) that is obtained for that object. For example, the dynamic model can use a series of image frames showing an identified object and time intervals determined between the image frames to determine a position and/or trajectory for the object. In some embodiments, object tracking logic 708 is configured to update the position and/or trajectory that is stored in an object's data structured based on newly computed position and/or trajectory information that is computed from newly sensed data obtained for the object.

Figure 8:
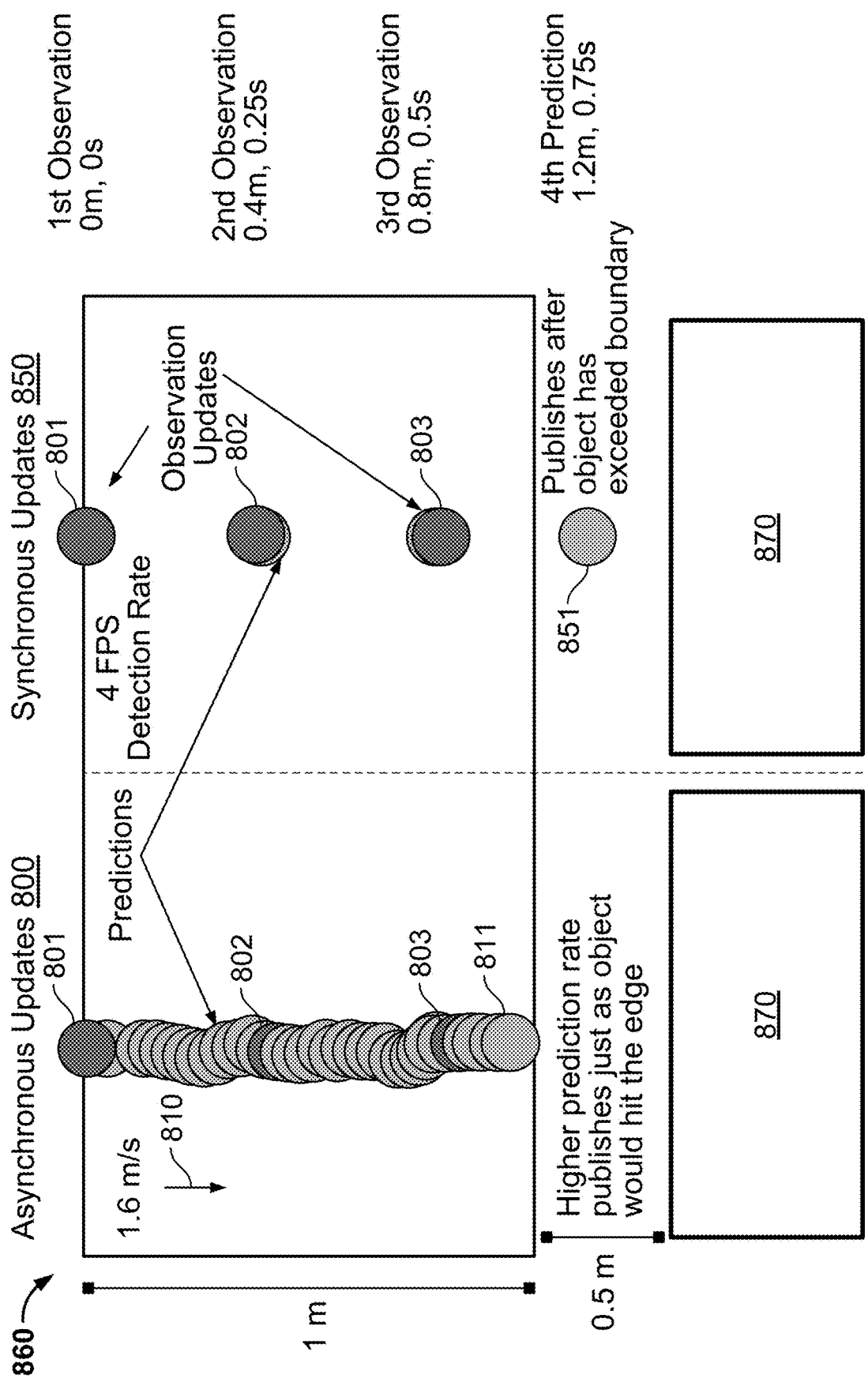
FIG. 8 is a diagram that shows an example comparison of the synchronous and asynchronous object trajectory update approaches.

In some embodiments, object tracking logic 708 is configured to perform new trajectory calculations for an object in response to receipt of newly sensed data with respect to that object. Put another way, in some embodiments, object tracking logic 708 is configured to perform new trajectory calculations for an object in a manner that is synchronized with detection events/captures of new sensed data on the object (e.g., new trajectory calculations are updated only at the times the object is "seen" by vision sensors again). By keying the calculations of a new trajectory for an object off detection events of the object, the overall computation of the object trajectory can be reduced. In some other embodiments, object tracking logic 708 is configured to perform new trajectory calculations for an object in response to the elapse of a configured time interval. For example, the configured time interval is shorter than the historical period of time in between new detection events/captures of new sensed data on the object. Put another way, in some embodiments, object tracking logic 708 is configured to perform new trajectory calculations for an object in a manner that is asynchronous with detection events/captures of new sensed data on the object (e.g., new trajectory calculations are updated regardless of when the object is "seen" by vision sensors again). In lieu of using newly sensed data on the object to track that object, asynchronous calculations of the object's trajectory can be performed using the prior state of where the object was last detected, the elapsed period of time since that last detection, and a dynamic model (e.g., a Kalman filter, a particle filter, a sequential Monte Carlo method). By performing the calculations of a new trajectory for an object asynchronously with object capture, a much more granular (though calculation intensive) view of the object trajectory can be obtained over time. Being able to perform asynchronous trajectory calculations on an object may be helpful because temporal agreement in sensed data (e.g., one frame may yield different classifications and detections) may not always be available, so the object might seem to be two different things between two frames, or might even not be detected in a different frame. As such, asynchronous updates help manage object permanence in this case. Furthermore, asynchronous updates may also be helpful when a sorting action needs to be performed on an object (e.g., as the object is approaching the sorting area of a conveyor device) even when newly sensed data on the object is not available such as when the object is leaving a vision sensor's field of view and as such, asynchronous updates can provide an anticipated trajectory and location in order to enable the sorting device to perform the sorting action correctly. FIG. 8 is a diagram that shows an example comparison of the synchronous and asynchronous object trajectory update approaches. In FIG. 8, the object is moving across a conveyor device in direction 810 towards sorting area 870. In FIG. 8, both approaches 800 (Asynchronous) and 850 (Synchronous) show the respective frequencies at which object trajectory predictions are made for the same object that is being transported by a conveyor device and where the same object crosses through the field of view of vision sensors (e.g., associated with an object recognition device) that are pointed toward the conveyor device. In both approaches 800 (Asynchronous) and 850 (Synchronous), actual object observations (new detections of an object in sensed data) provided by the vision sensors are shown at circles 801 (at distance 0 m relative to a reference location and at 0 seconds relative to a reference time), 802 (at distance 0.4 m and at 0.25 seconds), and 803 (at distance 0.8 m and at 0.5 seconds), with a conveyor speed of 1.6 m/s. Using the Asynchronous Update approach 800, predictions are made rapidly, and the object trajectory evolves and is computed (using a dynamic model estimator such as a Kalman filter, a particle filter, local linearization, a sequential Monte Carlo method, or Bayesian filtering) between each actual object observation. In the Synchronous Update approach 850, the object trajectory predictions are updated only at each observation point, and typically made according to the cadence of actual observations (in this example at 4 FPS). As the object exits the vision field of view 860 of the vision sensor, in the Asynchronous Update approach 800, the last object trajectory prediction 811 is then published (e.g., to the message queue) as the relevant object position and trajectory. In the Synchronous Update approach 850, the final object trajectory prediction 851 (at distance 1.2 m and at 0.75 seconds) is published according to the cadence of actual observations, and is thus published later in time according to the cadence established by prior observations. Synchronous Update approach 850 only relies on measurements from the object detection pipeline which introduces latency into the chain. Synchronous Update approach 850 only updates on and uses the timestamps from new object detection messages (this timestamp being applied when the vision sensor captured the image) and publishes once a tracked object is estimated to have exceeded a threshold in the image (i.e., about to leave the field of view of the vision sensor). However, the latency introduced by the detection means that in reality, the object that is being estimated is already further down the conveyor device. Asynchronous Update approach 800 updates position estimates independently of object detection observations and can therefore update far more rapidly than detections are actually being made. Furthermore, Asynchronous Update approach 800 uses the current timestamp as opposed to the timestamp from the observation to make its state predictions giving it a better understanding of where the object actually is (whereas Synchronous Update approach 850 is measuring where the object was). Either or both approaches can be used by object tracking logic 708, with the advantage of Asynchronous Update approach 800 providing more rapid updates and therefore more time between the publication of the last prediction 811 and the need to calculate a downstream sorting operation to be performed on the object in sorting area 870, which is associated with a region on the conveyor device in which the sorting device can perform the sorting operation on the object (e.g., due to the known range of reach of the sorting device). While Synchronous approach 850 publishes its last prediction 851 later, resulting in less time for a sorting device to determine/perform a sorting operation in sorting area 870, it also requires less computation and thus is suitable for systems where latency between publish and sorting operations are less critical.

Returning to FIG. 7, in some embodiments, object tracking logic 708 is configured to determine a global speed associated with a conveyor device based on the trajectories of objects that are being transported by the conveyor device. In some embodiments, object tracking logic 708 is configured to use a dynamic model (e.g., a Kalman filter, a particle filter, local linearization, a sequential Monte Carlo method, or Bayesian filtering) to model the global speed of the system (e.g., the speed of a conveyor on which objects are located). A benefit of determining the global speed this way is to remove the need for a separate encoder (e.g., encoders operate by bolting on to the pulley that spins the conveyor itself, translating rotations per minute into a voltage signal interpretable as linear speed of the conveyor belt) to measure the velocity of the conveyance device. The global dynamic model utilizes multiple objects and trajectories to calculate an overall global velocity for the system, effectively combining all measurements to create a global velocity value. Object tracking logic 708 is configured to then use this global velocity value as the default initial conditions when a new dynamic model is instantiated to determine the trajectory of a newly detected object. This last innovation has the benefit of rapid convergence of the dynamic model because the initial velocity conditions are highly accurate compared to other possible initial values. Accurate real-time trajectory calculation is in fact only possible when reasonably accurate initial conditions are input to the model, and thus this innovation is an important addition for any system where the conveyance of objects is roughly linear (e.g., the objects are transported by a conveyor belt). In the event that object tracking logic 708 detects a significant anomaly in its global speed calculation as compared to the actual object speed measurements (for example, when the device system suddenly slows or stops), object tracking logic 708 is configured to execute a failure mode and re-seeds the value for its calculation of global speed (e.g., object tracking logic 708 is configured to calculate the global speed again based on the current object trajectories). An aspect of the object recognition and path planning software that is optimized for heterogeneous object sorting in a linear frame (e.g., objects are moved by a conveyor device) is that aspect ratios and object sizes remain fixed (e.g., the objects do not grow or morph in shape). This optimization enables more rapid object detection and path planning in a real-time environment.

In some embodiments, object tracking logic 708 is configured to use the determined trajectory objects on a conveyor device and visual sensed data (e.g., images) of the objects on the conveyor device to infer calibration errors in the vision sensor(s) (e.g., camera(s)) that had generated the sensed data. Object tracking logic 708 is configured to use the object detection and dynamic models (e.g., such as Kalman filters, local linearization, sequential Monte Carlo methods, or Bayesian filtering) to stitch together a series of captured images of the surface of the conveyor device to generate a panoramic "view" of the objects moving along the conveyance device. This panoramic composite image (which is sometimes referred to as a "panorama") includes multiple image frames (each arriving at distinct points in time from the vision sensor(s)) that are concatenated to form a single image that represents the view of the camera evolved over time. For example, if the object recognition device that includes the vision sensor(s) were located above the conveyor device and pointed towards the surface of the conveyor device, then the vision sensor(s) can capture an image of the portion of the conveyor device that is within its field of view every configured interval (e.g., every 3 seconds). To generate a panorama from images captured by the vision sensors, object tracking logic 708 is configured to stitch together images that were serially captured by the object recognition device. Due to the vision sensors of the object recognition device capturing images of objects as they move across the conveyance, a generated panorama can show a stream of objects laid out on a portion of the surface of the conveyor device. Put another way, the generated panorama shows the surface of a conveyor belt over time. Object tracking logic 708 is configured to overlay dynamic model estimates of object locations (which could appear as a bounding polygon around each detected object) on each panorama, resulting in a large image that captures object trajectory over time from a pixel-based viewpoint. For example, a panorama can be thought of as a freeze frame view of the entirety of a short video clip that is captured by the vision sensors. Unlike traditional object path detection approaches, the panoramic view approach allows the evolution of the objects' path trajectories to occur in "pixel space" (pixel space uses the pixels in the captured images as the frame of reference) as opposed to external metric space (external metric space uses the X and Y axes of the conveyor belt as the frame of reference). For clarity, the objects' trajectories can be calculated and evolved using inter-image frame differences as detected by one or more machine learning models, and thus become highly accurate paths within the range of the vision sensors. In other embodiments, the pixel-based panorama model is converted/transformed into a physical metric space panorama model (e.g., meters from a visional sensor (camera) at a specific angle of incidence) by transforming the pixel values of the objects' bounding polygons into metric space (X, Y) coordinates using the camera calibration. However, the physical metric space panorama model has the disadvantage of the trajectory calculations being subject to errors introduced by vision sensor calibration (e.g., a camera calibration error can change the whole trajectory, even if other cameras are calibrated correctly). In some embodiments, object tracking logic 708 is configured to compare pixel-based trajectory calculations with those in a physical metric space panorama model and can use the two views to also identify calibration errors in the sensors. One consequence of errors in camera calibration are errors in the physical metric space panorama model. Because the locations/bounding polygons of target objects in the physical metric space panorama model are used for sorting devices to perform sorting operations on the target objects, errors in the object's locations/bounding polygons in the physical metric space will lead to inaccurate targeting of the objects and therefore, sorting operations that fail to pick up the target objects. By recalibrating the camera/vision sensor to correct any detected error, the improved camera calibration will more accurately transform the pixel values of the bounding box of an object from pixel space into metric space (X, Y) coordinates and therefore lead to better targeting of target objects and therefore, more successful sorting operations.

Figure 9:
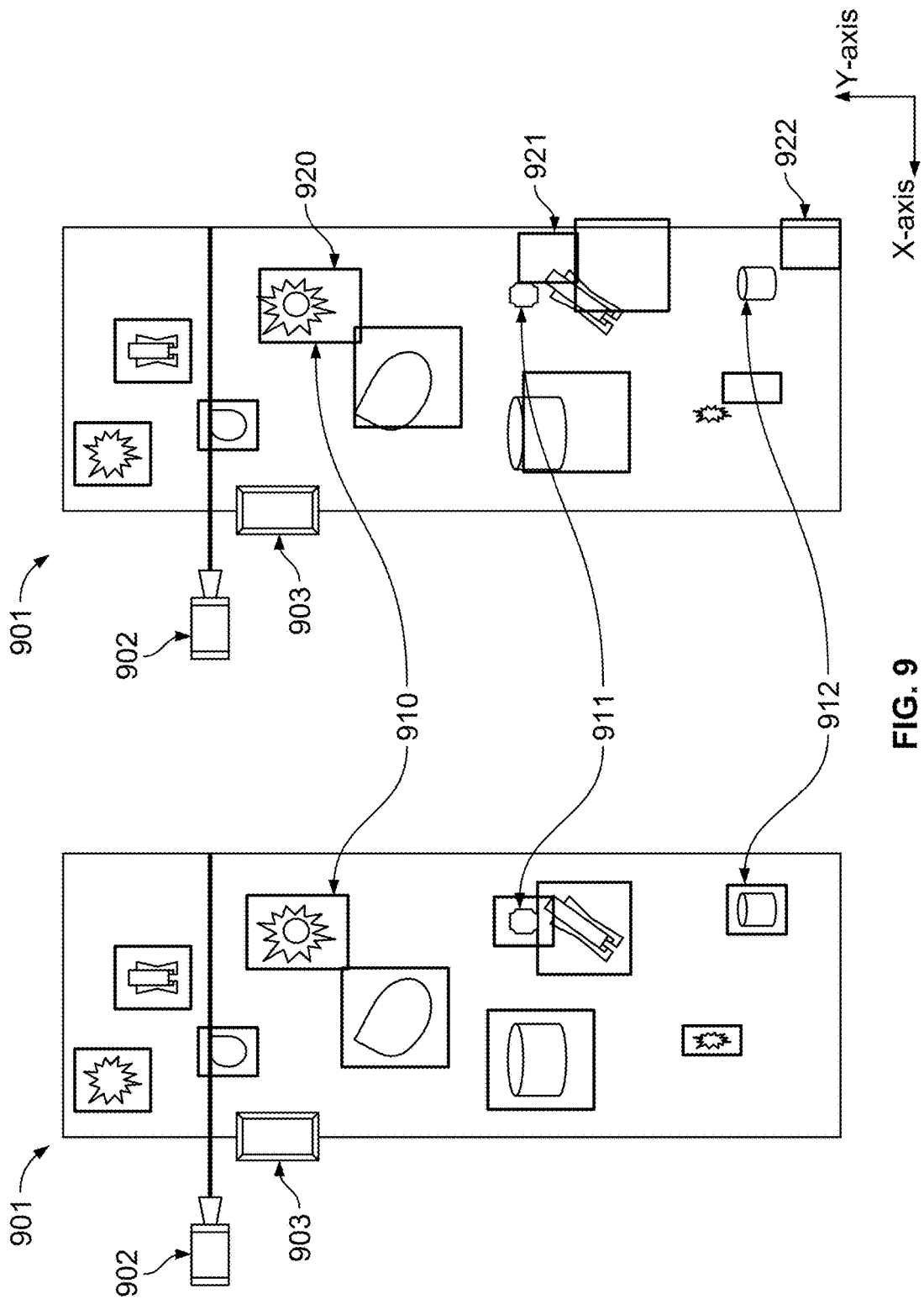
FIG. 9 shows a comparison of a composite panorama with object locations as defined by object tracking techniques applied in pixel space and a composite panorama with object locations as defined by transforming the object locations in pixel space to metric space.

FIG. 9 shows a comparison of a composite panorama with object locations as defined by object tracking techniques applied in pixel space and a composite panorama with object locations as defined by transforming the object locations in pixel space to metric space. As will be described below, the difference in object location between the two panoramas is a function of camera calibration. Pixel space panorama 930 is "stitched together" using a series of captured images of the surface of conveyor device 901. Pixel space panorama 930 shows bounding boxes around detected objects and such bounding boxes can be created based on the estimates produced by dynamic models (e.g., such as Kalman filters, local linearization, sequential Monte Carlo methods, or Bayesian filtering), which are all operating in pixel space. Pixel space panorama 930 infers the pixel velocities in the X and Y directions of conveyor device 901, and then uses the pixel velocities multiplied by a time delta to get a "pixel shift," which is in turn used to stitch that particular image frame into the panorama. Thus, the locations (as indicated by bounding boxes) of objects viewed in the panoramic view under pixel space object tracking look to be correctly positioned. In another embodiment, panoramas are "stitched together" in a similar way, but instead use the relative velocity of each object to infer the speed the global speed/velocity of conveyor belt 901, which is then translated into pixel space using camera calibration. In metric space panorama 940, captured images are first converted to spatial coordinates, and any slight calibration error in the camera will mean that, relative to the pixel space representation, the determined locations (as indicated by bounding boxes) of objects will diverge as the objects get further away from the camera (as calibration has a larger divergence from pixels to meters). In pixel space panorama 930, objects in pixel space will always align with the objects in the panorama, because the same speed estimates were used to build the panorama as were used to infer the speed/location/bounding boxes of those objects. In metric space panorama 940, if the camera calibration is inaccurate, the speed/location/bounding boxes of objects will not line up with the panorama very well. The difference in object location is a function of camera calibration. Left-right aberration could be that the camera is more rotated than the calibration assumes, leading to a left-right misalignment. Slight issues with height in the calibration can cause up-down miscalibration that gets worse as objects get further away from the camera. This is a visual mechanism by which a bad calibration may be identified easily by comparing the two panoramas, pixel space panorama 930 and metric space panorama 940.

FIG. 9 provides a graphic comparison of the two approaches including conveyor device 901, camera 902, fixed object 903, and objects being transported on the conveyor device such as objects 910, 911, and 912. In pixel space panorama 930, the panorama is stitched together using dynamic model (e.g., such as Kalman filters, local linearization, sequential Monte Carlo methods, or Bayesian filtering) estimators working entirely in the pixel space. The bounding boxes around the objects (including objects 910, 911, and 912) represent bounding box calculations for each object, with location and trajectory determined by the Kalman filter estimator. Metric space panorama 940 depicts the same system (conveyor device 901, camera 902, and objects including objects 910, 911, and 912) but with the bounding box position determined by the camera in the metric space, and trajectory augmented with data from a physical encoder measuring the speed of the conveyor device. As discussed above, in the event of a camera miscalibration (which is depicted in FIG. 9), the bounding boxes calculated in the right-hand view (by transforming the pixel values of the bounding boxes into metric space using the existing camera calibration) become less accurate as they move farther from the camera 902. Specifically, a comparison of the bounding boxes 920, 921, and 922 around objects 910, 911, and 912 show their positions compared to the objects being tracked (910, 911, and 912, respectively) with a level of inaccuracy that increases the farther the object is away from camera 902. Camera miscalibration can be determined by comparing how well the bounding boxes for the same objects align between pixel space panorama 930 and metric space panorama 940. For example, this comparison can be performed manually or programmatically by measuring the amount of overlap between the bounding boxes around the same objects in pixel space panorama 930 and metric space panorama 940. With perfect camera calibration and perfect tracking, it is expected that the bounding boxes around the same object line up exactly with both pixel space panorama 930 and metric space panorama 940. For example, the Intersection over Union (IoU) can be programmatically computed for each pair of bounding boxes and that total can be summed and normalized by the number of objects in question to get a quantifiable measure of how well the two overlap. Then a threshold above which triggers a warning can be set such that should this warning be generated, the camera is to be calibrated again so that the improved calibration can better identify the true location of objects and improve the chances that the objects will be successfully targeted/sorted (e.g., picked up) by sorting devices.

As shown in FIG. 9, static object 903 appears on conveyor device 901. For example, static object 903 may be an object that is stuck on the edge of conveyor device 901 and is therefore not moving along with conveyor device 901. While not depicted in FIG. 9, because pixel space panorama 930 and metric space panorama 940 each comprises multiple image frames of the same portion of conveyor device 901, pixel space panorama 930 and metric space panorama 940 should show multiple instances of static object 903 (due to static object 903 appearing in each image that is captured by the vision sensor). However, by using a dynamic model (e.g., such as Kalman filter, a particle filter, or local linearization) to compute the velocity for each object independently (i.e., each object evolves based on the Kalman estimate and measurement updates), it is possible to determine that an object is static (not moving across the vision sensor's field of view and has zero velocity). If the dynamic model approach was not used and only a physical encoder of conveyor device 901's speed was used instead (which assigns the same global speed for all objects on conveyor device 901), then there is no way to assign per-object velocities such as a zero velocity to static object 903. Returning to FIG. 7, because the use of the dynamic model enables the determination of per-object velocities, object tracking logic 708 can ignore maintaining and/or publishing on message queue data structures corresponding to static objects (e.g., such as static object 903 of FIG. 9) so that downstream sorting devices can avoid performing sorting operations on such immobile objects that will not arrive in their sorting areas (e.g., sorting area 870 of FIG. 8). Conversely, object tracking logic 708 can maintain/publish to a message queue, data structures corresponding to non-static objects (e.g., such as objects 910, 911, and 912 of FIG. 9) so that downstream sorting devices can prepare to perform sorting operations on such mobile objects that will eventually arrive in their sorting areas (e.g., sorting area 870 of FIG. 8).

In some embodiments, object tracking logic 708 is configured to cull phantom objects that had been previously detected. Based on the capture rates of object images and the velocity of the conveyor device, the object recognition device(s) are designed to execute captures of object images multiple times as an object moves across one or more vision sensors' fields of view (or fields of range). In some embodiments, object tracking logic 708 is configured to increment a count of the times that an object passes through a vision sensor's field of view. In the event that an object's view count is fewer than the average view count of other objects (e.g., the object was only detected twice while others are detected on average ten times), then that object's determined trajectory path (e.g., that is stored in the object's corresponding data structure) can be discarded, or be associated with a low probability value.

In some embodiments, where multiple sensor types are used in object recognition devices in a sorting facility, object tracking logic 708 may receive sensed data obtained by multiple sensor types and some of this sensed data may also be conflicting, in some instances. In some embodiments, object tracking logic 708 is configured to fuse the sensed data that is received from multiple sensor types and input to the Kalman filter (e.g., or a particle filter, local linearization, a sequential Monte Carlo method, or Bayesian filtering) algorithm. Sensor input may be synchronous or asynchronous, and as such, object tracking logic 708 is configured to filter and track the pruning logic of the Kalman filter algorithm. Determining the speed/velocity estimates for individual objects and the global speed of the conveyor device (as described above) may incorporate data from all sensor types, increasing the granularity of measurements and thus correlation to real-time behavior. For processing efficiency, in some embodiments, object tracking logic 708 is configured to select a subset of the received sensed data (e.g., only sensor data related to object detection) to utilize for object trajectory planning.

Object data structure storage 710 is configured to store the data structures that are used to track information associated with identified objects. As described above, the data structure of an identified object can be dynamically updated by object tracking logic 708 as additional inferences can be determined for the object based on new sensed data that is obtained by object tracking logic 708. In some embodiments, the data structures that are stored at object data structure storage 710 can be published by sorting logic 712 on a message queue of a message bus so that other components (e.g., sorting devices) of the sorting devices can use the published information to determine how to perform sorting operations on target objects. In some embodiments, the data structures that are stored at object data structures storage 710 can be periodically analyzed by object tracking logic 708 to generate reports regarding the classifications of objects that have been identified at that particular sorting facility. Such reports may be sent by object tracking logic 708 to the cloud sorting server and/or third-party servers such as, for example, plastic manufacturers (e.g., to inform them where their products end up being sorted for recycling).

Sorting logic 712 is configured to determine which target objects that a sorting device should remove from a stream of objects based on the information (e.g., attribute information, location information, and/or trajectory information) associated with target objects and non-target objects that it receives from object tracking logic 708. In some embodiments, sorting logic 712 is configured to determine, for each target object, whether the removal of that target object from the stream of objects should be suppressed (e.g., avoided) using a reconfigurable set of suppression criteria. Certain sorting mechanics of removing a target object from a stream include physically deflecting (e.g., using a vacuum, a positive airflow, or a physical mechanism) the target object into a collection container. However, it is possible that the physical deflection aimed at the target object could inadvertently also deflect a non-target object into the collection container intended for the target object. The result of inadvertently deflecting a non-target object into the collection container is that the purity level of objects collected in one or more collection container(s) would decrease, which is undesirable. For example, the "purity level" corresponding to objects deposited into one or more collection containers can be defined as either 1) the total number of collected target objects over the total number of all objects collected at the collection container(s) or 2) the total weight of collected target objects over the total weight of all objects collected at the collection container(s). Typically, the greater the purity level of objects collected at the collection container(s), the greater the (e.g., economic) value that is associated with the collected objects. As such, it is undesirable to allow neighboring non-target objects to be inadvertently deposited into a collection container when a sorting device fires on a target object because doing so will lower the purity level associated with the objects collected at the collection container. For example, the set of suppression criteria describes the conditions for when a sorting device should not fire on a target object (to reduce the risk that the non-target object also inadvertently becomes deposited into a collection container). In a specific example, the set of suppression criteria may describe that if a non-target object is located within a predetermined distance from a target object and that the size of the non-target object is greater than a predetermined size, then the sorting device should not be instructed to remove the target object (to reduce the risk that the non-target object becomes deposited into a collection container) (i.e., the removal of that target object should be suppressed). In some embodiments, sorting logic 712 is configured to determine which target objects should be removed and which should not be removed by a sorting device using the set of suppression criteria.

For the target objects that sorting logic 712 determines should be removed from the stream of materials (e.g., transported on a conveyor device or between conveyor devices), in some embodiments, sorting logic 712 is configured to determine the manner in which those target objects are to be removed using a reconfigurable set of sorting parameters. For example, the set of sorting parameters describes, but is not limited to, one or more of the following: which collection containers to deposit a target object given its determined object type, how much force/pressure to use to remove the target object from the stream and into corresponding collection containers, at which angle to direct force on the target object given its object type and/or being variant of the object type, and at which depth to drop a sorting mechanism (e.g., a picker mechanism) to capture the target object. In some embodiments, for target objects that are identified to be variants of an object type, sorting logic 712 is configured to use machine learning to improve/optimize the instructions that it sends to sorting devices to sort the variant objects. For example, sorting logic 712 is configured to determine an optimal pick location on the variant object, or optimal force vectors based on the object's unique geometry (e.g., handles, holes, lids, folds, tears, or other surface characteristics). A machine learning model (e.g., that is obtained from a cloud sorting server) can be associated with various normally present surface characteristics (e.g., a plastic milk jug handle, lid, and asymmetrical geometry). Additionally, using learning techniques, this machine learning model can then be trained (e.g., by the cloud sorting server) to recognize aberrant distortions of the object (e.g., characteristics of a hole in the milk jug, flattened versions of the milk jug, etc.). As these characteristics are taught to the machine learning model, the machine learning model is expanded with new output layers that incorporate these new material characteristics and therefore has the capability to recognize these new forms or variants of extant objects. In response to object tracking logic 708 recognizing a set of characteristics associated with variants of an object type for a target object, sorting logic 712 can correspondingly update the sorting parameter(s) in control signals that are sent to the sorting device to perform a sorting operation on the variant object. For example, a sorting device with a robotic arm with a suction gripper mechanism may be directed to a location away from the hole or protruding arm of the object to ensure proper gripping. In another example, a sorting device with an air jet array may be instructed to alter the jets used or force per jet in order to accommodate the different shape or protuberance. In yet another example, it may be determined that a certain type of determined variant (e.g., a contaminated version of an object type such as a newspaper) of an object may comprise a non-target object and therefore not get sorted, even when the non-variant object type comprises target objects. By utilizing reinforcement learning from real-world pick data, the machine learning models can adapt its neural processing to weight pick techniques that prove successful for variants of material characteristics.

In some embodiments, sorting logic 712 is configured to determine which target objects to prioritize sorting for using reconfigurable priorities assigned to different object types. In some embodiments, sorting logic 712 is configured to send control signals to at least one corresponding sorting device to instruct that at least one sorting device which/when/how to perform sorting operations to remove target objects from the stream of materials. In some embodiments, in response to detected events (e.g., new commodity prices obtained by third-party query logic 720), tunable parameters associated with the material recovery facility, including a set of target object criteria, a set of suppression criteria, a set of sorting parameters, and priorities assigned to different object types, can be reconfigured.

In some embodiments, sorting logic 712 is configured to select a sorting device to perform a sorting operation on a target object based on the range of capabilities of the sorting device and the attribute(s) associated with the target object. As described above, a sorting facility may include multiple sorting devices and each sorting device may be associated with a different type or other attribute that provides it a corresponding capability in being able to manipulate (e.g., capture, shoot at, push, etc.) objects. Given that the material stream that is received at the sorting facility may be heterogeneous in nature, different sorting devices and/or different instances of the same sorting devices but configured differently can be assigned to perform sorting operations on different types of target objects to best match each target object with the sorting device(s) that are most capable of sorting that target object. For example, sorting logic 712 is configured to select a sorting device based on the known capabilities of the sorting device (e.g., the type of sorting mechanism that is used by the sorting device, the maximum amount of force that the sorting device can exert on an object, the maximum weight that the sorting device can lift, etc.). For example, a sorting device can be configured to/have the capability to manipulate objects of one or more object types. For example, a dense and heavy object can only be removed from a conveyor device by a sorting device that uses a gripper/picker mechanism that is paired with a strong suction airflow, while a plastic film type of object can only be removed by a vacuum extractor tube sorting device that suctions the film through the tube/body of the sorting device. In some embodiments, sorting logic 712 is configured to match one or more sorting devices to appropriate target objects and then instruct the sorting devices to perform sorting operations on the respective target objects to divert target objects of different object types from one conveyor device to separate conveyor devices for subsequent processing by additional sorting devices.

In some embodiments, sorting logic 712 is configured to select a first sorting device to perform a sorting operation on a target object and in response to a determination that the first sorting device has not successfully sorted the target object, select a second sorting device to perform a sorting operation on the target object. Put another way, sorting logic 712 can facilitate "multiple chance targeting" of a single target object. In some embodiments, sorting logic 712 is configured to use the trajectory determined for a target object (e.g., based on using sensed data on the object and dynamic models) to select an appropriate downstream sorting device to perform a sorting operation on the target object. For example, sorting logic 712 is configured to select a sorting device whose location and/or range of movement will be close to the future location of the target object given the target object's trajectory. In another example, sorting logic 712 is configured to select a sorting device based on comparing the known capabilities of the sorting device to the attributes of the target object (as described above). In some embodiments, capabilities and configuration information for sorting devices are stored in a database accessible by the compute node within the sorting facility (and also in a database accessible by the cloud sorting server). In some embodiments, sorting logic 712 can send a control signal to this selected sorting device to instruct the sorting device to perform a sorting operation on the target object. Alternative or in addition to sending the control signal to the selected sorting device, in some embodiments, sorting logic 712 can publish the data structure that tracks the attributes/information on the target object (as described) to a message queue that is accessible by the selected sorting device. Thereafter, the selected sorting device is configured to process the control signal and/or the data structure associated with the target object to perform the sorting operation on the target object. In some embodiments, after sorting logic 712 selects the first sorting device to perform a sorting operation on a target object, sorting logic 712 is configured to determine based on the trajectory of another target object, that the location of the other target object would block the first sorting device from being to (successfully) perform a sorting operation on the target object. Another way that sorting logic 712 can determine that the first sorting device cannot/has not successfully performed a sorting operation on the target object is to receive an indication of such either directly (e.g., by receiving a message from the first sorting device) or indirectly (e.g., by detecting that the first sorting device had published the data structure of the target object back on a message queue and/or detecting a sensor on the line or from a feedback loop associated with the pressure subsystem associated with an airflow-based sorting device). However, if sorting logic 712 determines that the first sorting device cannot/has not successfully performed a sorting operation on the target object, sorting logic 712 is configured to then select a second sorting device (e.g., the second sorting device is located downstream along the direction of the movement of conveyor device(s) relative to the location of the first sorting device) to perform a sorting operation on the "missed" target object. Sorting logic 712 can select the second sorting device based on the updated/current trajectory of the target object and the location of the second sorting device. The updated/current trajectory of the target object can be determined based on newly sensed data associated with the target object. Sorting logic 712 can send a control signal to the second sorting device to perform a sorting operation on the target object and/or re-insert the data structure of the target object on a message queue.

In some embodiments, sorting logic 712 is configured to send control signals to sorting devices or other components within the sorting facility over an API. In some embodiments, sorting logic 712 is configured to provide mechanism software interfaces (MSIs) to enable sorting devices to access outputs by the compute node. For example, each MSI includes logic specific to its target device (e.g., a robot or a user interface) and subscribes to one or more message queues that are published by (e.g., object tracking logic 708 of) the compute node.

Chemical database 714 is configured to store mappings between object/material classifications with chemical properties. In some embodiments, chemical database 714 can be implemented similarly to chemical database 216 of the example cloud sorting server of FIG. 2. In some embodiments, chemical database 714 can receive updates of new or updated mappings over time from the cloud sorting server. In some embodiments, chemical database 714 can receive manual updates of new or updated mappings via user interface 706.

Metadata collection logic 716 is configured to collect metadata associated with the operation of the sorting facility. As described above, metadata that relates to a sorting facility can include operational data, raw sensed data, processed sensed data (e.g., panoramas), error logs, and data on identified objects traversing a conveyance system, their attributes, and information regarding placement and pick or harvesting of the target objects. In some embodiments, metadata collection logic 716 is configured to collect metadata at the compute node, from other compute nodes, from object recognition devices, and/or from sorting devices at the sorting facility. In some embodiments, metadata collection logic 716 is configured to store the collected metadata at metadata storage 718. In some embodiments, metadata collection logic 716 is configured to send collected metadata to a cloud sorting server at a regular interval or in response to a request from the cloud sorting server. As described above, the cloud sorting server can use metadata that is obtained from sorting facilities to train machine learning models that the server will later propagate to the sorting facilities for use.

Third-party query logic 720 is configured to query third-party servers for current information and then programmatically reconfigure sorting parameters that are used by sorting logic 712 of the compute node by sorting devices. Examples of such sorting parameters include a set of target object criteria, a set of suppression criteria, a set of sorting parameters, and priorities assigned to different object types. In some embodiments, in response to a user input (e.g., by an operator at the sorting facility) to enter the sorting facility into a "smart mode," third-party query logic 720 is configured to obtain commodity prices from one or more third-party servers and then reconfigure sorting parameters in a manner as to result in material sorting being optimized based on commodity prices. For example, object training and recognition would remain the same, but the reconfigured sorting parameters may cause those target objects that are associated with the subset of object types with the highest commodity value at that time to be prioritized to be sorted by sorting devices. In this way, the operator may enable sorting devices or entire sorting lines to change dynamically based upon economic desirability of the sorted products. In some embodiments, sorting logic 712 has maintained a set of material priorities (e.g., HDPE-C & HDPE-N) and at each decision interval (i.e., the potentially variable period of time to evaluate commodity prices), third-party query logic 720 is configured to obtain an updated set of regional pricing information from one or more third-party servers. Based on these updated values, third-party query logic 720 is configured to update prioritization parameters in a manner so as to result in maximizing the revenue per sorted object.

Figure 10:
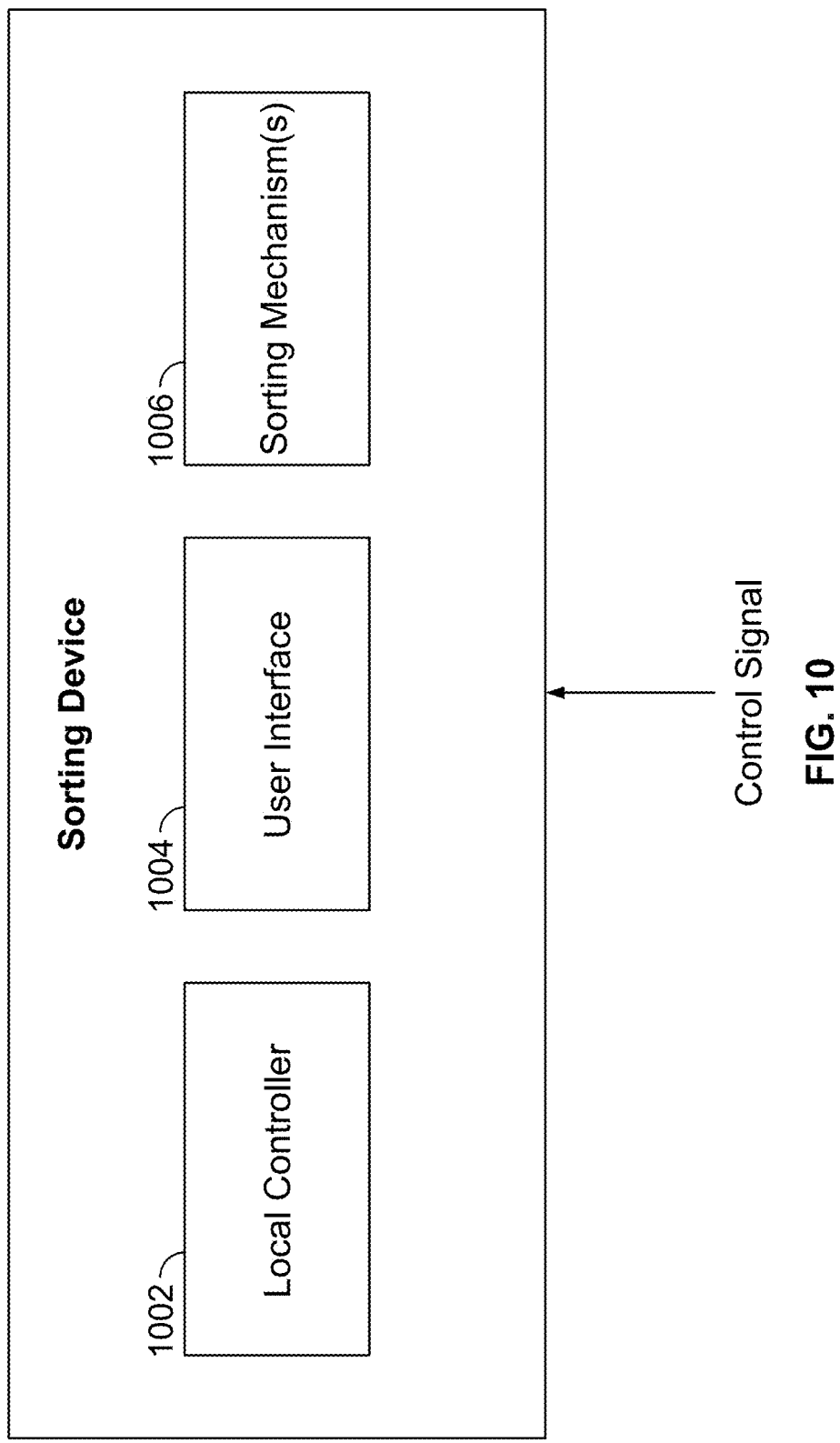
FIG. 10 is a diagram showing an example of a sorting device.

FIG. 10 is a diagram showing an example of a sorting device. In some embodiments, each of a sorting device of FIG. 4, sorting device 508 of FIG. 5, and sorting device 608 of FIG. 6 may be implemented using the example sorting device of FIG. 10. In the example of FIG. 10, the example sorting device includes local controller 1002, user interface 1004, and sorting mechanism(s) 1006. In various embodiments, local controller 1002 may be implemented using one or more processors or a microcontroller. User interface 1004 includes a human-machine interface. Sorting mechanism(s) 1006 may be implemented using one or more types of mechanisms that can be used to perform a sorting operation on a target object to remove the target object out of a stream of objects. In a first example, sorting mechanism(s) 1006 comprise one or more arrays of air orifices that are connected to one or more sources of pressurized air and as such, sorting mechanism(s) 1006 perform a sorting operation by shooting air towards a target object to deflect the target object into a collection container. In a second example, sorting mechanism(s) 1006 comprise a suction cup that is actuated by a robot system and as such, sorting mechanism(s) 1006 perform a sorting operation by dropping down onto a target object and picking it off a conveyor device and then dropping the object into a collection container. In a third example, sorting mechanism(s) 1006 comprise one or more air vents that are connected to a vacuum source and as such, sorting mechanism(s) 1006 perform a sorting operation by vacuuming a target object off a conveyor device and through a tube at the end of which the target object will drop into a collection container. In a fourth example, sorting mechanism(s) 1006 comprise one or more actuated pushing mechanisms and as such, sorting mechanism(s) 1006 perform a sorting operation by physically contacting (striking) the target object to cause the target object to be deposited into a collection container.

In some embodiments, local controller 1002 is configured to receive control signals from an internal processor or from an external/remote processor (e.g., associated with one or more local compute nodes or a cloud sorting server) and to interpret the received control signals to cause sorting mechanism(s) 1006 to perform the instructed sorting operations on the appropriate target objects. For example, local controller 1002 can determine when to cause sorting mechanism(s) 1006 to fire (e.g., shoot air onto target object(s)), which subset of sorting mechanism(s) 1006 to fire, with what force sorting mechanism(s) 1006 should fire with, and/or for how long sorting mechanism(s) 1006 should fire continuously or intermittently based on one or more sorting parameters that are included in the received control signals. In the specific example in which sorting mechanism(s) 1006 comprise an array of air orifices that are connected to pressurized air sources, local controller 1002 is configured to cause at least a subset of the air orifices of the array to shoot air at a particular time so that the airflow can deflect a target object into a collection container (e.g., just after that target object falls off a conveyor device).

In some embodiments, local controller 1002 is configured to obtain data structures associated with target objects that are published on a message queue by one or more compute nodes and use the information included in the data structures to compute sorting parameters associated with sorting operations to be performed on the target objects. As mentioned above, a compute node can determine attributes associated with a target object such as, for example, attributes, object type, material characteristic type, position, trajectory, and bounding polygon and then include such information into a data structure associated with the target object. The compute node can then publish the data structure associated with the target object on a message queue so that other components of the sorting facility, such as downstream sorting devices, that subscribe to the message queue can obtain information on the target object from the message queue. In some embodiments, local controller 1002 can use the current position and the trajectory of a target object to calculate the sorting parameter of an optimal location (e.g., along a conveyor device) to perform a sorting operation with respect to (e.g., capturing/picking up of) the target object. Local controller 1002 can also use the information associated with a target object that is published on the message queue to compute other sorting parameters associated with a sorting operation to perform on the target object such as, for example, the force with which to exert on the target object, the angle with which to make contact with the target object, the subset of sorting mechanism(s) 1006 to use to perform the sorting operation, and/or the depth (relative to the surface of a conveyor device) at which to perform the sorting operation. Local controller 1002 is then configured to use the sorting parameters that it had computed to cause sorting mechanism(s) 1006 to perform a sorting operation on a target object.

In some embodiments, local controller 1002 is configured to determine whether a sorting operation that is being or has been performed on a target object is successful or not. For example, the sorting operation is to pick up/capture the target object from the conveyor device. In some embodiments, local controller 1002 can determine whether the target object has been successfully picked up/captured from the conveyor device based on the force/weight that is pulling on sorting mechanism(s) 1006 and/or whether the profile of the suction airflow through sorting mechanism(s) 1006 has sufficiently changed (e.g., based on a pressure sensor). In some embodiments, local controller 1002 can determine that a sorting operation cannot be successfully performed on the target object by the present sorting device because another target object's position and/or trajectory blocks the present sorting device's sorting mechanism(s) 1006 from reaching the target object. Local controller 1002 can update the data structure of the target object based on the success or failure of the sorting operation on the target object. Local controller 1002 can also publish the updated data structure of the target object back on a message queue so that another component (e.g., a downstream sorting device) within the sorting facility can obtain the updated information on the target object (e.g., to perform a subsequent sorting operation on the target object). In some embodiments, in the event that local controller 1002 determines that the sorting device had failed to successfully perform a sorting operation on the target object, local controller 1002 is configured to directly or indirectly send a message to a compute node in the sorting facility so that the compute node can instruct (e.g., via a control signal) another downstream sorting device to perform a sorting operation on the "missed" target object, thereby enabling multiple chance targeting on the same target object.

User interface 1004 is configured to receive user input configurations with respect to sorting to be performed by the sorting device. For example, user interface 1004 includes an HMI. In some embodiments, the sorting device is preconfigured with one or more application types where each application type is associated with its respective combination of sorting line type, process flow, operator preference, and commodity/market value of object. For example, at the time that the sorting device is being installed at the sorting facility, the operator of the sorting facility can select a desired application type to be implemented by the sorting device. In some embodiments, the operator can select, at user interface 1004 (or a separate web-based user interface), for the sorting device to perform, based on a set of desired "ground truths," a selected line type, a selected set of material preferences (e.g., targeted/non-targeted materials, allowable/prohibited contaminants, etc.), or other selected parameters relevant to their use case (e.g., color types for suitcases). At installation time, the sorting device automatically runs a "ground truth" mode and initiates a learning process for objects that are observed, for which data is sensed by object recognition devices that are associated with the sorting device. In some embodiments, local controller 1002 is configured to transmit both metadata and some set of actual sensor/image data to the cloud sorting server. For example, the sensed data can be programmatically labeled (e.g., by the cloud sorting server) to become a part of the baseline "ground truth" for the application, and unidentified objects can be manually annotated or used as part of a neural network training exercise. For example, the annotated data (which is specific to the sorting device's line type/use case) is then used by the cloud sorting server to train machine learning models that it will send back to the sorting facility to be used locally at the sorting facility. In all cases, the operator-selected objects are automatically used to create the baseline for their application. Sorting device performance is then simulated against the baseline set, and the actual sorting device local parameters are adjusted by the cloud sorting server to optimize against the operator objectives.

Figure 11:
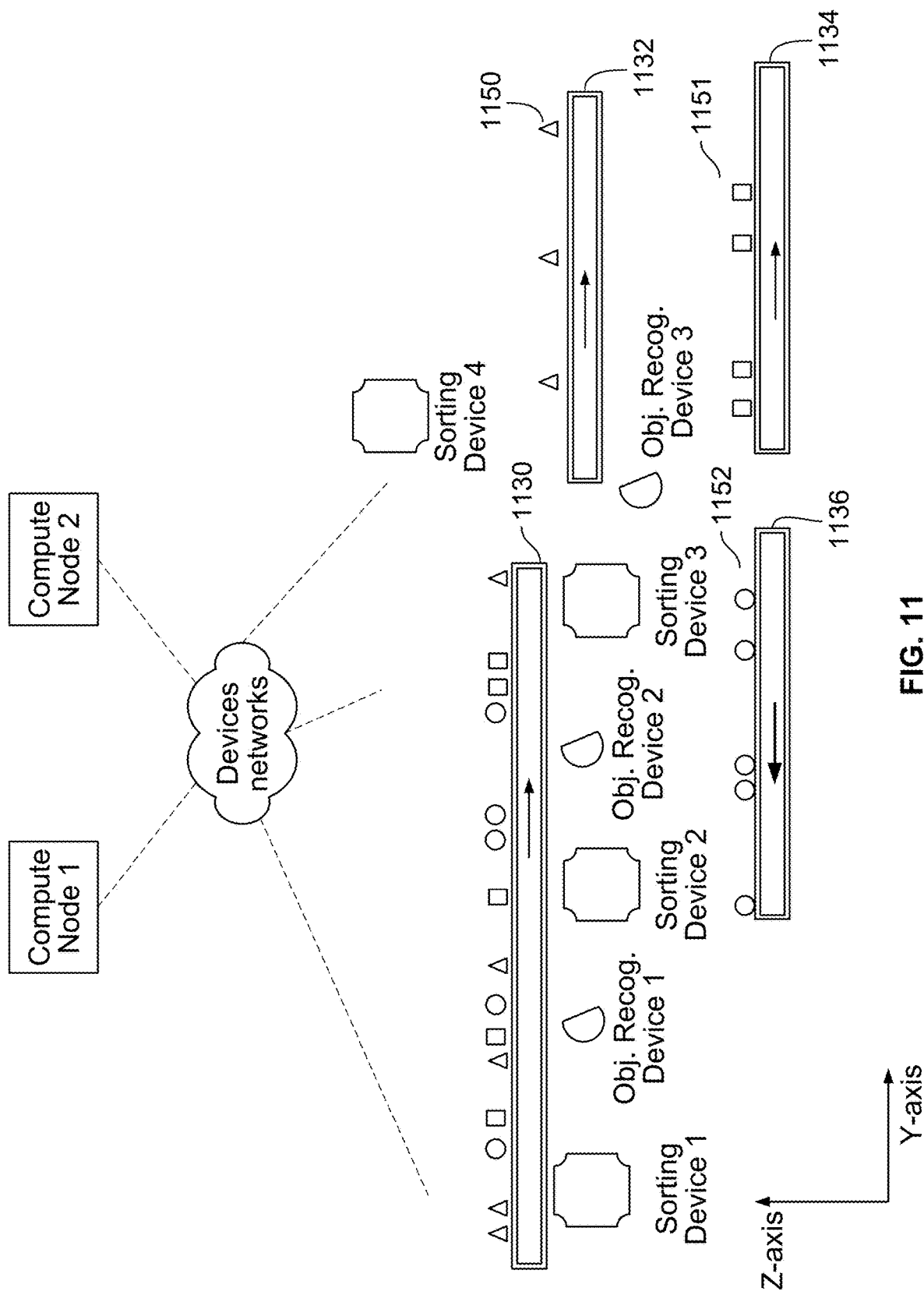
FIG. 11 is a diagram showing components in a sorting facility that performs heterogeneous material sorting.

FIG. 11 is a diagram showing components in a sorting facility that performs heterogeneous material sorting. In some embodiments, the sorting facility of FIG. 4 can be implemented similar to the example sorting facility of FIG. 11. As will be described below, different capabilities of different sorting device types can be mapped to different object types such that sorting devices can be selected to remove/manipulate objects of their respectively mapped object types off of a conveyor device (e.g., and onto another). One example use case of employing different sorting device types is to separate a heterogeneous mix of objects from one conveyor device and onto separate conveyor devices that are each associated with additional processing for one or more designated object types.

In some embodiments, multiple device networks provide data communications between compute nodes (1 and 2) of the sorting facility, object recognition devices (1, 2, and 3), and sorting devices (1 through 4). The data networks are implemented using a variety of communication protocols (e.g., IP over Wifi, Zigbee, Modbus, IP over ethernet, etc.) based upon the network capabilities of the disparate devices. Conveyor device 1130 is configured to transport a heterogeneous stream of materials (for example, mixed recyclables, packages, luggage, or partially processed waste streams) at a variable or constant rate within a facility. By way of example, three different object types are portrayed in the heterogenous stream: object types 1150, 1151, and 1152. Each object may have different characteristics, requiring either different recognition paths for the machine learning algorithm running on compute nodes 1 and 2, different control signals for sorting devices 1 through 3 based upon the physical requirements needed to manipulate an object type, or both. For example, object type 1150 could represent a large, dense, multi-faceted object, and as such can only be manipulated by one of the three sorting devices pictured (e.g., only sorting device 4 has the necessary strength to lift objects of object type 1150). In this case, compute nodes 1 or 2 (or a remote cloud sorting server that is in combination with compute nodes 1 and 2) can dynamically configure the system such that control signals specific to object type 1150 are sent only to sorting device 4. Sorting device 4 then processes the control signal in order to manipulate objects of object type 1150 onto a separate conveyor device, conveyor device 1132, for subsequent sorting and deposition in a collection area/container that is specific to object type 1150 (not shown in diagram). Similarly, compute nodes 1 or 2 (or a remote cloud sorting server that is in combination with compute nodes 1 and 2) can dynamically configure the system such that control signals specific to object type 1151 are sent only to sorting device 3. Sorting device 3 then processes the control signal in order to manipulate objects of object type 1151 onto a separate conveyor device, conveyor device 1134, for subsequent sorting and deposition in a collection area/container that is specific to object type 1151 (not shown in diagram). Further, compute nodes 1 or 2 (or a remote cloud sorting server that is in combination with compute nodes 1 and 2) can dynamically configure the system such that control signals specific to object type 1152 are sent only to sorting device 2. Sorting device 2 then processes the control signal in order to manipulate objects of object type 1152 onto a separate conveyor device, conveyor device 1136, for subsequent sorting and deposition in a collection area/container that is specific to object type 1152 (not shown in diagram). With a large set of object characteristics (e.g., mass, size, ratios of mass/dimensions, etc.), in some embodiments, it is possible to map more than one object type to a sorting device type. For example, a sorting device that comprises a sorting robot with a suction mechanism may be capable to pick/capture/grip many different types of plastic, glass, or metal objects, and thus can be mapped to many different objects. Similarly, when a sorting type is mapped to multiple object types, a control signal that is generated by a compute node may differ (e.g., be configured with a different sorting parameter) depending upon the detected object type of an object. For example, a sorting device type that emits positive flows to sort objects might be commanded to different pressure levels for a plastic bottle as opposed to a metallic can, even though a same sorting device is being utilized. Thus, the control logic implemented by a compute node (local or remote) may vary based upon the target sorting device type (e.g., air emitter versus robotic arm types of sorting devices), the target object (e.g., metal vs plastic bottle), or the combination of the two (e.g., paper versus sheet plastic for an air emission type of sorting device).

Figure 12:
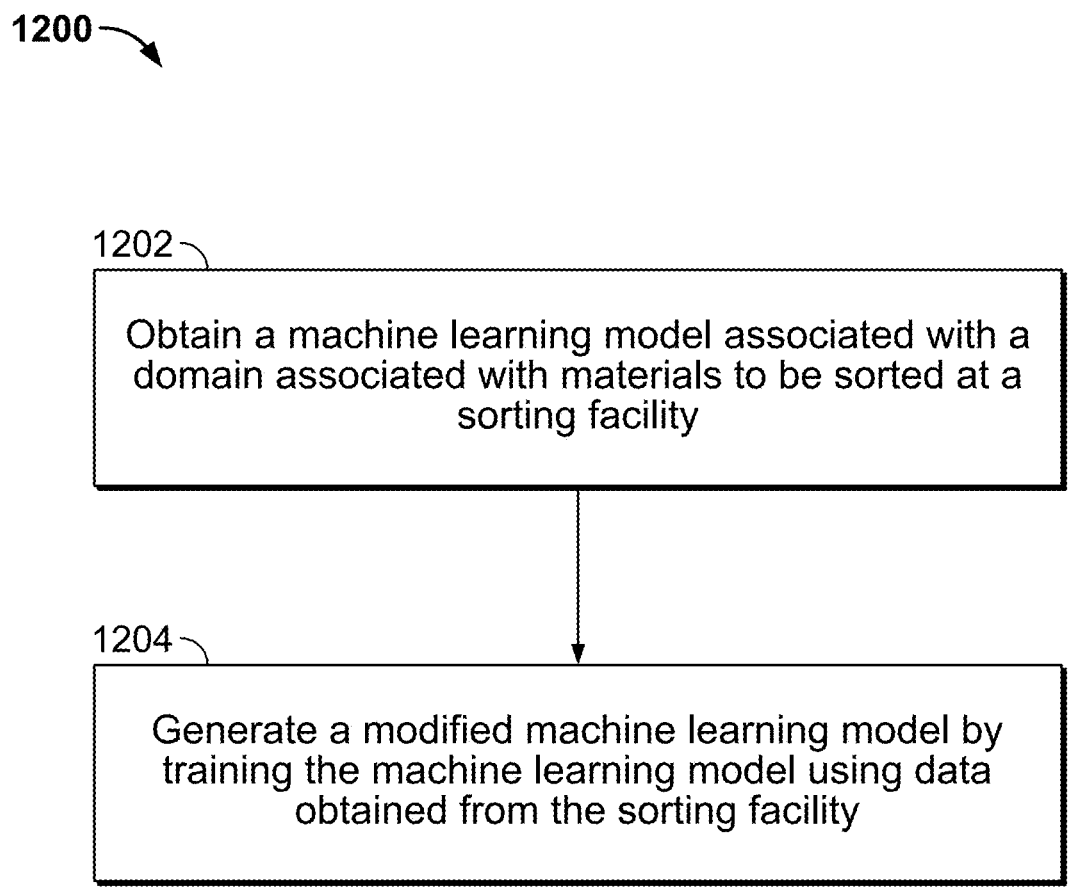
FIG. 12 is a flow diagram showing an embodiment of a process for generating a modified machine learning model using data obtained from a sorting facility.

FIG. 12 is a flow diagram showing an embodiment of a process for generating a modified machine learning model using data obtained from a sorting facility. In some embodiments, process 1200 is performed at a cloud sorting server such as cloud sorting server 112 of FIG. 1.

At 1202, a machine learning model associated with materials to be sorted at a sorting facility is obtained. As described above, machine learning models can be trained based on materials associated with a particular domain (e.g., organics, construction and demolition, single stream recyclables). A sorting facility can be designated to sort materials associated with a particular domain (e.g., at a time). The machine learning model that corresponds to identifying materials associated with the domain that the sorting facility is designated to sort (e.g., at one time) can be sent from the cloud sorting server to the sorting facility so that the model can be deployed by (e.g., compute nodes at) the sorting facility to detect and sort relevant objects.

At 1204, a modified machine learning model is generated by training the machine learning model using data obtained from the sorting facility. Data is obtained from the (e.g., the compute nodes of the) sorting facility and then used to modify the domain-related machine learning model to improve the model and/or customize the model to the conditions of that sorting facility. For example, modifying the machine learning model using the sorting facility specific data can be to train the model using the sorting facility-specific data and then generating a new output layer for the model. For example, sorting facility specific data may include metadata (for which examples have been described above), sensed data (e.g., including panoramas), and annotated data that is submitted by an operator of the sorting facility. In some embodiments, the machine learning model associated with the domain can be trained based on data obtained from more than one sorting facility (e.g., the two or more sorting facilities share a common attribute such as being located in the same geographic region). In some embodiments, the modified machine learning model can be sent to one or more sorting facilities for the facilities to use to improve their detection of objects that are being processed/sorted at those facilities.

Figure 13:
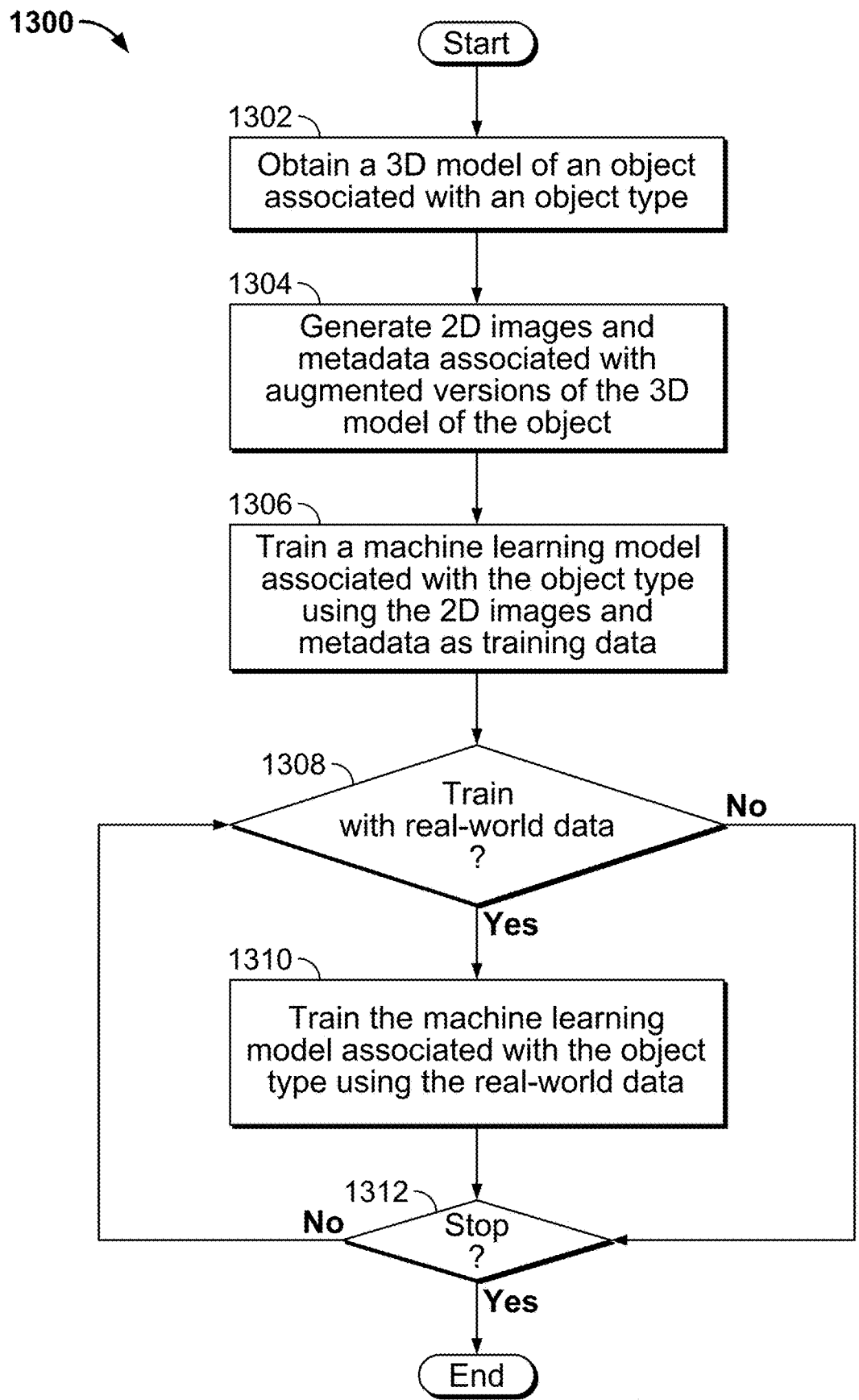
FIG. 13 is a flow diagram showing an example process for training a machine learning model using synthetic data.

FIG. 13 is a flow diagram showing an example process for training a machine learning model using synthetic data. In some embodiments, process 1300 is implemented by a cloud sorting server such as cloud sorting server 112 of FIG. 1 or the cloud sorting server of FIG. 2.

As described above, in some embodiments, synthetic data can be used to train (e.g., to augment or to bootstrap) a machine learning model for edge-cases, to support recognition of many SKUs (variants on an object) in an efficient manner, and where real-world data for an object is not available (e.g., the object is a new product that is yet to be released or widely distributed).

At 1302, a 3D model of an object associated with an object type is obtained. The 3D model of the object can be generated by a 3D graphics engine (e.g., Unreal or Unity). For example, the 3D model can be generated based on scanned images of the object.

At 1304, 2D images and metadata associated with augmented versions of the 3D model of the object are generated. The 3D model is then subjected to various changes and manipulated in different ways so as to create augmented versions of the object. For example, the 3D model can be manipulated to display any position or angle, and even deconstructed or "damaged" to create multi-angle views of crushed, torn, or otherwise mangled versions of the object. Furthermore, the lighting, backgrounds, reflectivity, shading, surface staining, and even occlusion by other objects can also be adjusted with respect to different manipulations of the object. For each augmented version of the 3D model, one or more 2D digital images and metadata (among other forms of synthetic data) can be generated.

At 1306, a machine learning model associated with the object type is trained using the 2D images and metadata as training data. The 2D digital images and the metadata can be annotated and then used as training data to train a machine learning model so that the model can be taught to recognize the object associated with the 3D model and also in various states. For example, if the object that is represented by the 3D model were a new type of plastic bottle design, then the machine learning model that is trained on the synthetic data can be an existing model that is capable of recognizing plastic bottles.

At 1308, whether the machine learning model associated with the object type should be trained with real-world data is determined. In the event that the machine learning model associated with the object type should be trained with real-world data, control is transferred to 1310. Otherwise, in the event that the machine learning model associated with the object type should not be trained with real-world data, control is transferred to 1312. In some embodiments, the machine learning model is then further refined with real-world data related to the object. For example, after the model has been trained on the synthetic 2D digital images and metadata, real-world data on the object including, for instance, real-world data such as collected sensed data on the object that is captured at sorting facilities becomes available. The model can be further trained on this real-world data to improve the model's recognition of the object given real-world conditions (and not just the synthetic conditions associated with the 2D images and metadata).

At 1310, the machine learning model associated with the object type is retrained using the real-world data.

At 1312, whether training using synthetic data is to be stopped is determined. In the event that training using synthetic data is to be stopped, process 1300 ends. Otherwise, in the event that training using synthetic data is not to be stopped, control is returned to 1308. For example, the machine learning model can be retrained/improved over and over again using additional real-world data. While not shown in FIG. 13, in some embodiments, the model can also be repeatedly retrained with additional synthetic data over time.

Figure 14:
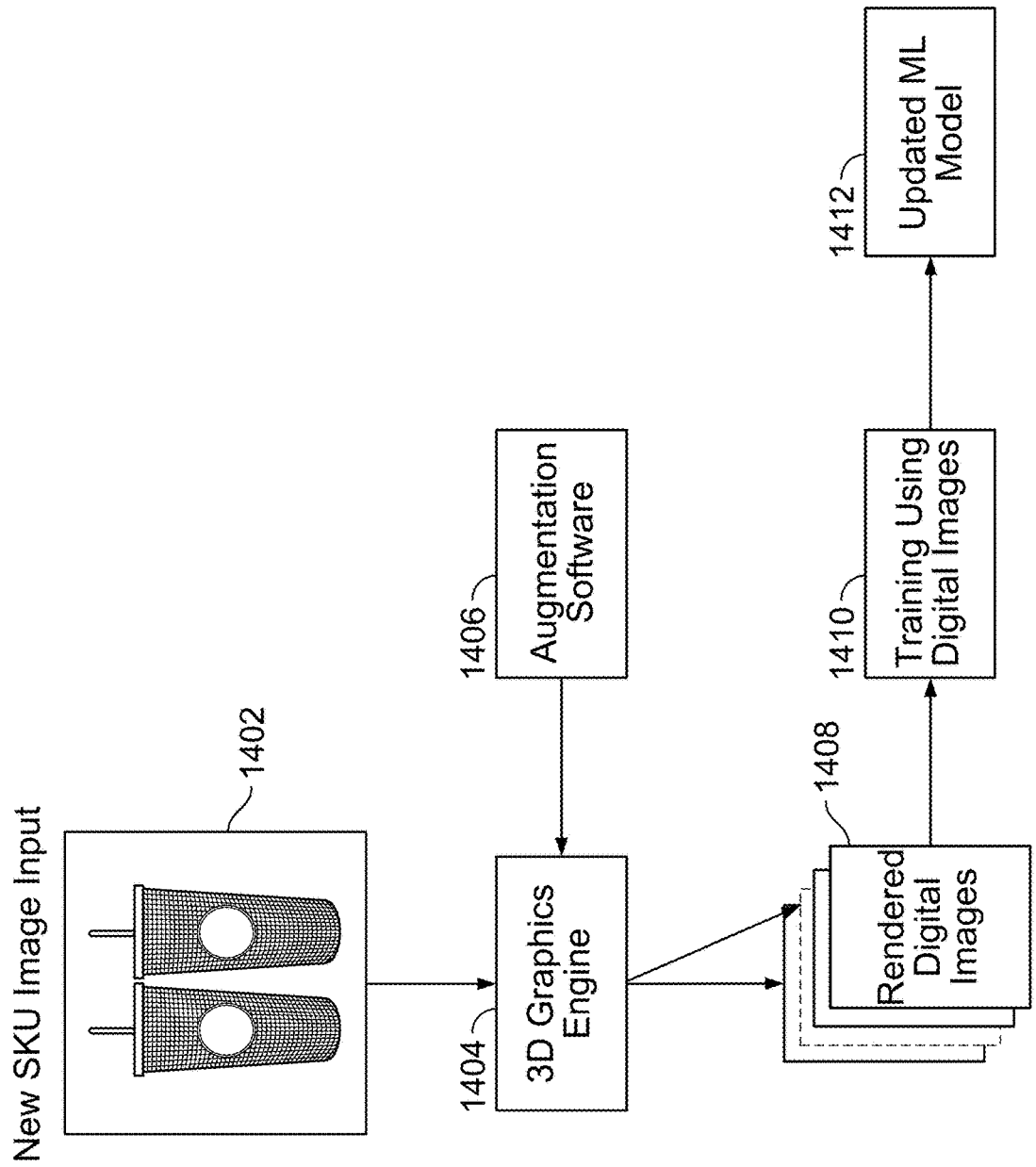
FIG. 14 is a diagram showing an example process for training a machine learning model using synthetic data associated with a new SKU.

FIG. 14 is a diagram showing an example process for training a machine learning model using synthetic data associated with a new SKU. In the example of FIG. 14, at 1402, images of a new SKU associated with a new plastic cup with a straw are input into the system. At 1404, the images of the new SKU are input into a 3D graphics engine to generate a 3D model of the new SKU. At 1406, an augmentation software is run to modify the 3D model according to various augmentations and ambient conditions. At 1408, digital images (synthetic data) are rendered from each of the combinations of different augmentations and conditions to which the 3D model was subject. At 1410, the digital images are used as training data to train a machine learning (ML) model. At 1412, the updated ML model is obtained. The updated ML model, having been trained on the rendered digital images, is able to recognize the new SKU from images of the new SKU in different states and under different conditions.

Figure 15:
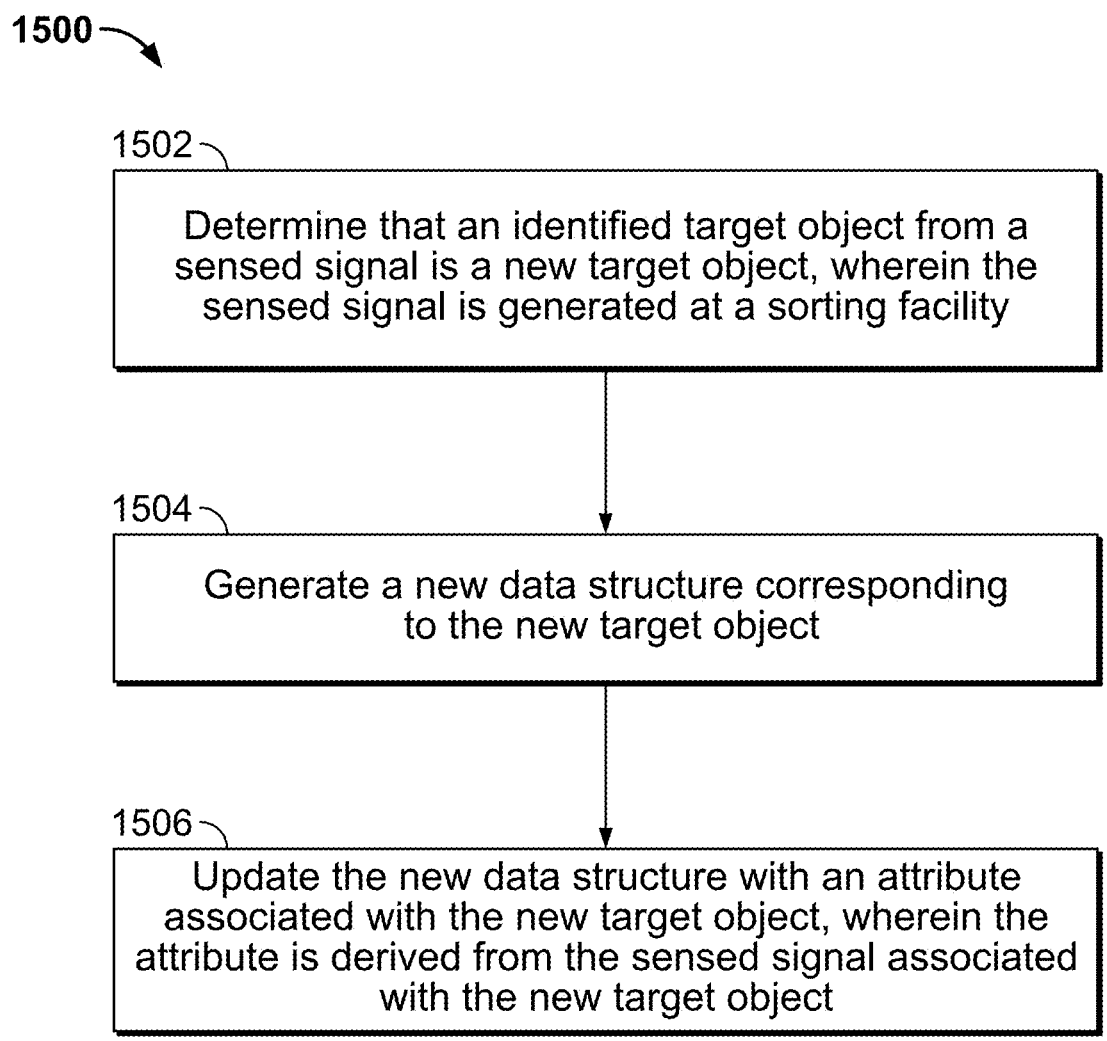
FIG. 15 is a flow diagram showing an embodiment of a process for generating a new data structure to track information associated with a new target object.

FIG. 15 is a flow diagram showing an embodiment of a process for generating a new data structure to track information associated with a new target object. In some embodiments, process 1500 is implemented by a compute node at a sorting facility such as a compute node of FIG. 4, compute node 502 of FIG. 5, compute node 602 of FIG. 6, or the compute node of FIG. 7.

Figure 16:
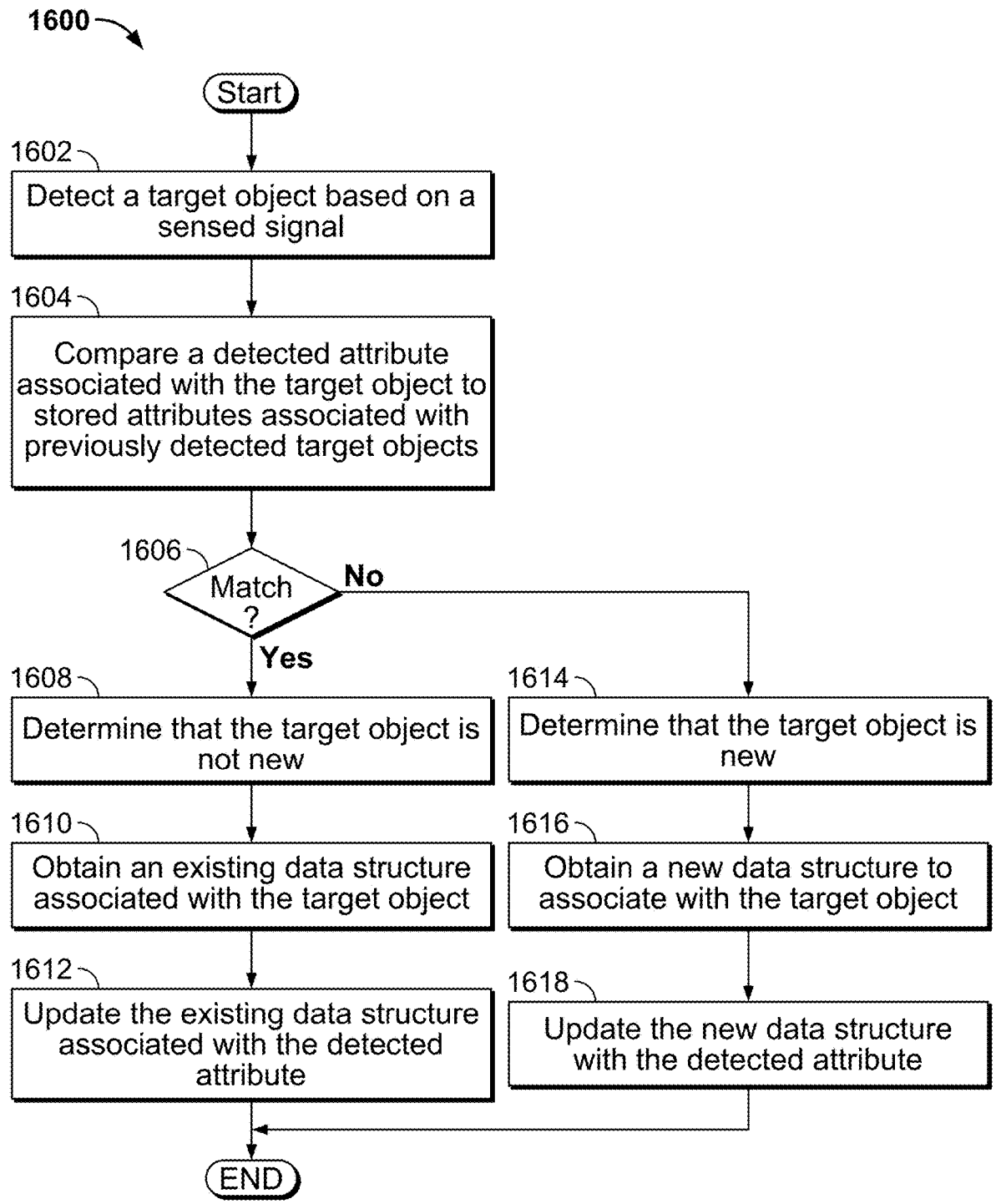
FIG. 16 is a flow diagram showing an example process for determining whether a newly detected target object is a new target object or not.

At 1502, it is determined that an identified target object from a sensed signal is a new target object, wherein the sensed signal is generated at a sorting facility. An object is detected at a sorting facility by applying machine learning to sensed data (e.g., captured image frames) with respect to the object. The object is determined to be a target object if its determined attributes match a set of target object criteria. In some embodiments, whether the target object has been previously detected before is determined by comparing the determined attributes associated with the target object with the stored attributes of previously detected target objects. For example, the attributes of a previously detected target object can be stored in a data structure that has been maintained for that previously detected target object. If the determined attributes associated with the new target object match those of a previously detected target object, then the target object is not new. But if the determined attributes associated with the new target object do not match those of a previously detected target object, then the target object is new. In some embodiments, whether the object is a target object or not can be determined at the compute node in the sorting facility or by a remote cloud sorting server using the sensed data that was obtained at the sorting facility. FIG. 16, below, describes an example process of determining whether a detected target object is a new target object or not.

Returning to FIG. 15, at 1504, a new data structure corresponding to the new target object is generated. A new data structure is generated/obtained for the new target object.

Figure 17:
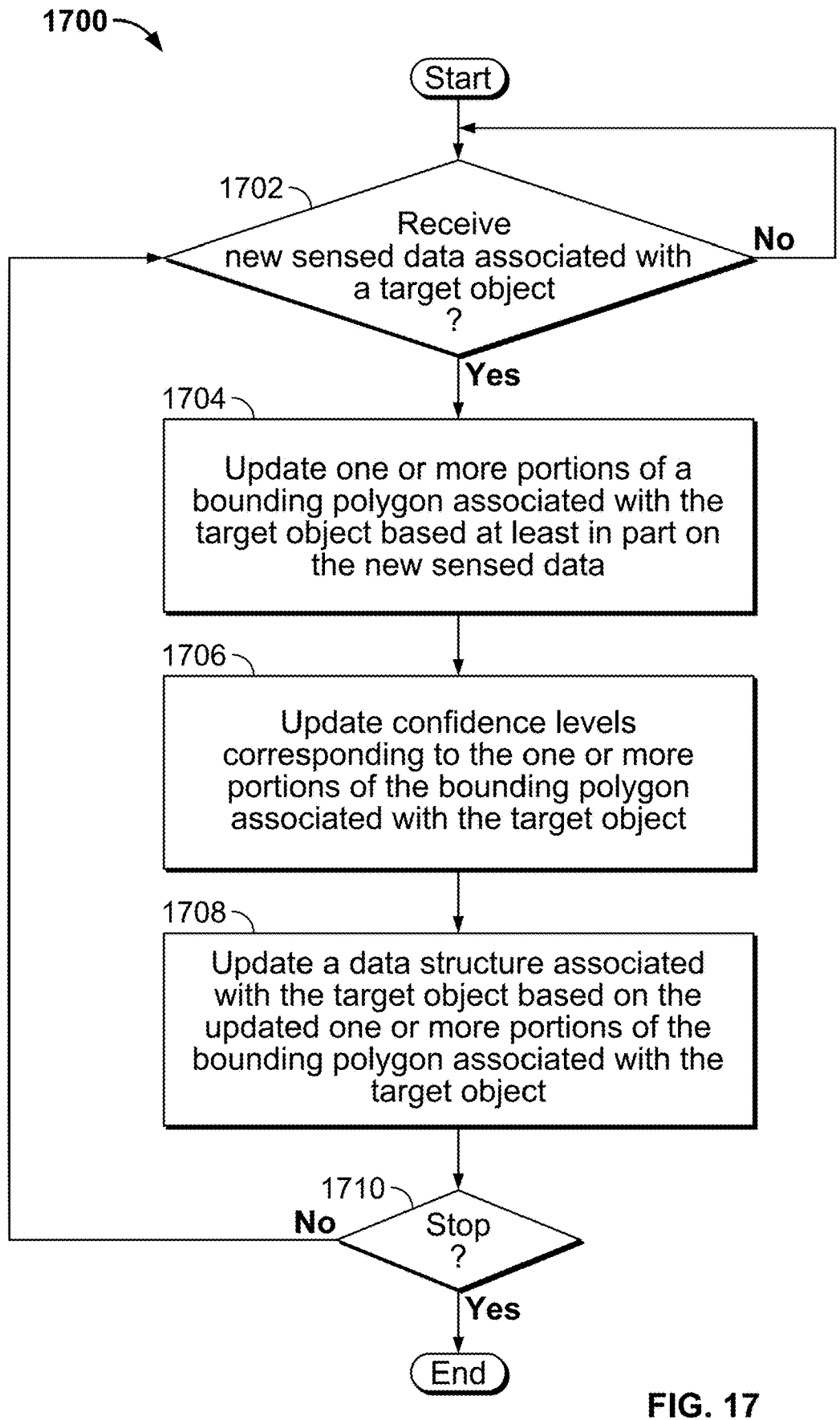
FIG. 17 is a flow diagram showing an example process of updating a dynamically variable bounding polygon associated with a target object.

At 1506, the new data structure is updated with an attribute associated with the new target object, wherein the attribute is derived from the sensed signal associated with the new target object. Attributes that are determined for the new target object are stored in the data structure. Examples of such attributes may include the position/location, trajectory, object type, material characteristic type, and bounding polygon associated with the new target object. In some embodiments, information that is derived from the attributes that are determined from the sensed data is also included in the data structure associated with the new target object. For example, based on the object type that is determined for the new target object using sensed data associated with the object, a deposit location in which to deposit the new target object can be determined. As such, the deposit location that corresponds to the object type of the new target object can also be included in the new data structure. As described above, the data structure that is maintained for a target object is dynamic and can be updated over time as new sensed data is obtained on the corresponding target object. For example, when new sensed data is obtained on the corresponding target object, the object's bounding polygon can be updated based on the new sensed data and/or the object's current trajectory can be updated based on the new sensed data. FIG. 17, below, describes an example process of dynamically updating an object's bounding polygon based on new sensed data associated with the object. Returning to FIG. 15, the updated attributes (e.g., new bounding polygon and current trajectory) associated with the target object can replace the previously determined attributes (e.g., previous bounding polygon and previous trajectory). Furthermore, the data structure associated with an object can be updated with the results (e.g., success or failure) of a sorting operation that was attempted on the target object.

FIG. 16 is a flow diagram showing an example process for determining whether a newly detected target object is a new target object or not. In some embodiments, process 1500 of FIG. 15 can be implemented using process 1600. In some embodiments, process 1500 is implemented by a compute node at a sorting facility such as a compute node of FIG. 4, compute node 502 of FIG. 5, compute node 602 of FIG. 6, or the compute node of FIG. 7.

At 1602, a target object is detected based on a sensed signal. An object is first detected by applying machine learning techniques on sensed data that is captured at a sorting facility. For example, at least captured image data of objects traveling on a conveyor device is analyzed to first determine the location/bounding polygon of an object that is presented within the image data. Then, the areas of the image(s) associated with the determined location/bounding polygon of the object are further analyzed to determine the object type and other attributes of that object. The determined attributes associated with the object are then compared against a set of target object criteria to determine that the object is a target object.

At 1604, a detected attribute associated with the target object is compared to stored attributes associated with previously detected target objects. Detected attributes associated with the newly detected target object are then compared against the stored attributes of previously detected target objects. In some embodiments, attributes of previously detected target objects are stored in the data structures that are maintained for those target objects. Examples of a detected attribute may include the position/location, trajectory, object type, material characteristic type, and bounding polygon associated with the newly detected target object.

At 1606, it is determined whether the detected attribute associated with the target object matches stored attributes associated with previously detected target objects. In the event that the detected attribute associated with the target object matches stored attributes associated with previously detected target objects, control is transferred to 1608. Otherwise, in the event that the detected attribute associated with the target object does not match stored attributes associated with previously detected target objects, control is transferred to 1614. If there is a match or correlation between the detected attribute associated with the newly detected target object, then it is determined that the target object is not new and one that has been previously determined and for which a data structure is already maintained. Otherwise, if there is not a match or correlation between the detected attribute associated with the newly detected target object, then it is determined that the target object is new and one that has not been previously determined.

At 1608, it is determined that the target object is not new.

At 1610, an existing data structure associated with the target object is obtained.

At 1612, the existing data structure associated with the detected attribute is updated. Where the target object is determined to be one for which an existing data structure is already maintained, that existing data structure may be updated with the detected attribute. For example, if the detected attribute were a current trajectory associated with the target object, then a previously determined trajectory that is stored in the existing data structure is replaced with the current trajectory (because the newer trajectory is presumed to be more accurate).

At 1614, it is determined that the target object is new.

At 1616, a new data structure is obtained to associate with the target object.

At 1618, the new data structure is updated with the detected attribute. Where the target object is determined to be new for which an existing data structure is not already maintained, a new data structure is obtained and also updated with the detected attribute.

FIG. 17 is a flow diagram showing an example process of updating a dynamically variable bounding polygon associated with a target object. In some embodiments, process 1700 is implemented by a compute node at a sorting facility such as a compute node of FIG. 4, compute node 502 of FIG. 5, compute node 602 of FIG. 6, or the compute node of FIG. 7.

In some embodiments, a dynamically variable bounding polygon (e.g., box) around a target object can be defined to estimate the shape of the target object from sensed data on the target object. For example, machine learning models can be applied to captured images of a target object to identify the edges and therefore shape of the target object. The bounding polygon can be dynamically variable because the bounding polygon can be divided into multiple portions and where each portion of the bounding polygon can be associated with its own confidence level depending on how much sensed data is available for that portion of the target object. For example, a portion of the target object that is very visible in the sensed data can be assigned a higher confidence level and a portion of the target object that is not very visible in the sensed data can be assigned a lower confidence level. As described above, a target object can travel through a sorting facility and become observed by object recognition devices throughout the sorting facility more than once. As will be described below with process 1700, as more sensed data becomes available for a target object (e.g., as more images of the target object at one or more angles are captured), the sensed data is analyzed to update the dynamically variable bounding polygon around the target object including to increase the confidence levels for portions of the bounding polygon for which more sensed data has been obtained.

At 1702, whether new sensed data associated with a target object is received is determined. In the event that the new sensed data associated with a target object is received, control is transferred to 1704. Otherwise, in the event that the new sensed data associated with a target object is not received, 1702 is returned to. For example, new sensed data can be received from one or more object recognition devices that are directed on objects that are being transported through a sorting facility.

At 1704, one or more portions of a bounding polygon associated with the target object are updated based at least in part on the new sensed data. As more portions of the target object can be depicted and more clearly observed in the sensed data, the more accurate the bounding polygon estimate for the target object can be. For example, to update the bounding polygon associated with a target object, the shape of the bounding polygon can be adjusted to better conform to the true shape of the target object that is shown in the sensed data.

At 1706, confidence levels corresponding to the one or more portions of the bounding polygon associated with the target object are updated. The more sensed data that there is available to use to determine a portion of a bounding polygon, the greater the confidence level that is to be assigned to that portion will be.

At 1708, a data structure associated with the target object is updated based on the updated one or more portions of the bounding polygon associated with the target object. As described above, information associated with a target object, such as the object's current bounding polygon, can be tracked in a data structure that is associated with the target object.

At 1710, whether the bounding polygon associated with the target object is to be updated again is determined. In the event that the bounding polygon associated with the target object is not to be updated again, process 1700 ends. Otherwise, in the event that the bounding polygon associated with the target object is to be updated again, control is returned to 1702. For example, a bounding polygon associated with the target object may not be updated again if it is determined that a sorting operation has already been performed on the target object (e.g., and that the target object has been deposited into a collection container).

Figure 18:
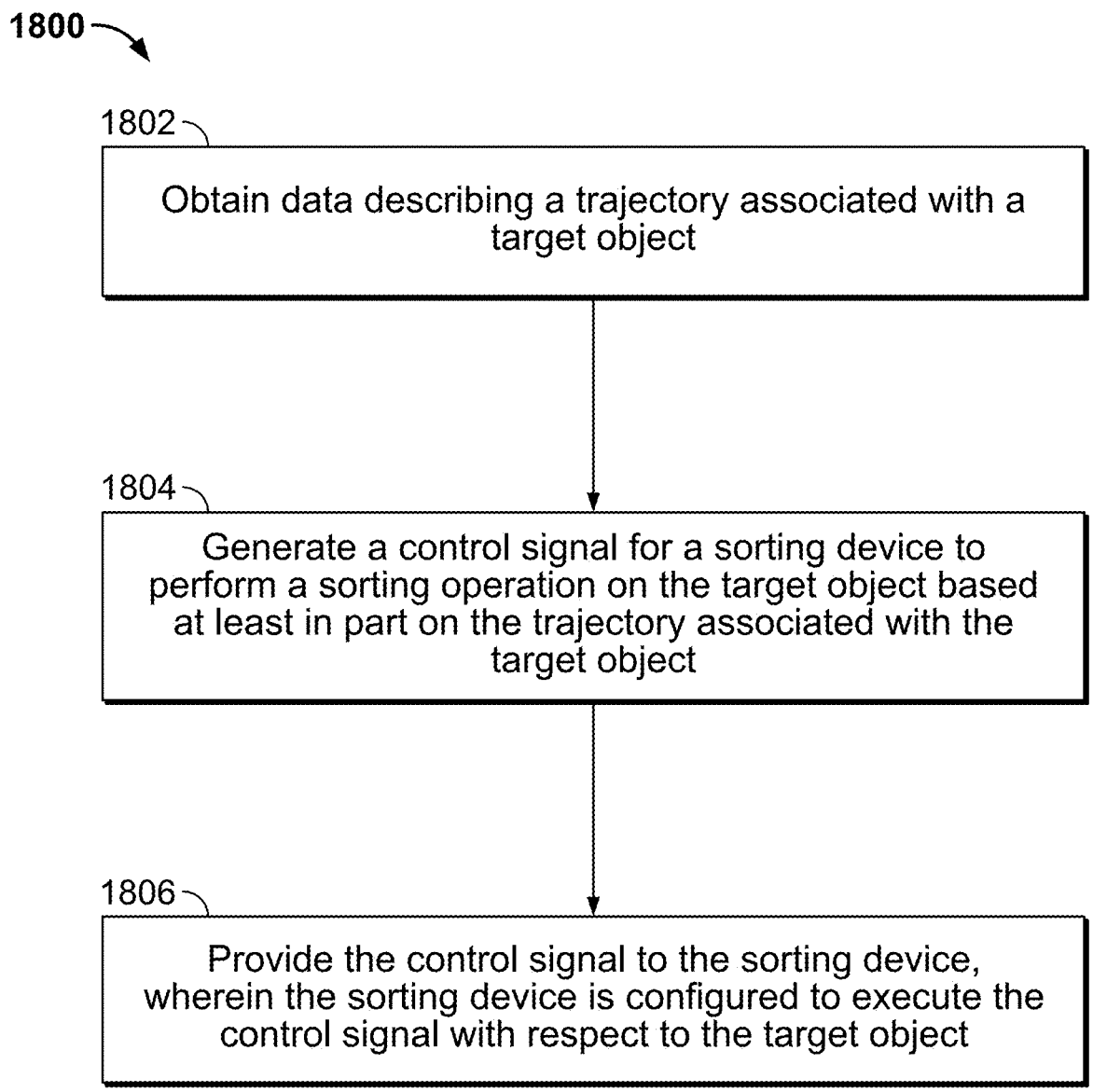
FIG. 18 is a flow diagram showing an embodiment of a process of using a determined trajectory associated with a target object to determine a sorting operation on the target object.

FIG. 18 is a flow diagram showing an embodiment of a process of using a determined trajectory associated with a target object to determine a sorting operation on the target object. In some embodiments, process 1800 is implemented by a compute node at a sorting facility such as a compute node of FIG. 4, compute node 502 of FIG. 5, compute node 602 of FIG. 6, or the compute node of FIG. 7. In some embodiments, process 1800 is implemented by a sorting device at a sorting facility such as a compute node of FIG. 4, sorting device 508 of FIG. 5, sorting device 608 of FIG. 6, or the sorting device of FIG. 10.

At 1802, data describing a trajectory associated with a target object is obtained. In some embodiments, the trajectory associated with the target object is determined by applying a dynamic model (e.g., a Kalman filter, a particle filter, local linearization, a sequential Monte Carlo method, or Bayesian filtering) to one or more captured images of the target object. In some embodiments, the trajectory associated with the target object may be included in a data structure associated with the target object. For example, the data structure may be published on a message queue.

At 1804, a control signal for a sorting device to perform a sorting operation on the target object is generated based at least in part on the trajectory associated with the target object. In some embodiments, the control signal includes one or more locations at which the sorting device is to perform a sorting operation on the target object and where the locations(s) are determined based on the trajectory of the target object. In some embodiments, the location(s) at which the sorting device is to perform a sorting operation on the target object can also be determined based on a location of the sorting device. In some embodiments, the control signal includes a sorting parameter with which the sorting operation is to be performed and where the sorting parameter is determined based on the trajectory of the target object. Examples of the sorting parameter include a specified force with which and/or a specified depth at which the sorting device is to use during the sorting operation. In some embodiments, the control signal instructs the sorting device to not perform a sorting operation on the target object (e.g., if it has been determined that the target object is too close to a non-target object and that the target object should not be sorted to avoid inadvertently putting a non-target object into a collection container for target objects).

At 1806, the control signal is provided to the sorting device, wherein the sorting device is configured to execute the control signal with respect to the target object. The sorting device is configured to perform a sorting operation based at least in part on a sorting parameter that is included in the control signal.

Figure 19:
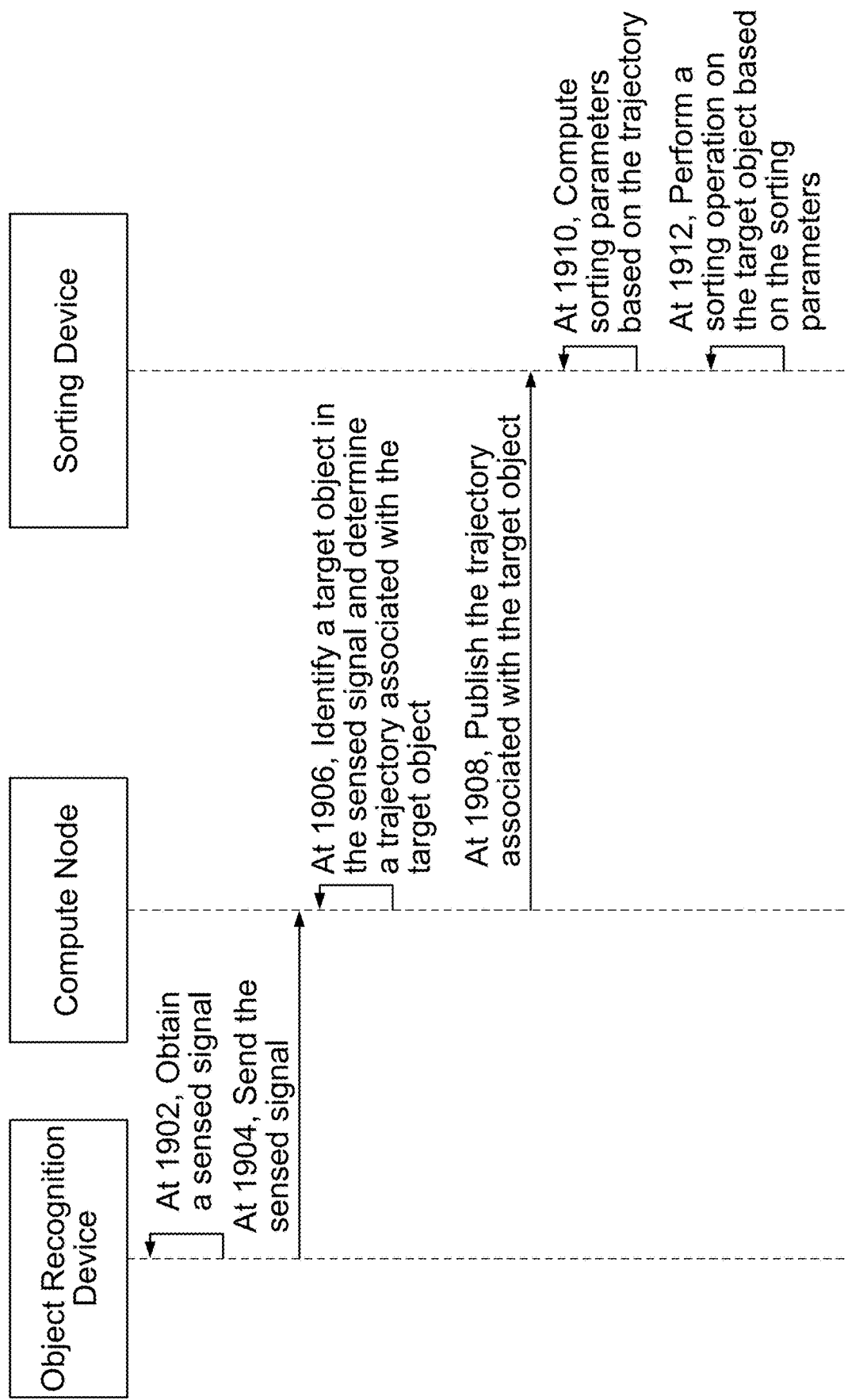
FIG. 19 is a sequence diagram showing the example interactions among an object recognition device, a compute node, and a sorting device at a sorting facility to cause a sorting operation to be performed on a target object.

FIG. 19 is a sequence diagram showing the example interactions among an object recognition device, a compute node, and a sorting device at a sorting facility to cause a sorting operation to be performed on a target object. At 1902, the object recognition device obtains a sensed signal. For example, the object recognition device includes a vision sensor that captures one or more images of a target object at the sorting facility. At 1904, the object recognition device sends the sensed signal to the compute node. For example, the object recognition device may send the sensed signal (e.g., images) associated with the target object to the compute node when the target object has left its field of view. At 1906, the compute node identifies a target object in the sensed signal and determines a trajectory associated with the target object. The compute node then uses machine learning techniques to identify the target object within the sensed signal. Once the target object is identified, the compute node applies a path tracking technique to calculate a predicted trajectory for the target object. For example, one or more images are used by the path tracking technique to capture the target object location in 2D (e.g., (X, Y) coordinate) or in 3D (e.g., (X, Y, Z) coordinate) on the conveyor device. The compute node then determines the object's velocity along the conveyor devices using multiple images and the time intervals between the images. In some other embodiments, the velocity of the target object may be determined from additional sensors such as encoders embedded in the track system or other forms of velocity measuring devices. Based on the position and velocity, the compute node calculates a "track" or trajectory for future positions of the target object (e.g., along the conveyor device). At 1908, the compute node publishes the trajectory associated with the target object to the sorting device. For example, the compute node can publish the trajectory as part of a data structure associated with the target object to a message queue to which one or more downstream sorting devices are subscribed. At 1910, the sorting device computes sorting parameters based on the trajectory. A (e.g., subscribed) sorting device then receives the message from the message queue and uses the current 2- or 3-D position of the target object and the trajectory to compute sorting parameters with which to perform a sorting operation on the target object. One example sorting parameter is an optical location (e.g., within the sorting device's sorting area) at which the sorting device is to perform a sorting operation on the target object. Other examples of sorting parameters may be associated with the dynamics of the sorting device's sorting mechanisms (e.g., a sorting parameter can be determined using a PID control algorithm or a pressure gradient algorithm based upon location within a jet array). For example, a sorting device that includes a robotic arm may have multiple degrees of freedom for its articulated movement, and the calculation of optimal robotic arm movement may also be computed by the sorting device (or alternatively by the compute node and then sent to the sorting device). Alternatively, the compute node may provide (X, Y) coordinates and time information or (X, Y, Z) coordinates and time information, and the sorting device may locally perform the necessary motion calculations. Either approach may be used for other types of sorting devices such as those that use air orifices, paddles, and/or pushers. At 1912, the sorting device performs a sorting operation on the target object based on the sorting parameters. In some embodiments, the sorting device may also determine to cancel performing the sorting operation on the target object. For example, after calculating dynamics, the sorting device may determine that the probability of successfully capturing the target object is too low based on information received from the data structures received from the message queue. Alternatively, the sorting device may receive messages related to more than one target object, and based on internal optimization or external weightings (e.g., from 3rd party commodity data, from priorities assigned by the compute node or a remote cloud sorting server), the sorting device determines to capture one target object and ignore the other target object.

Figure 20:
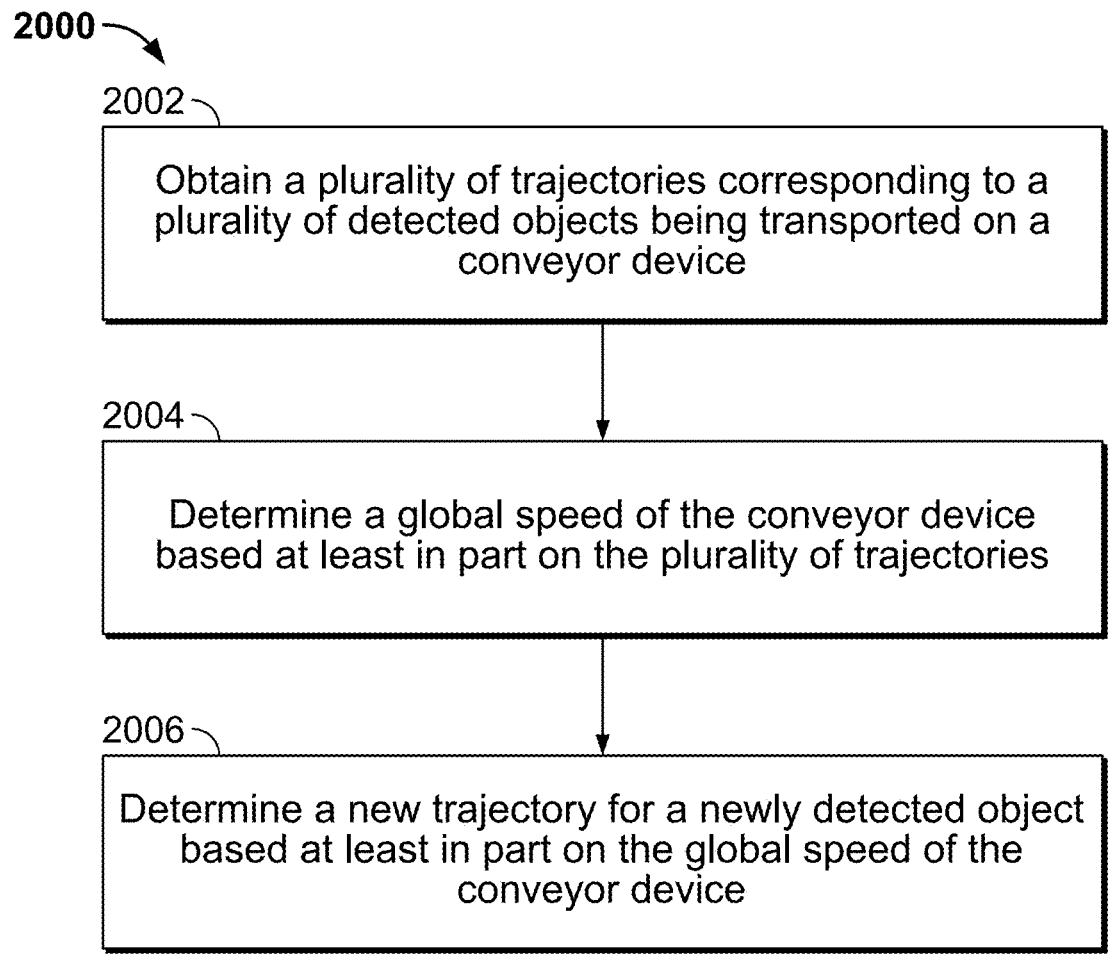
FIG. 20 is a flow diagram showing an embodiment of a process of using a determined trajectory associated with a target object to determine a sorting operation on the target object.

FIG. 20 is a flow diagram showing an embodiment of a process of using a determined trajectory associated with a target object to determine a sorting operation on the target object. In some embodiments, process 2000 is implemented by a compute node at a sorting facility such as a compute node of FIG. 4, compute node 502 of FIG. 5, compute node 602 of FIG. 6, or the compute node of FIG. 7.

At 2002, a plurality of trajectories corresponding to a plurality of detected objects being transported on a conveyor device is obtained. As described above, the trajectory of each object that is being transported on a conveyor device at a sorting facility is determined based on the sensed data (e.g., captured images and/or other types of sensed data) obtained at the sorting facility. For example, the trajectory of each object is determined using a dynamic model such as a Kalman filter, a particle filter, local linearization, a sequential Monte Carlo method, or Bayesian filtering.

At 2004, a global speed of the conveyor device is determined based at least in part on the plurality of trajectories. In some embodiments, a global dynamic model uses multiple objects and trajectories to calculate an overall global speed for the system, effectively combining all measurements to create a global velocity value.

At 2006, a new trajectory is determined for a newly detected object based at least in part on the global speed of the conveyor device. This global velocity may then be used as the default initial conditions when a new dynamic model is instantiated for a newly detected object. A benefit of computing the global speed of the conveyor device this way is to remove the need for a separate encoder to measure the velocity of the conveyance device.

Figure 21:
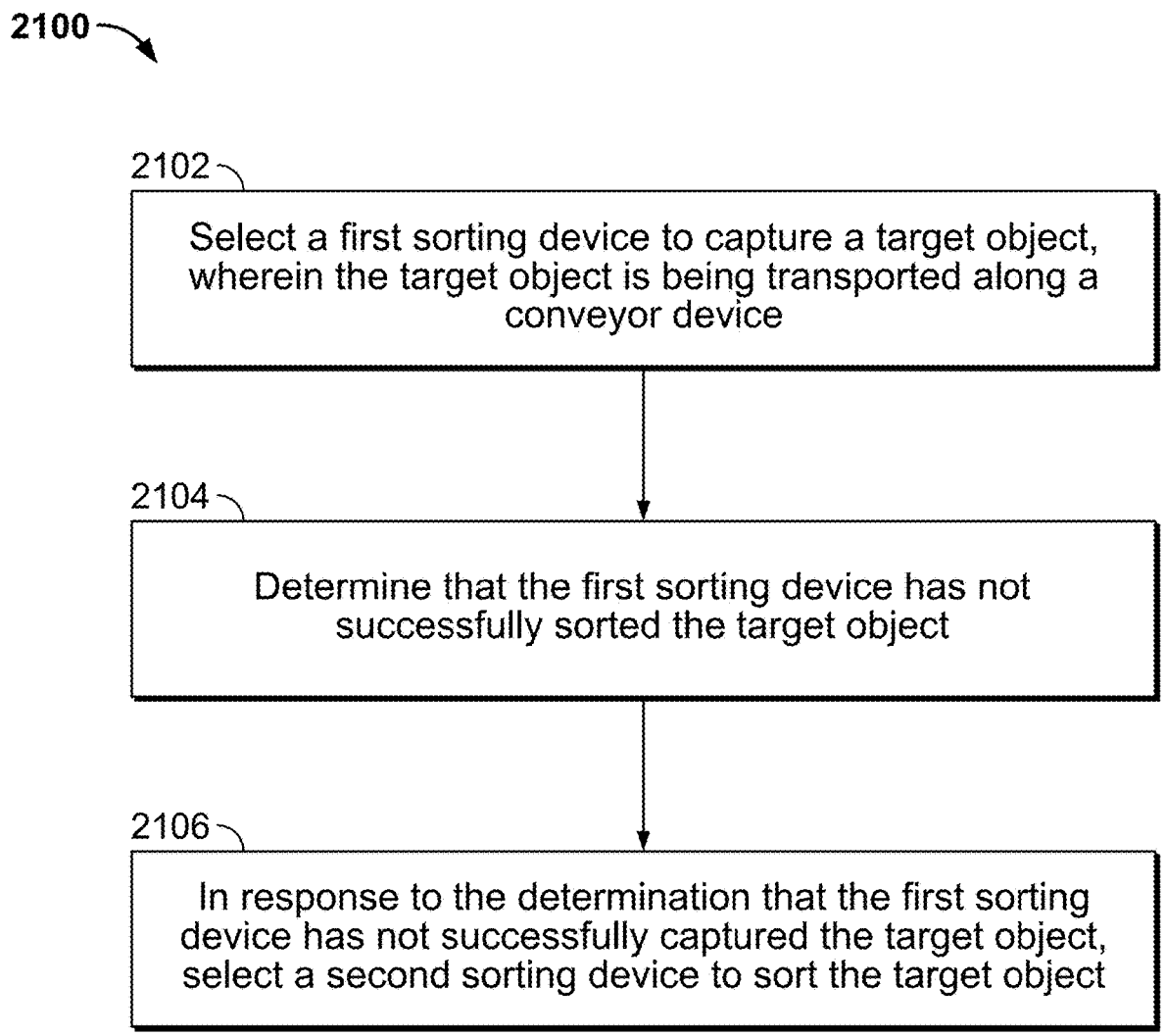
FIG. 21 is a flow diagram showing an embodiment of a process of performing multiple chance targeting on a target object that was unsuccessfully sorted by a first sorting device.

FIG. 21 is a flow diagram showing an embodiment of a process of performing multiple chance targeting on a target object that was unsuccessfully sorted by a first sorting device. In some embodiments, process 2100 is implemented by a compute node at a sorting facility such as a compute node of FIG. 4, compute node 502 of FIG. 5, compute node 602 of FIG. 6, or the compute node of FIG. 7.

At 2102, a first sorting device is selected to sort a target object, wherein the target object is being transported along a conveyor device. In various embodiments, to "sort" the target object comprises to pick up/capture/remove the target object from the conveyor device. In some embodiments, the first sorting device is selected to capture the target object based at least in part on a location of the first sorting device and a trajectory associated with the target object. In some embodiments, the first sorting device is selected to capture the target object based at least in part on the first sorting device having at least one available picker mechanism that is capable of capturing the target object. In some embodiments, a control signal is sent to the first sorting device to instruct the first sorting device to perform a sorting operation on the target object.

At 2104, it is determined that the first sorting device has not successfully sorted the target object. In some embodiments, that the first sorting device has not successfully sorted the target object is determined by the first sorting device sending a message to the compute node indicating the failure to capture the target object. In some embodiments, that the first sorting device has not successfully sorted the target object is determined by the first sorting device publishing a data structure associated with the target object on a message queue that is accessible by the compute node. In a first example, the first sorting device that uses a suction airflow to assist in picking up a target object can determine that it had failed to successfully capture the target object (e.g., pick up the target object off the conveyor device) based on pressure sensor readings. If the pressure sensor reading indicated that the force of the suction airflow had dropped to a threshold level after the first sorting device had initiated the sorting operation on the target object, then the first sorting device can determine that the sorting operation to capture the target object had succeeded. Otherwise, if the pressure sensor reading indicated that the force of the suction airflow had not dropped to the threshold level after the first sorting device had initiated the sorting operation on the target object, then the first sorting device can determine that the sorting operation to capture the target object had not succeeded. In a second example, the first sorting device can determine that it cannot successfully perform the sorting operation on the target object because another target object on the conveyor device is blocking the first sorting device's access to the target object.

At 2106, in response to the determination that the first sorting device has not successfully sorted the target object, a second sorting device is selected to sort the target object. A second sorting device can be selected to perform a sorting operation on the "missed" target object. In some embodiments, the second sorting device is downstream (e.g., given the direction of movement of the conveyor device) from the first sorting device and is selected to capture the target object based at least in part on a location of the second sorting device and a (updated) trajectory associated with the target object.

Figure 22:
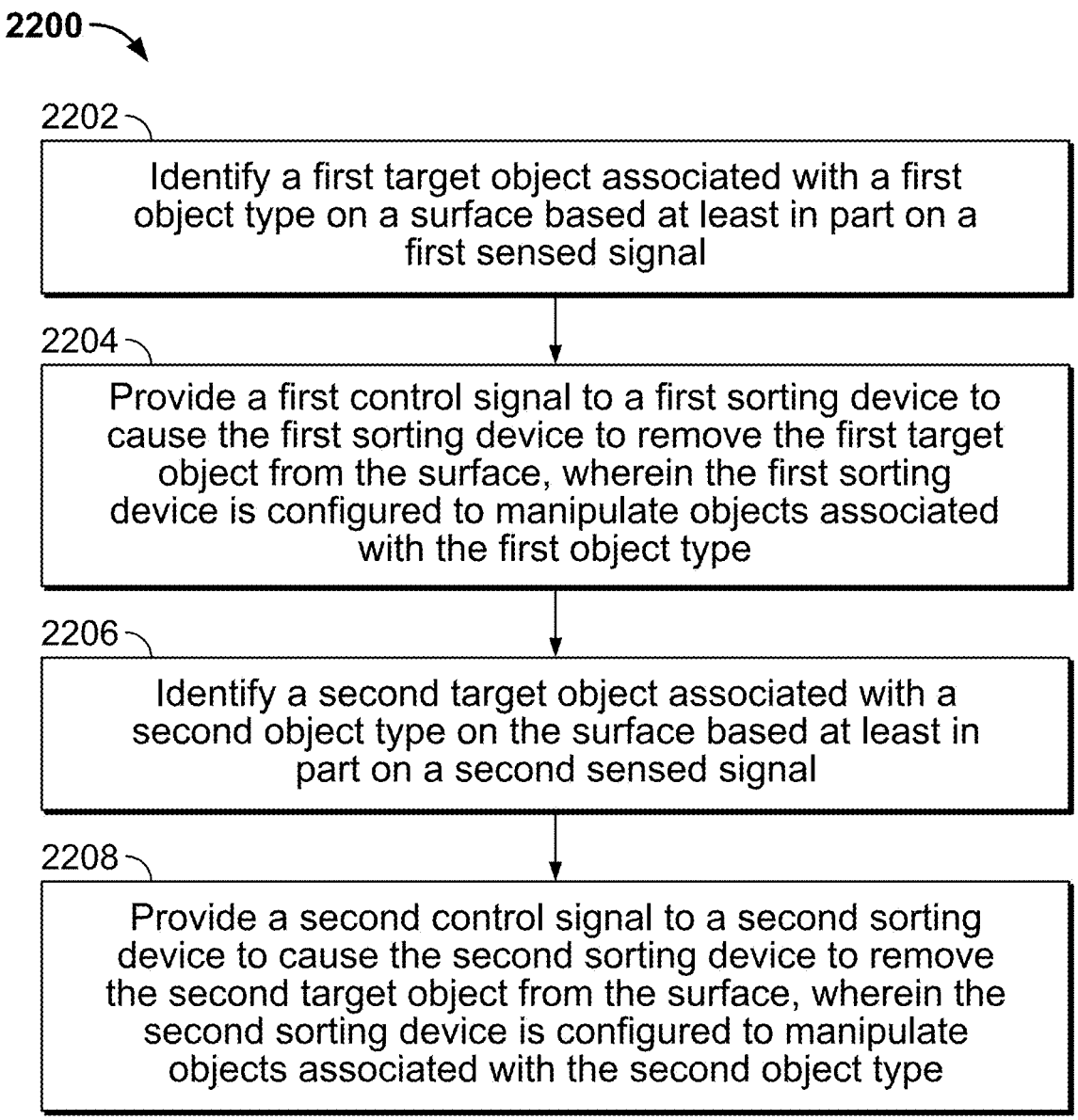
FIG. 22 is a flow diagram showing an embodiment of a process of sorting a heterogenous stream of materials.

FIG. 22 is a flow diagram showing an embodiment of a process of sorting a heterogenous stream of materials. In some embodiments, process 2200 is implemented by a compute node at a sorting facility such as a compute node of FIG. 4, compute node 502 of FIG. 5, compute node 602 of FIG. 6, or the compute node of FIG. 7.

At 2202, a first target object associated with a first object type on a surface is identified based at least in part on a first sensed signal. In some embodiments, the first sensed signal comprises image data or other types of sensor data captured at a sorting facility. Machine learning techniques are applied to the sensed signal to identify the presence of the first target object and its corresponding first object type. For example, the surface on which the first target object is located is a conveyor device.

At 2204, a first control signal is provided to a first sorting device to cause the first sorting device to remove the first target object from the surface, wherein the first sorting device is configured to manipulate objects associated with the first object type. A first sorting device is selected to remove the first target object based on the known capabilities associated with the first sorting device (e.g., where the capabilities of sorting devices are stored in a database) and an attribute (e.g., mass, size, shape, density, material type) associated with the first target object. For example, the first sorting device is associated with capabilities (e.g., sorting mechanism type and/or other constraints) that can manipulate (e.g., capture, lift, move, and/or grip) the first target object given its corresponding object type, weight, shape, and/or condition. The first sorting device may be capable of manipulating target objects of object types other than the first object type. In some embodiments, the first control signal is configured to instruct the first sorting device to move the first target object into a deposit location (e.g., and into a collection container). In some embodiments, the first control signal is configured to instruct the first sorting device to move the first target object onto a different conveyor device. For example, the different conveyor devices include object recognition devices and/or sorting devices that are configured to perform sorting operations (e.g., capture and deposit into deposit locations) on objects of at least the first object type. In some embodiments, the control signal to the first sorting device includes a sorting parameter that is configured to adjust the manner in which the first sorting device is to remove the first target object from the surface. Examples of the sorting parameter include a specified force, a specified angle, a specified picker mechanism associated with the first sorting device, or a specified diverting mechanism associated with the first sorting device.

At 2206, a second target object associated with a second object type on the surface is identified based at least in part on a second sensed signal. For example, the second target object is another target object that is part of the same heterogeneous material stream as the first target object. Machine learning techniques are applied to the sensed signal to identify the presence of the second target object and its corresponding second object type.

At 2208, a second control signal is provided to a second sorting device to cause the second sorting device to remove the second target object from the surface, wherein the second sorting device is configured to manipulate objects associated with the second object type. A second sorting device is selected to remove the second target object based on the known capabilities associated with the second sorting device (e.g., where the capabilities of sorting devices are stored in a database) and an attribute (e.g., mass, size, shape, density, material type) associated with the second target object. For example, the second sorting device is associated with capabilities (e.g., sorting mechanism type and/or other constraints) that can manipulate (e.g., capture, lift, move, and/or grip) the second target object given its corresponding object type, weight, shape, and/or condition. The second sorting device may be capable of manipulating target objects of object types other than the second object type. If the second target object is different from the first target object (e.g., the two target objects can be associated with different object types, conditions, mass, size, shape, density, material type), then the second sorting device to which the control signal is sent may be a different instance of a sorting device or a different type of sorting device than the first sorting device. In some embodiments, the second control signal is configured to instruct the second sorting device to move the second target object into a deposit location (e.g., and into a collection container). In some embodiments, the second control signal is configured to instruct the second sorting device to move the second target object onto a different conveyor device that is associated with object recognition devices or other sorting devices that are configured to perform sorting operations (e.g., capture and deposit into deposit locations) on objects of at least the second object type. In some embodiments, the control signal to the second sorting device includes a sorting parameter that is configured to adjust the manner in which the second sorting device is to remove the second target object from the surface. Examples of the sorting parameter include a specified force, a specified angle, a specified picker mechanism associated with the second sorting device, or a specified diverting mechanism associated with the second sorting device.

FIG. 23 is a flow diagram showing an embodiment of a process of identifying and sorting an object as a variant of an object type. In some embodiments, process 2300 is implemented by a compute node at a sorting facility such as a compute node of FIG. 4, compute node 502 of FIG. 5, compute node 602 of FIG. 6, or the compute node of FIG. 7.

At 2302, an object is identified as a variant of an object type by inputting sensed data associated with the object into a modified machine learning model corresponding to the variant of the object type, wherein the modified machine learning model corresponding to the variant of the object type is generated using a machine learning model corresponding to the object type. As described above, a machine learning model that had been trained to recognize objects of an object type (e.g., plastic bottles) can be trained again (e.g., at the cloud sorting server) on training data associated with variants of the object types (e.g., plastic bottles that have been crushed, dented, or broken; or plastic bottles with new labels) to recognize such variants. For example, this training data may comprise sensed data collected at sorting facilities where existing machine learning models produced lower than a desired threshold of confidence levels corresponding to their determined object type classifications. Then, such sensed data could be annotated (e.g., manually) to produce the training data. This retrained machine learning model (the "modified machine learning model") can then be distributed from the cloud sorting server to sorting facilities to use to recognize variants of the object types. For example, the modified machine learning model includes a new output layer that is determined based on the training data. At a sorting facility, the modified machine learning model can be used by a compute node (e.g., with other machine learning techniques) to recognize such variant objects of the object type by analyzing sensed data (e.g., images or other types of sensor data) that has been captured by object recognition devices at the sorting facility. In some embodiments, that the object is a variant can be stored as an attribute in the data structure maintained for the object.

At 2304, a control signal to provide to a sorting device that is configured to perform a sorting operation on the object is generated, wherein the sorting operation on the object is determined based at least in part on the variant of the object type associated with the object. In some embodiments, the control signal to the sorting device includes a sorting parameter that is configured to adjust the manner in which the sorting device is to perform the sorting operation on the object and where the sorting parameter is determined based on the variant nature of the object. For example, the sorting operation to be performed on the object can be customized or tailored to the fact that the object is a variant of an object type and may need to be handled differently than a non-variant version of the object type. Examples of the sorting parameter include a specified force, a specified angle, a specified picker mechanism associated with the second sorting device, or a specified diverting mechanism associated with the second sorting device. In some embodiments, whether the sorting operation that is performed on the variant object is successful or not is sent to the cloud sorting server to use in future iterations of retraining/updating the modified machine learning model and/or used to determine a sorting parameter for a future sorting operation to be performed on a later detected variant object of the object type.

Figure 24:
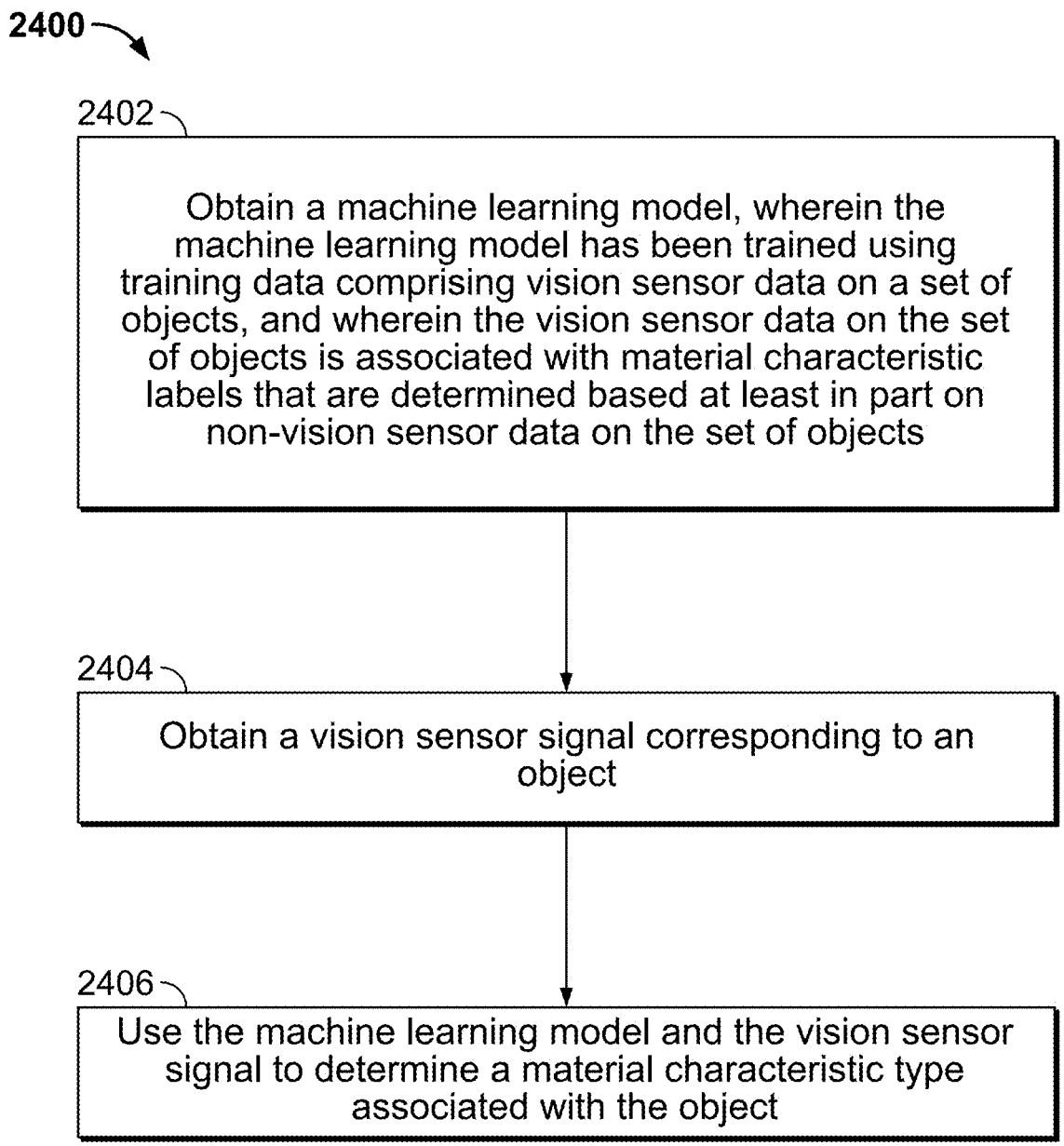
FIG. 24 is a flow diagram showing an embodiment of a process of determining object material characteristic type using multiple types of sensors.

FIG. 24 is a flow diagram showing an embodiment of a process of determining object material characteristic type using multiple types of sensors. In some embodiments, process 2400 is implemented by a compute node at a sorting facility such as a compute node of FIG. 4, compute node 502 of FIG. 5, compute node 602 of FIG. 6, or the compute node of FIG. 7.

At 2402, a machine learning model is obtained, wherein the machine learning model has been trained using training data comprising vision sensor data on a set of objects, and wherein the vision sensor data on the set of objects is associated with material characteristic labels that are determined based at least in part on non-vision sensor data on the set of objects. The machine learning model is trained using sensor data from both a vision sensor and data from a non-vision sensor. In some embodiments, to produce the training data, vision sensor data and non-vision sensor data are separately obtained on a set of objects. For example, the vision sensor data comprises images of the set of objects that are captured by a camera and the non-vision sensor data may comprise reflectivity data associated with each object of the set of objects that is obtained by a hyperspectral sensor (e.g., a near infrared sensor). The reflectivity data of each object can be used to determine a corresponding material characteristic about that object. In a specific example, the reflectivity data of a plastic object can be used to determine a specific polymer type associated with the object. In another specific example, the reflectivity data of a plastic object can be used to determine a state of the plastic object or a wrapper thereof (e.g., a wrapper's state could be that it is no longer completely wrapped around the object). Each image of the vision sensor data can then be labeled with a corresponding material characteristic associated with each object (e.g., or the location of the object) that is shown in the image and where the material characteristic was determined based on the non-vision sensor data that was obtained on the object. The labeled images can form the training data that is then used to train a machine learning model to recognize a material characteristic type of an object based only on image data associated with the object (e.g., by detecting a correlation between a visual characteristic of the object and a non-visual characteristic of the object). In some embodiments, the machine learning model is trained in this manner at the cloud sorting server and then sent to the sorting facility for the compute nodes to apply to data sensed at the sorting facility.

At 2404, a vision sensor signal is obtained corresponding to an object. As materials are being processed at a sorting facility, one or more image(s) are captured by an object recognition device of an object. Machine learning techniques are applied to the image(s) to identify the bounding polygon around the object.

At 2406, the machine learning model and the vision sensor signal are used to determine a material characteristic type associated with the object. The image(s) of the object are input into the machine learning model and the model is configured to determine a material characteristic type associated with the object. In some embodiments, the material characteristic type comprises a characteristic associated with the composition and/or material type (e.g., the polymer type associated with plastic, the combination of two or more ingredients) of the object. In some embodiments, a non-vision sensor signal does not need to be obtained on the object to determine its material characteristic type because the model has already been trained to recognize material characteristics given just image data. In some embodiments, the machine learning model can be further trained based on both inputs of labeled image data (as described above) and also labeled non-vision data (e.g., hyperspectral data) such that the trained model can receive both the vision sensor signal on the object and a non-vision sensor signal on the object to determine the object's material characteristic type. In some embodiments, the determined material characteristic type can be used to determine a classification for the object. In some embodiments, the determined material characteristic type can be compared against a set of target object criteria to determine whether the object is a target object that is to be harvested into a collection container.

Figure 25:
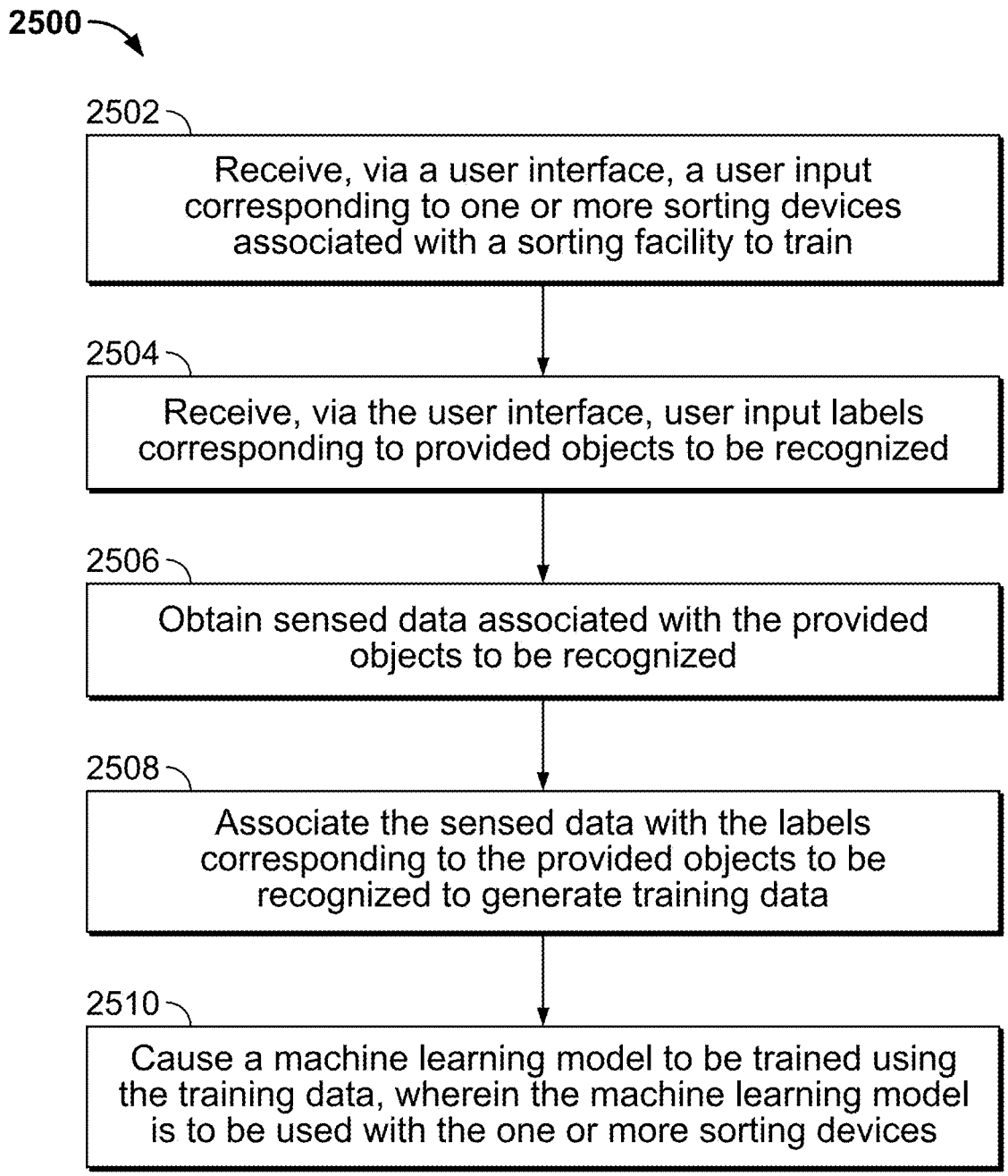
FIG. 25 is a flow diagram showing an example process of facilitating an operator initiated training at a sorting facility.

FIG. 25 is a flow diagram showing an example process of facilitating an operator initiated training at a sorting facility. In some embodiments, process 2500 is implemented by a compute node at a sorting facility such as a compute node of FIG. 4, compute node 502 of FIG. 5, compute node 602 of FIG. 6, or the compute node of FIG. 7.

At 2502, a user input corresponding to one or more sorting devices associated with a sorting facility to train is received at a user interface. For example, an operator at a sorting facility identifies a target object that is desirable or that should be recognized as it is harmful to the sorting process (e.g., an explosive item) and then initiates a training process over a user interface (e.g., software operating with a display device to provide sorting device configuration control) associated with a compute node at the sorting facility. The operator can also select which one or more sorting devices that he or she would like to be affected by the training process such that after the training process, the sorting devices would be able to sort the target objects that are identified by the operator. The operator can obtain one or more examples of target objects to be recognized. For example, it may be desirable to recognize lead-acid car batteries, although these may have varying sizes, shapes, material characteristics, as well as many possible damage states. In this step, the operator selects a representative number of samples of each such objects.

At 2504, user input labels corresponding to provided objects to be recognized are received via the user interface. The operator uses the user interface to provide desired labeling information for the objects (e.g., 12 cell car battery, 6 cell car battery, 12V marine battery, etc.).

At 2506, sensed data associated with the provided objects to be recognized is determined. The operator initiates the training process by sending the sample objects by the object recognition devices that are associated with the selected sorting devices. The operator may repeat this process more than once, and the user interface may provide guidance on the need for additional objects or re-scanning or arrangement of current objects.

At 2508, the sensed data is associated with the labels corresponding to the provided objects to be recognized to generate training data. The images captured by the object recognition device may be associated with the user provided labels for each image.

At 2510, a machine learning model is caused to be trained using the training data, wherein the machine learning model is to be used with the one or more sorting devices. For example, the recorded data (labeled images) is uploaded to the cloud sorting server and used to train an initial object detector on this new material. That detector is then used across the fleet to find more instances of the object, which are labeled and incorporated into training a much larger machine learning model that is far more effective at detecting the target material. In addition, the user interface may provide feedback on the success probability or other metric for the labeling and inference process. For example, based on a failure of the training of the machine learning model, the operator may obtain additional objects to augment the training. Conversely, based upon success of the training of the machine learning model, the operator may transition the sorting device, line, or facility back to a non-training state, or this may occur automatically at any time. The machine learning model that has been trained to detect the target material can then be sent back to the sorting facility at which the training process was initiated and deployed to the compute nodes that are configured to recognize target objects to be sorted by the selected sorting devices.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   one or more processors configured to:
      identify an object as a variant of an object type by inputting sensed data associated with the object into a modified machine learning model corresponding to the variant of the object type, wherein the modified machine learning model corresponding to the variant of the object type is generated using a machine learning model corresponding to the object type, wherein the machine learning model corresponding to the object type was modified to generate the modified machine learning model corresponding to the variant of the object type including by:
         training the machine learning model corresponding to the object type using training data comprising annotated images of objects of the object type in a plurality of different conditions; and
      generate a control signal to provide to a sorting device that is configured to perform a sorting operation on the object, wherein the sorting operation on the object is determined based at least in part on the variant of the object type associated with the object; and
   a memory coupled to the one or more processors and configured to provide the one or more processors with instructions.

2. The system of claim 1, wherein that the object cannot be identified from the sensed data associated with the object using the machine learning model corresponding to the object type is determined by a remote processor.

3. The system of claim 2, wherein that the object cannot be identified from the sensed data associated with the object using the machine learning model corresponding to the object type is determined by the remote processor based on the machine learning model corresponding to the object type outputting a classification confidence corresponding to the object that is lower than a desired confidence threshold.

4. The system of claim 1, wherein the modified machine learning model is configured to recognize the variant of the object type.

5. The system of claim 1, wherein the one or more processors are further configured to generate the training data comprising to:
   determine previously recorded sensed data for which objects of the object type were classified with confidences lower than a desired confidence threshold using the machine learning model corresponding to the object type; and
   receive annotations corresponding to the previously recorded sensed data.

6. The system of claim 1, wherein to generate the control signal comprises to include in the control signal a sorting parameter associated with the sorting operation on the object, and wherein the sorting parameter is determined based at least in part on the variant of the object type.

7. The system of claim 6, wherein the sorting parameter associated with the sorting operation on the object comprises a specified location on the object on which the sorting device is to contact or emit airflow with respect to the object.

8. The system of claim 6, wherein the sorting parameter associated with the sorting operation on the object comprises a specified angle from which the sorting device is to contact or emit airflow with respect to the object.

9. The system of claim 6, wherein the sorting parameter associated with the sorting operation on the object comprises a specified force with which the sorting device is to contact or emit airflow with respect to the object.

10. The system of claim 1, wherein the one or more processors are further configured to:
    determine whether the sorting operation performed by the sorting device is successful; and
    generate training data from a failed sorting operation.

11. The system of claim 10, wherein the one or more processors are further configured to update the modified machine learning model corresponding to the variant of the object type based at least in part on the determination that the sorting operation performed by the sorting device is successful.

12. The system of claim 10, wherein the one or more processors are configured to make the training data from the failed sorting operation available to a remote processor; and wherein the remote processor is configured to update the modified machine learning model corresponding to the variant of the object type at least in part based upon the training data from the failed sorting operation.

13. The system of claim 1, wherein the one or more processors are further configured to update a parameter within a data structure associated with the object to indicate that the object is associated with the variant of the object type.

14. The system of claim 1, wherein the one or more processors are further configured to generate the modified machine learning model corresponding to the variant of the object type by adding a new output layer corresponding to the machine learning model corresponding to the object type by training the machine learning model using annotated sensed data pertaining to objects of the variant of the object type.

15. A method, comprising:
identifying an object as a variant of an object type by inputting sensed data associated with the object into a modified machine learning model corresponding to the variant of the object type, wherein the modified machine learning model corresponding to the variant of the object type is generated using a machine learning model corresponding to the object type, wherein the machine learning model corresponding to the object type was modified to generate the modified machine learning model corresponding to the variant of the object type including by:
training the machine learning model corresponding to the object type using training data comprising annotated images of objects of the object type in a plurality of different conditions; and
generating a control signal to provide to a sorting device that is configured to perform a sorting operation on the object, wherein the sorting operation on the object is determined based at least in part on the variant of the object type associated with the object.

16. The method of claim 15, wherein generating the control signal comprises including in the control signal a sorting parameter associated with the sorting operation on the object, and wherein the sorting parameter is determined based at least in part on the variant of the object type.

17. The method of claim 16, wherein the sorting parameter associated with the sorting operation on the object comprises a specified location on the object on which the sorting device is to contact or emit airflow with respect to the object.

18. The method of claim 16, wherein the sorting parameter associated with the sorting operation on the object comprises a specified angle from which the sorting device is to contact or emit airflow with respect to the object.

19. The method of claim 16, wherein the sorting parameter associated with the sorting operation on the object comprises a specified force with which the sorting device is to contact or emit airflow with respect to the object.

20. A non-transitory computer-readable storage medium storing thereon computer instructions that when executed by one or more processors cause the one or more processors to:
identify an object as a variant of an object type by inputting sensed data associated with the object into a modified machine learning model corresponding to the variant of the object type, wherein the modified machine learning model corresponding to the variant of the object type is generated using a machine learning model corresponding to the object type, wherein the machine learning model corresponding to the object type was modified to generate the modified machine learning model corresponding to the variant of the object type including by:
training the machine learning model corresponding to the object type using training data comprising annotated images of objects of the object type in a plurality of different conditions; and
generate a control signal to provide to a sorting device that is configured to perform a sorting operation on the object, wherein the sorting operation on the object is determined based at least in part on the variant of the object type associated with the object.

\* \* \* \* \*